US012047768B2

(12) United States Patent
Tsingos et al.

(10) Patent No.: US 12,047,768 B2
(45) Date of Patent: *Jul. 23, 2024

(54) SYSTEM AND TOOLS FOR ENHANCED 3D AUDIO AUTHORING AND RENDERING

(71) Applicant: Dolby Laboratories Licensing Corporation, San Francisco, CA (US)

(72) Inventors: Nicolas R. Tsingos, San Francisco, CA (US); Charles Q. Robinson, Piedmont, CA (US); Jurgen W. Scharpf, San Anselmo, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,538

(22) Filed: May 1, 2023

(65) Prior Publication Data

US 2023/0388738 A1 Nov. 30, 2023

Related U.S. Application Data

(63) Continuation of application No. 17/364,912, filed on Jul. 1, 2021, now Pat. No. 11,641,562, which is a (Continued)

(51) Int. Cl.

*H04R 5/02* (2006.01)

*H04S 3/00* (2006.01)

(Continued)

(52) U.S. Cl.

CPC ............... *H04S 7/307* (2013.01); *H04R 5/02* (2013.01); *H04S 3/00* (2013.01); *H04S 3/008* (2013.01);

(Continued)

(58) Field of Classification Search

CPC . H04S 7/307; H04S 3/00; H04S 3/008; H04S 5/00; H04S 7/308; H04R 5/02

See application file for complete search history.

(56) References Cited

U.S. PATENT DOCUMENTS

| | | | |
|---|---|---|---|
| 5,636,283 | A | 6/1997 | Hill |
| 5,715,318 | A | 2/1998 | Hill |

(Continued)

FOREIGN PATENT DOCUMENTS

| | | |
|---|---|---|
| CN | 101129090 | 2/2008 |
| CN | 102576533 | 7/2012 |

(Continued)

OTHER PUBLICATIONS

De Vries, D. et al "Auralization of Sound Fields by Wave Field Synthesis" presented at the 106th Convention, May 8-11, 1999, Munich, Germany, AES Monograph, 1999.

(Continued)

*Primary Examiner* — Simon King

(57) ABSTRACT

Improved tools for authoring and rendering audio reproduction data are provided. Some such authoring tools allow audio reproduction data to be generalized for a wide variety of reproduction environments. Audio reproduction data may be authored by creating metadata for audio objects. The metadata may be created with reference to speaker zones. During the rendering process, the audio reproduction data may be reproduced according to the reproduction speaker layout of a particular reproduction environment.

11 Claims, 31 Drawing Sheets

Related U.S. Application Data continuation of application No. 16/833,874, filed on Mar. 30, 2020, now Pat. No. 11,057,731, which is a continuation of application No. 16/254,778, filed on Jan. 23, 2019, now Pat. No. 10,609,506, which is a continuation of application No. 15/803,209, filed on Nov. 3, 2017, now Pat. No. 10,244,343, which is a continuation of application No. 15/367,937, filed on Dec. 2, 2016, now Pat. No. 9,838,826, which is a continuation of application No. 14/879,621, filed on Oct. 9, 2015, now Pat. No. 9,549,275, which is a continuation of application No. 14/126,901, filed as application No. PCT/US2012/044363 on Jun. 27, 2012, now Pat. No. 9,204,236.

(60) Provisional application No. 61/636,102, filed on Apr. 20, 2012, provisional application No. 61/504,005, filed on Jul. 1, 2011.

(51) Int. Cl.
*H04S 5/00* (2006.01)
*H04S 7/00* (2006.01)

(52) U.S. Cl.
CPC ................ *H04S 5/00* (2013.01); *H04S 7/308* (2013.01); *H04S 7/40* (2013.01); *H04S 2400/01* (2013.01); *H04S 2400/11* (2013.01)

(56) References Cited

U.S. PATENT DOCUMENTS

| | | | | |
|---|---|---|---|---|
| 6,442,277 | B1 | 8/2002 | Lueck | |
| 6,507,658 | B1 | 1/2003 | Abel | |
| 6,577,736 | B1 | 6/2003 | Clemow | |
| 7,158,642 | B2 | 1/2007 | Tsuhako | |
| 7,558,393 | B2 | 7/2009 | Miller, III | |
| 7,606,373 | B2 | 10/2009 | Moorer | |
| 7,660,424 | B2 | 2/2010 | Davis | |
| 8,363,865 | B1 | 1/2013 | Bottum | |
| 8,396,575 | B2 | 3/2013 | Kraemer | |
| 8,396,577 | B2 * | 3/2013 | Kraemer | H04R 3/12 709/231 |
| 2005/0105442 | A1 | 5/2005 | Melchior | |
| 2005/0276420 | A1 | 12/2005 | Davis | |
| 2006/0045295 | A1 | 3/2006 | Kim | |
| 2006/0109988 | A1 | 5/2006 | Metcalf | |
| 2006/0133628 | A1 | 6/2006 | Trivi et al. | |
| 2006/0178213 | A1 | 8/2006 | Ohta et al. | |
| 2007/0291035 | A1 | 12/2007 | Vesely | |
| 2008/0019534 | A1 | 1/2008 | Reichelt et al. | |
| 2008/0253577 | A1 | 10/2008 | Eppolito | |
| 2008/0253592 | A1 | 10/2008 | Sanders | |
| 2009/0034764 | A1 | 2/2009 | Ohashi | |
| 2009/0192638 | A1 * | 7/2009 | Van Leest | H04S 7/301 700/94 |
| 2009/0227373 | A1 | 9/2009 | Yamamoto | |
| 2010/0111336 | A1 | 5/2010 | Jeong | |
| 2011/0013790 | A1 | 1/2011 | Hilpert | |
| 2011/0040395 | A1 | 2/2011 | Kraemer | |
| 2011/0135124 | A1 | 6/2011 | Steffens | |
| 2011/0144783 | A1 | 6/2011 | Reichelt | |
| 2012/0230497 | A1 * | 9/2012 | Dressler | G10L 19/008 381/22 |
| 2012/0232910 | A1 * | 9/2012 | Dressler | H04S 3/02 704/500 |
| 2012/0237063 | A1 | 9/2012 | Korn | |
| 2018/0077515 | A1 | 3/2018 | Tsingos | |

FOREIGN PATENT DOCUMENTS

| | | | |
|---|---|---|---|
| CN | 101529504 | | 8/2012 |
| DE | 10321980 | | 12/2006 |
| EP | 0959644 | | 11/1999 |
| EP | 1909538 | | 4/2008 |
| EP | 2094032 | A1 | 8/2009 |
| EP | 2249334 | A1 | 11/2010 |
| EP | 2309781 | | 4/2011 |
| JP | 2003331532 | | 11/2003 |
| JP | 2004531125 | | 10/2004 |
| JP | 2005094271 | | 4/2005 |
| JP | 2006005024 | A | 1/2006 |
| JP | 2006050241 | | 2/2006 |
| JP | 2007501553 | | 1/2007 |
| JP | 2007502590 | | 2/2007 |
| JP | 2008096508 | | 4/2008 |
| JP | 2008522239 | | 6/2008 |
| JP | 2008301200 | | 12/2008 |
| JP | 2009506706 | | 2/2009 |
| JP | 2010020342 | A | 1/2010 |
| JP | 2010505328 | | 2/2010 |
| JP | 2010507114 | A | 3/2010 |
| JP | 2010154548 | | 7/2010 |
| JP | 2010252220 | | 11/2010 |
| JP | 2011066868 | | 3/2011 |
| JP | 2011530913 | | 12/2011 |
| JP | 2012500532 | | 1/2012 |
| JP | 2012049967 | | 3/2012 |
| JP | 6023860 | B2 | 11/2016 |
| KR | 20070001227 | A | 1/2007 |
| RS | 1332 | | 8/2013 |
| RU | 2414095 | C2 | 3/2011 |
| TW | 200835376 | A | 8/2008 |
| TW | 201032577 | | 9/2010 |
| TW | 201036463 | | 10/2010 |
| WO | 2008135049 | | 11/2008 |
| WO | 2009001292 | | 12/2008 |
| WO | 2011020067 | | 2/2011 |
| WO | 2011117399 | | 9/2011 |
| WO | 2011119401 | | 9/2011 |
| WO | 2011135283 | | 11/2011 |
| WO | 2011152044 | | 12/2011 |

OTHER PUBLICATIONS

Gupta, A. et al, "Three-Dimensional Sound Field Reproduction Using Multiple Circular Loudspeaker Arrays," IEEE Transactions on Audio, Speech, and Language Processing, vol. 19, Issue 5, pp. 1149-1159, 2011.

Pulkki, V. et al, "Multichannel Audio Rendering Using Amplitude Panning," IEEE Signal Processing Magazine, vol. 25, Issue 3, pp. 118-122, May 2008.

Pulkki, V., "Compsensating Displacement of Amplitude-Panned Virtual Sources," Audio Engineering Society International Conference on Virtual Synthetic and Entertainment Audio, Jun. 1, 2002. cited by applicant.

Sadek, R. et al, "Novel Multichannel Panning Method for Standard and Arbitrary Loudspeaker Configurations," University of Southern California Marina Del Rey, CA Institute for Creative Technologies, Oct. 2004.

Shah, P. et al, "Calibration and 3-D Sound Reproduction in the Immersive Audio Environment," IEEE International Conference on Multimedia Expo (ICME), pp. 1-6, 2011.

Stanojevic, T. "Some Technical Possibilities of Using the Total Surround Sound Concept in the Motion Picture Technology", 133rd SMPTE Technical Conference and Equipment Exhibit, Los Angeles Convention Center, Los Angeles, California, Oct. 26-29, 1991.

Stanojevic, T. et al "Designing of TSS Halls" 13th International Congress on Acoustics, Yugoslavia, 1989.

Stanojevic, T. et al "The Total Surround Sound (TSS) Processor" SMPTE Journal, Nov. 1994.

Stanojevic, T. et al "The Total Surround Sound System", 86th AES Convention, Hamburg, Mar. 7-10, 1989.

Stanojevic, T. et al "TSS System and Live Performance Sound" 88th AES Convention, Montreux, Mar. 13-16, 1990.

Stanojevic, T. et al "TSS Processor" 135th SMPTE Technical Conference, Oct. 29-Nov. 2, 1993, Los Angeles Convention Center, Los Angeles, California, Society of Motion Picture and Television Engineers.

(56) References Cited

OTHER PUBLICATIONS

Stanojevic, Tomislav "3-D Sound in Future HDTV Projection Systems" presented at the 132nd SMPTE Technical Conference, Jacob K. Javits Convention Center, New York City, Oct. 13-17, 1990.

Stanojevic, Tomislav "Surround Sound for a New Generation of Theaters, Sound and Video Contractor" Dec. 20, 1995.

Stanojevic, Tomislav, "Virtual Sound Sources in the Total Surround Sound System" Proc. 137th SMPTE Technical Conference and World Media Expo, Sep. 6-9, 1995, New Orleans Convention Center, New Orleans, Louisiana.

Unknown: "Report ITU-R BS.2159-3, Multichannel Sound Technology in home and Broadcasting Applications, BS series Broadcasting Service (sound)", Jan. 26, 2012.

* cited by examiner

SYSTEM AND TOOLS FOR ENHANCED 3D AUDIO AUTHORING AND RENDERING

CROSS-REFERENCE TO RELATED APPLICATIONS

This application is a Continuation of U.S. application Ser. No. 17/364,912 filed Jul. 1, 2021, which is a Continuation of U.S. application Ser. No. 16/833,874 filed Mar. 30, 2020, now U.S. Pat. No. 11,057,731, which is a Continuation of U.S. application Ser. No. 16/254,778 filed Jan. 23, 2019, now U.S. Pat. No. 10,609,506, issued Mar. 31, 2020, which is a Continuation of U.S. application Ser. No. 15/803,209, filed Nov. 3, 2017, now U.S. Pat. No. 10,244,343, issued Mar. 26, 2019, which is a Continuation of U.S. application Ser. No. 15/367,937, filed Dec. 2, 2016, now U.S. Pat. No. 9,838,826, issued Dec. 5, 2017, which is a Continuation of U.S. application Ser. No. 14/879,621, filed Oct. 9, 2015, now U.S. Pat. No. 9,549,275, issued Jan. 17, 2017, which is a Continuation of U.S. application Ser. No. 14/126,901, filed Dec. 17, 2013, now U.S. Pat. No. 9,204,236, issued Dec. 1, 2015, which is the U.S. National Stage of International Application No. PCT/US2012/044363, filed Jun. 27, 2012, which claims priority to U.S. Provisional Application No. 61/636,102, filed Apr. 20, 2012, and U.S. Provisional Application No. 61/504,005, filed Jul. 1, 2011, each of which is hereby incorporated by reference in its entirety.

TECHNICAL FIELD

This disclosure relates to authoring and rendering of audio reproduction data. In particular, this disclosure relates to authoring and rendering audio reproduction data for reproduction environments such as cinema sound reproduction systems.

BACKGROUND

Since the introduction of sound with film in 1927, there has been a steady evolution of technology used to capture the artistic intent of the motion picture sound track and to replay it in a cinema environment. In the 1930s, synchronized sound on disc gave way to variable area sound on film, which was further improved in the 1940s with theatrical acoustic considerations and improved loudspeaker design, along with early introduction of multi-track recording and steerable replay (using control tones to move sounds). In the 1950s and 1960s, magnetic striping of film allowed multichannel playback in theatre, introducing surround channels and up to five screen channels in premium theatres.

In the 1970s Dolby introduced noise reduction, both in post-production and on film, along with a cost-effective means of encoding and distributing mixes with 3 screen channels and a mono surround channel. The quality of cinema sound was further improved in the 1980s with Dolby Spectral Recording (SR) noise reduction and certification programs such as THX. Dolby brought digital sound to the cinema during the 1990s with a 5.1 channel format that provides discrete left, center and right screen channels, left and right surround arrays and a subwoofer channel for low-frequency effects. Dolby Surround 7.1, introduced in 2010, increased the number of surround channels by splitting the existing left and right surround channels into four "zones."

As the number of channels increases and the loudspeaker layout transitions from a planar two-dimensional (2D) array to a three-dimensional (3D) array including elevation, the task of positioning and rendering sounds becomes increasingly difficult. Improved audio authoring and rendering methods would be desirable.

SUMMARY

Some aspects of the subject matter described in this disclosure can be implemented in tools for authoring and rendering audio reproduction data. Some such authoring tools allow audio reproduction data to be generalized for a wide variety of reproduction environments. According to some such implementations, audio reproduction data may be authored by creating metadata for audio objects. The metadata may be created with reference to speaker zones. During the rendering process, the audio reproduction data may be reproduced according to the reproduction speaker layout of a particular reproduction environment.

Some implementations described herein provide an apparatus that includes an interface system and a logic system. The logic system may be configured for receiving, via the interface system, audio reproduction data that includes one or more audio objects and associated metadata and reproduction environment data. The reproduction environment data may include an indication of a number of reproduction speakers in the reproduction environment and an indication of the location of each reproduction speaker within the reproduction environment. The logic system may be configured for rendering the audio objects into one or more speaker feed signals based, at least in part, on the associated metadata and the reproduction environment data, wherein each speaker feed signal corresponds to at least one of the reproduction speakers within the reproduction environment. The logic system may be configured to compute speaker gains corresponding to virtual speaker positions.

The reproduction environment may, for example, be a cinema sound system environment. The reproduction environment may have a Dolby Surround 5.1 configuration, a Dolby Surround 7.1 configuration, or a Hamasaki 22.2 surround sound configuration. The reproduction environment data may include reproduction speaker layout data indicating reproduction speaker locations. The reproduction environment data may include reproduction speaker zone layout data indicating reproduction speaker areas and reproduction speaker locations that correspond with the reproduction speaker areas.

The metadata may include information for mapping an audio object position to a single reproduction speaker location. The rendering may involve creating an aggregate gain based on one or more of a desired audio object position, a distance from the desired audio object position to a reference position, a velocity of an audio object or an audio object content type. The metadata may include data for constraining a position of an audio object to a one-dimensional curve or a two-dimensional surface. The metadata may include trajectory data for an audio object.

The rendering may involve imposing speaker zone constraints. For example, the apparatus may include a user input system. According to some implementations, the rendering may involve applying screen-to-room balance control according to screen-to-room balance control data received from the user input system.

The apparatus may include a display system. The logic system may be configured to control the display system to display a dynamic three-dimensional view of the reproduction environment.

The rendering may involve controlling audio object spread in one or more of three dimensions. The rendering may involve dynamic object blobbing in response to speaker overload. The rendering may involve mapping audio object locations to planes of speaker arrays of the reproduction environment.

The apparatus may include one or more non-transitory storage media, such as memory devices of a memory system. The memory devices may, for example, include random access memory (RAM), read-only memory (ROM), flash memory, one or more hard drives, etc. The interface system may include an interface between the logic system and one or more such memory devices. The interface system also may include a network interface.

The metadata may include speaker zone constraint metadata. The logic system may be configured for attenuating selected speaker feed signals by performing the following operations: computing first gains that include contributions from the selected speakers; computing second gains that do not include contributions from the selected speakers; and blending the first gains with the second gains. The logic system may be configured to determine whether to apply panning rules for an audio object position or to map an audio object position to a single speaker location. The logic system may be configured to smooth transitions in speaker gains when transitioning from mapping an audio object position from a first single speaker location to a second single speaker location. The logic system may be configured to smooth transitions in speaker gains when transitioning between mapping an audio object position to a single speaker location and applying panning rules for the audio object position. The logic system may be configured to compute speaker gains for audio object positions along a one-dimensional curve between virtual speaker positions.

Some methods described herein involve receiving audio reproduction data that includes one or more audio objects and associated metadata and receiving reproduction environment data that includes an indication of a number of reproduction speakers in the reproduction environment. The reproduction environment data may include an indication of the location of each reproduction speaker within the reproduction environment. The methods may involve rendering the audio objects into one or more speaker feed signals based, at least in part, on the associated metadata. Each speaker feed signal may correspond to at least one of the reproduction speakers within the reproduction environment. The reproduction environment may be a cinema sound system environment.

The rendering may involve creating an aggregate gain based on one or more of a desired audio object position, a distance from the desired audio object position to a reference position, a velocity of an audio object or an audio object content type. The metadata may include data for constraining a position of an audio object to a one-dimensional curve or a two-dimensional surface. The rendering may involve imposing speaker zone constraints.

Some implementations may be manifested in one or more non-transitory media having software stored thereon. The software may include instructions for controlling one or more devices to perform the following operations: receiving audio reproduction data comprising one or more audio objects and associated metadata; receiving reproduction environment data comprising an indication of a number of reproduction speakers in the reproduction environment and an indication of the location of each reproduction speaker within the reproduction environment; and rendering the audio objects into one or more speaker feed signals based, at least in part, on the associated metadata. Each speaker feed signal may corresponds to at least one of the reproduction speakers within the reproduction environment. The reproduction environment may, for example, be a cinema sound system environment.

The rendering may involve creating an aggregate gain based on one or more of a desired audio object position, a distance from the desired audio object position to a reference position, a velocity of an audio object or an audio object content type. The metadata may include data for constraining a position of an audio object to a one-dimensional curve or a two-dimensional surface. The rendering may involve imposing speaker zone constraints. The rendering may involve dynamic object blobbing in response to speaker overload.

Alternative devices and apparatus are described herein. Some such apparatus may include an interface system, a user input system and a logic system. The logic system may be configured for receiving audio data via the interface system, receiving a position of an audio object via the user input system or the interface system and determining a position of the audio object in a three-dimensional space. The determining may involve constraining the position to a one-dimensional curve or a two-dimensional surface within the three-dimensional space. The logic system may be configured for creating metadata associated with the audio object based, at least in part, on user input received via the user input system, the metadata including data indicating the position of the audio object in the three-dimensional space.

The metadata may include trajectory data indicating a time-variable position of the audio object within the three-dimensional space. The logic system may be configured to compute the trajectory data according to user input received via the user input system. The trajectory data may include a set of positions within the three-dimensional space at multiple time instances. The trajectory data may include an initial position, velocity data and acceleration data. The trajectory data may include an initial position and an equation that defines positions in three-dimensional space and corresponding times.

The apparatus may include a display system. The logic system may be configured to control the display system to display an audio object trajectory according to the trajectory data.

The logic system may be configured to create speaker zone constraint metadata according to user input received via the user input system. The speaker zone constraint metadata may include data for disabling selected speakers. The logic system may be configured to create speaker zone constraint metadata by mapping an audio object position to a single speaker.

The apparatus may include a sound reproduction system. The logic system may be configured to control the sound reproduction system, at least in part, according to the metadata.

The position of the audio object may be constrained to a one-dimensional curve. The logic system may be further configured to create virtual speaker positions along the one-dimensional curve.

Alternative methods are described herein. Some such methods involve receiving audio data, receiving a position of an audio object and determining a position of the audio object in a three-dimensional space. The determining may involve constraining the position to a one-dimensional curve or a two-dimensional surface within the three-dimensional space. The methods may involve creating metadata associated with the audio object based at least in part on user input.

The metadata may include data indicating the position of the audio object in the three-dimensional space. The metadata may include trajectory data indicating a time-variable position of the audio object within the three-dimensional space. Creating the metadata may involve creating speaker zone constraint metadata, e.g., according to user input. The speaker zone constraint metadata may include data for disabling selected speakers.

The position of the audio object may be constrained to a one-dimensional curve. The methods may involve creating virtual speaker positions along the one-dimensional curve.

Other aspects of this disclosure may be implemented in one or more non-transitory media having software stored thereon. The software may include instructions for controlling one or more devices to perform the following operations: receiving audio data; receiving a position of an audio object; and determining a position of the audio object in a three-dimensional space. The determining may involve constraining the position to a one-dimensional curve or a two-dimensional surface within the three-dimensional space. The software may include instructions for controlling one or more devices to create metadata associated with the audio object. The metadata may be created based, at least in part, on user input.

The metadata may include data indicating the position of the audio object in the three-dimensional space. The metadata may include trajectory data indicating a time-variable position of the audio object within the three-dimensional space. Creating the metadata may involve creating speaker zone constraint metadata, e.g., according to user input. The speaker zone constraint metadata may include data for disabling selected speakers.

The position of the audio object may be constrained to a one-dimensional curve. The software may include instructions for controlling one or more devices to create virtual speaker positions along the one-dimensional curve.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

The following description is directed to certain implementations for the purposes of describing some innovative aspects of this disclosure, as well as examples of contexts in which these innovative aspects may be implemented. However, the teachings herein can be applied in various different ways. For example, while various implementations have been described in terms of particular reproduction environments, the teachings herein are widely applicable to other known reproduction environments, as well as reproduction environments that may be introduced in the future. Similarly, whereas examples of graphical user interfaces (GUIs) are presented herein, some of which provide examples of speaker locations, speaker zones, etc., other implementations are contemplated by the inventors. Moreover, the described implementations may be implemented in various authoring and/or rendering tools, which may be implemented in a variety of hardware, software, firmware, etc. Accordingly, the teachings of this disclosure are not intended to be limited to the implementations shown in the figures and/or described herein, but instead have wide applicability.

Figure 1:
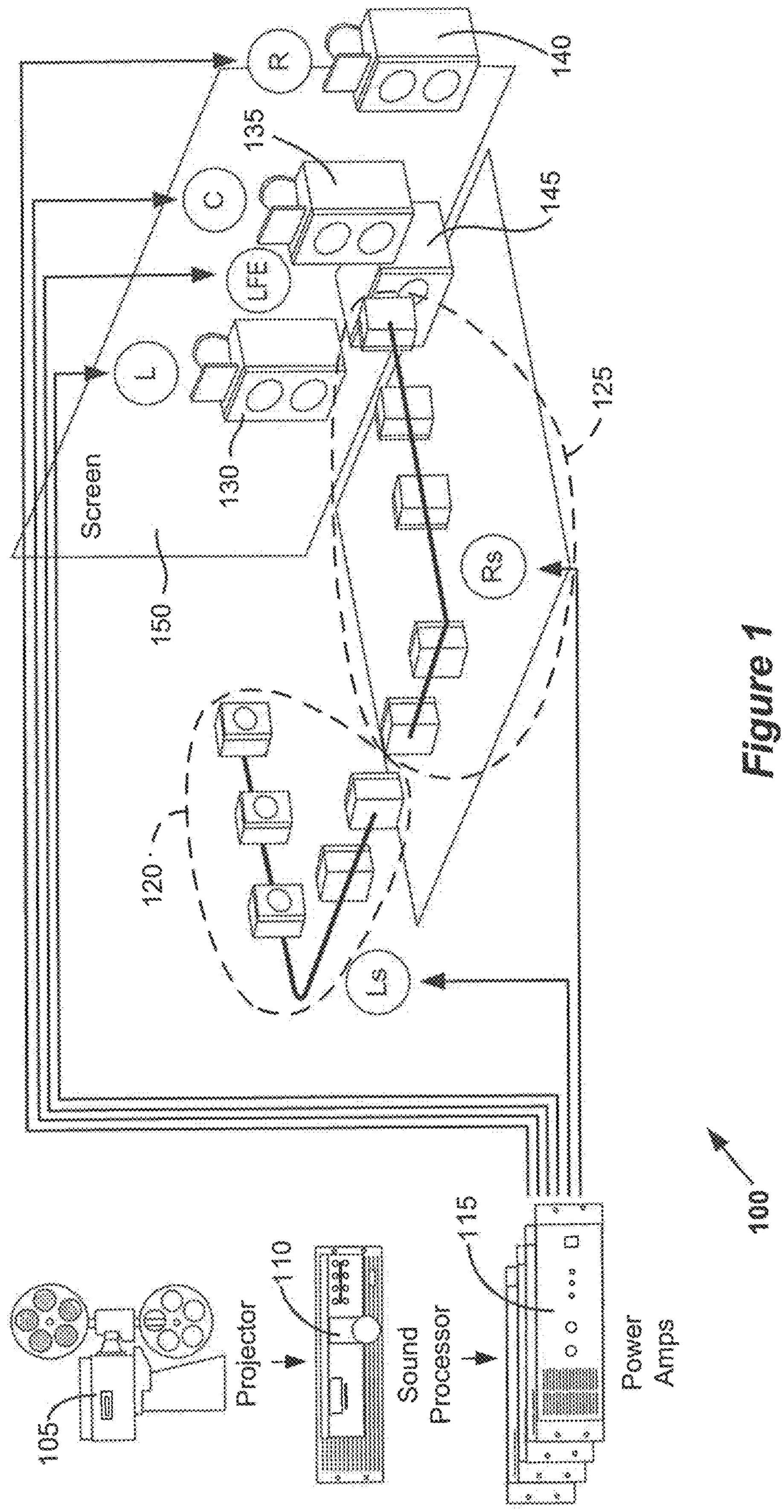
FIG. 1 shows an example of a reproduction environment having a Dolby Surround 5.1 configuration.

FIG. 1 shows an example of a reproduction environment having a Dolby Surround 5.1 configuration. Dolby Surround 5.1 was developed in the 1990s, but this configuration is still widely deployed in cinema sound system environments. A projector 105 may be configured to project video images, e.g. for a movie, on the screen 150. Audio reproduction data may be synchronized with the video images and processed by the sound processor 110. The power amplifiers 115 may provide speaker feed signals to speakers of the reproduction environment 100.

The Dolby Surround 5.1 configuration includes left surround array 120, right surround array 125, each of which is gang-driven by a single channel. The Dolby Surround configuration also includes separate channels for the left screen channel 130, the center screen channel 135 and the right screen channel 140. A separate channel for the subwoofer 145 is provided for low-frequency effects (LFE).

Figure 2:
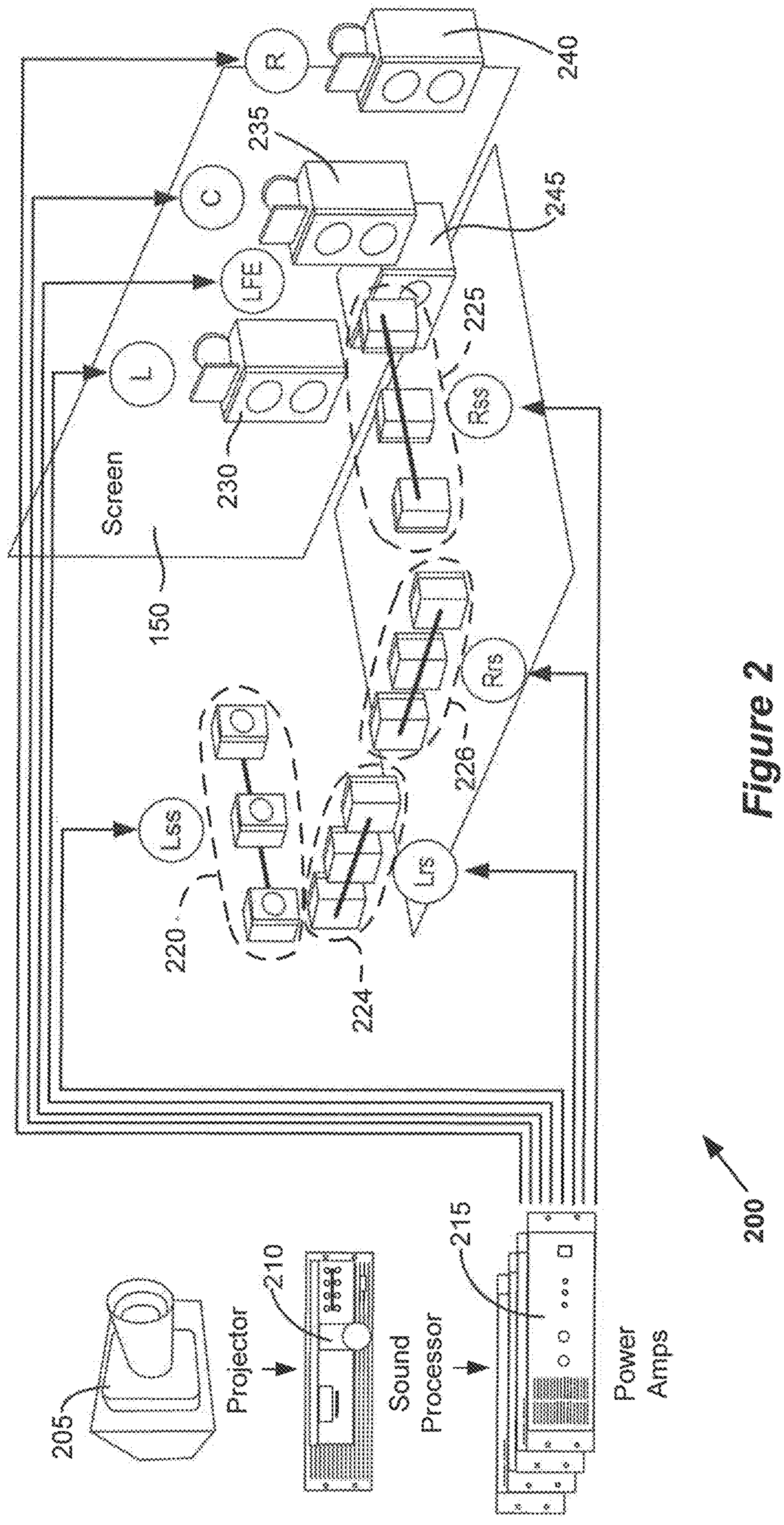
FIG. 2 shows an example of a reproduction environment having a Dolby Surround 7.1 configuration.

In 2010, Dolby provided enhancements to digital cinema sound by introducing Dolby Surround 7.1. FIG. 2 shows an example of a reproduction environment having a Dolby Surround 7.1 configuration. A digital projector 205 may be configured to receive digital video data and to project video images on the screen 150. Audio reproduction data may be processed by the sound processor 210. The power amplifiers 215 may provide speaker feed signals to speakers of the reproduction environment 200.

The Dolby Surround 7.1 configuration includes the left side surround array 220 and the right side surround array 225, each of which may be driven by a single channel. Like Dolby Surround 5.1, the Dolby Surround 7.1 configuration includes separate channels for the left screen channel 230, the center screen channel 235, the right screen channel 240 and the subwoofer 245. However, Dolby Surround 7.1 increases the number of surround channels by splitting the left and right surround channels of Dolby Surround 5.1 into four zones: in addition to the left side surround array 220 and the right side surround array 225, separate channels are included for the left rear surround speakers 224 and the right rear surround speakers 226. Increasing the number of surround zones within the reproduction environment 200 can significantly improve the localization of sound.

In an effort to create a more immersive environment, some reproduction environments may be configured with increased numbers of speakers, driven by increased numbers of channels. Moreover, some reproduction environments may include speakers deployed at various elevations, some of which may be above a seating area of the reproduction environment.

Figure 3:
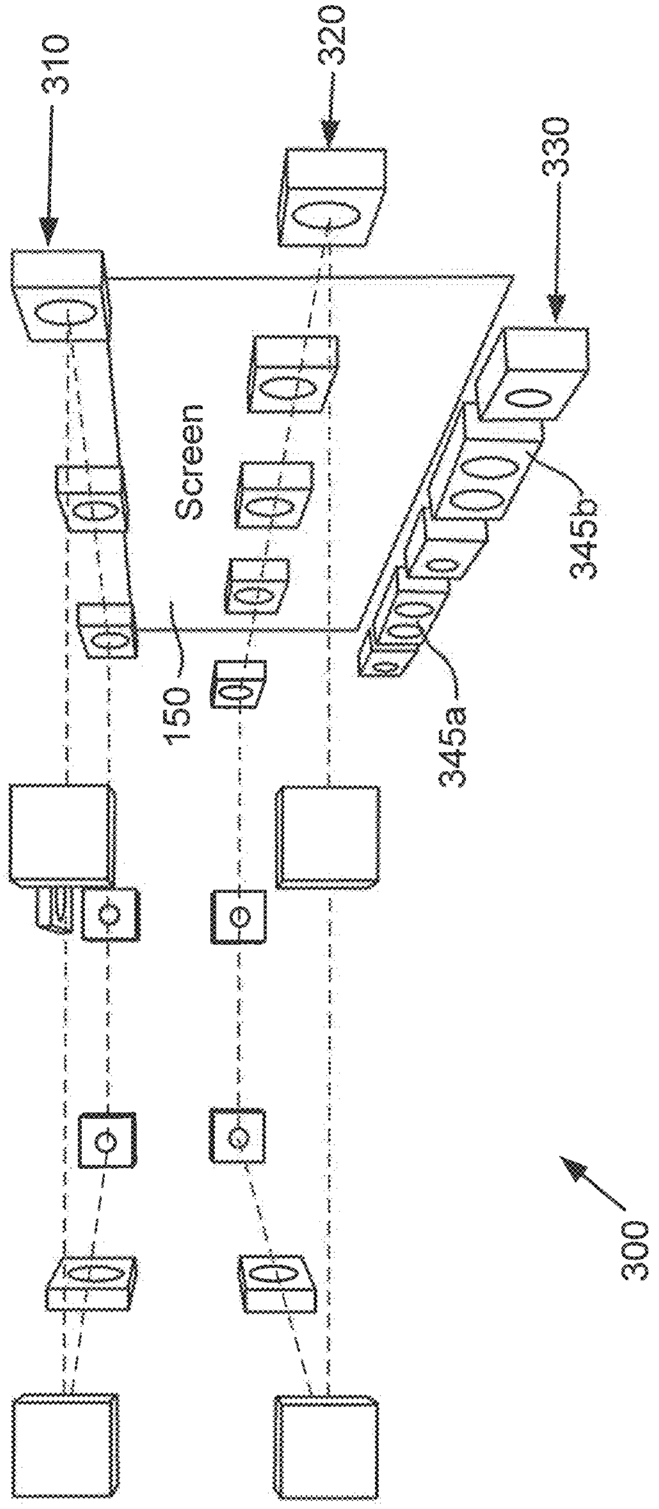
FIG. 3 shows an example of a reproduction environment having a Hamasaki 22.2 surround sound configuration.

FIG. 3 shows an example of a reproduction environment having a Hamasaki 22.2 surround sound configuration. Hamasaki 22.2 was developed at NHK Science & Technology Research Laboratories in Japan as the surround sound component of Ultra High Definition Television. Hamasaki 22.2 provides 24 speaker channels, which may be used to drive speakers arranged in three layers. Upper speaker layer 310 of reproduction environment 300 may be driven by 9 channels. Middle speaker layer 320 may be driven by channels. Lower speaker layer 330 may be driven by 5 channels, two of which are for the subwoofers 345*a* and 345*b*.

Accordingly, the modern trend is to include not only more speakers and more channels, but also to include speakers at differing heights. As the number of channels increases and the speaker layout transitions from a 2D array to a 3D array, the tasks of positioning and rendering sounds becomes increasingly difficult.

This disclosure provides various tools, as well as related user interfaces, which increase functionality and/or reduce authoring complexity for a 3D audio sound system.

Figure 4A:
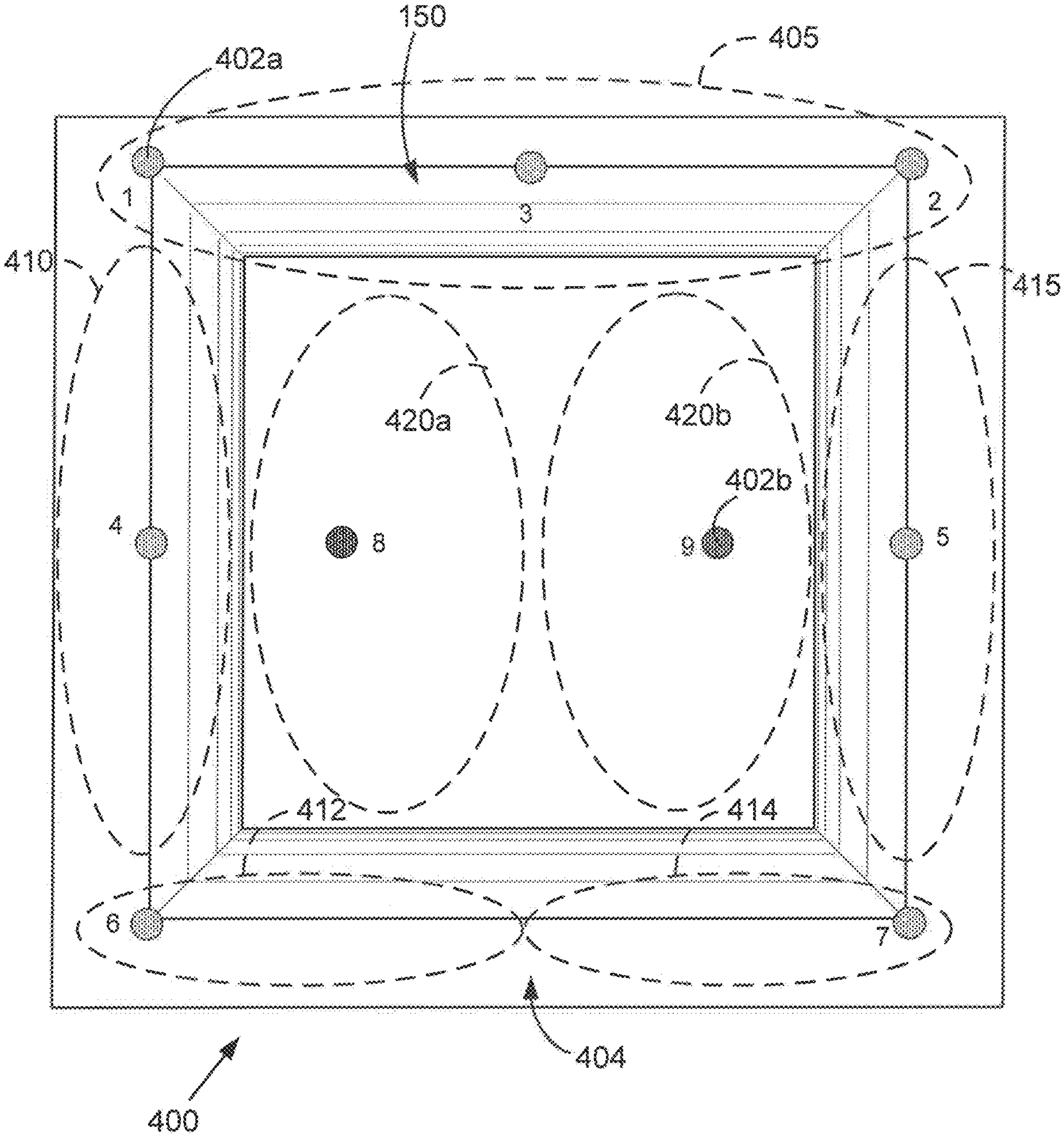
FIG. 4A shows an example of a graphical user interface (GUI) that portrays speaker zones at varying elevations in a virtual reproduction environment.

FIG. 4A shows an example of a graphical user interface (GUI) that portrays speaker zones at varying elevations in a virtual reproduction environment. GUI 400 may, for example, be displayed on a display device according to instructions from a logic system, according to signals received from user input devices, etc. Some such devices are described below with reference to FIG. 21.

As used herein with reference to virtual reproduction environments such as the virtual reproduction environment 404, the term "speaker zone" generally refers to a logical construct that may or may not have a one-to-one correspondence with a reproduction speaker of an actual reproduction environment. For example, a "speaker zone location" may or may not correspond to a particular reproduction speaker location of a cinema reproduction environment. Instead, the term "speaker zone location" may refer generally to a zone of a virtual reproduction environment. In some implementations, a speaker zone of a virtual reproduction environment may correspond to a virtual speaker, e.g., via the use of virtualizing technology such as Dolby Headphone™ (sometimes referred to as Mobile Surround™), which creates a virtual surround sound environment in real time using a set of two-channel stereo headphones. In GUI 400, there are seven speaker zones 402*a* at a first elevation and two speaker zones 402*b* at a second elevation, making a total of nine speaker zones in the virtual reproduction environment 404. In this example, speaker zones 1-3 are in the front area 405 of the virtual reproduction environment 404. The front area 405 may correspond, for example, to an area of a cinema reproduction environment in which a screen 150 is located, to an area of a home in which a television screen is located, etc.

Here, speaker zone 4 corresponds generally to speakers in the left area 410 and speaker zone 5 corresponds to speakers in the right area 415 of the virtual reproduction environment 404. Speaker zone 6 corresponds to a left rear area 412 and speaker zone 7 corresponds to a right rear area 414 of the virtual reproduction environment 404. Speaker zone 8 corresponds to speakers in an upper area 420*a* and speaker zone 9 corresponds to speakers in an upper area 420*b*, which may be a virtual ceiling area such as an area of the virtual ceiling 520 shown in FIGS. 5D and 5E. Accordingly, and as described in more detail below, the locations of speaker zones 1-9 that are shown in FIG. 4A may or may not correspond to the locations of reproduction speakers of an actual reproduction environment. Moreover, other implementations may include more or fewer speaker zones and/or elevations.

In various implementations described herein, a user interface such as GUI 400 may be used as part of an authoring tool and/or a rendering tool. In some implementations, the authoring tool and/or rendering tool may be implemented via software stored on one or more non-transitory media. The authoring tool and/or rendering tool may be implemented (at least in part) by hardware, firmware, etc., such as the logic system and other devices described below with reference to FIG. 21. In some authoring implementations, an associated authoring tool may be used to create metadata for associated audio data. The metadata may, for example, include data indicating the position and/or trajectory of an audio object in a three-dimensional space, speaker zone constraint data, etc. The metadata may be created with respect to the speaker zones 402 of the virtual reproduction environment 404, rather than with respect to a particular speaker layout of an actual reproduction environment. A rendering tool may receive audio data and associated metadata, and may compute audio gains and speaker feed signals for a reproduction environment. Such audio gains and speaker feed signals may be computed according to an amplitude panning process, which can create a perception that a sound is coming from a position P in the reproduction environment. For example, speaker feed signals may be provided to reproduction speakers 1 through N of the reproduction environment according to the following equation:

$$x_i(t)=g_i x(t),\ i=1, \ldots N \qquad \text{(Equation 1)}$$

In Equation 1, $x_i(t)$ represents the speaker feed signal to be applied to speaker i, $g_i$ represents the gain factor of the corresponding channel, x(t) represents the audio signal and t represents time. The gain factors may be determined, for example, according to the amplitude panning methods described in Section 2, pages 3-4 of V. Pulkki, *Compensating Displacement of Amplitude-Panned Virtual Sources* (Audio Engineering Society (AES) International Conference on Virtual, Synthetic and Entertainment Audio), which is hereby incorporated by reference. In some implementations, the gains may be frequency dependent. In some implementations, a time delay may be introduced by replacing x(t) by x(t−Δt).

In some rendering implementations, audio reproduction data created with reference to the speaker zones 402 may be mapped to speaker locations of a wide range of reproduction environments, which may be in a Dolby Surround 5.1 configuration, a Dolby Surround 7.1 configuration, a Hamasaki 22.2 configuration, or another configuration. For example, referring to FIG. 2, a rendering tool may map audio reproduction data for speaker zones 4 and 5 to the left side surround array 220 and the right side surround array 225 of a reproduction environment having a Dolby Surround 7.1 configuration. Audio reproduction data for speaker zones 1, 2 and 3 may be mapped to the left screen channel 230, the right screen channel 240 and the center screen channel 235, respectively. Audio reproduction data for speaker zones 6 and 7 may be mapped to the left rear surround speakers 224 and the right rear surround speakers 226.

Figure 4B:
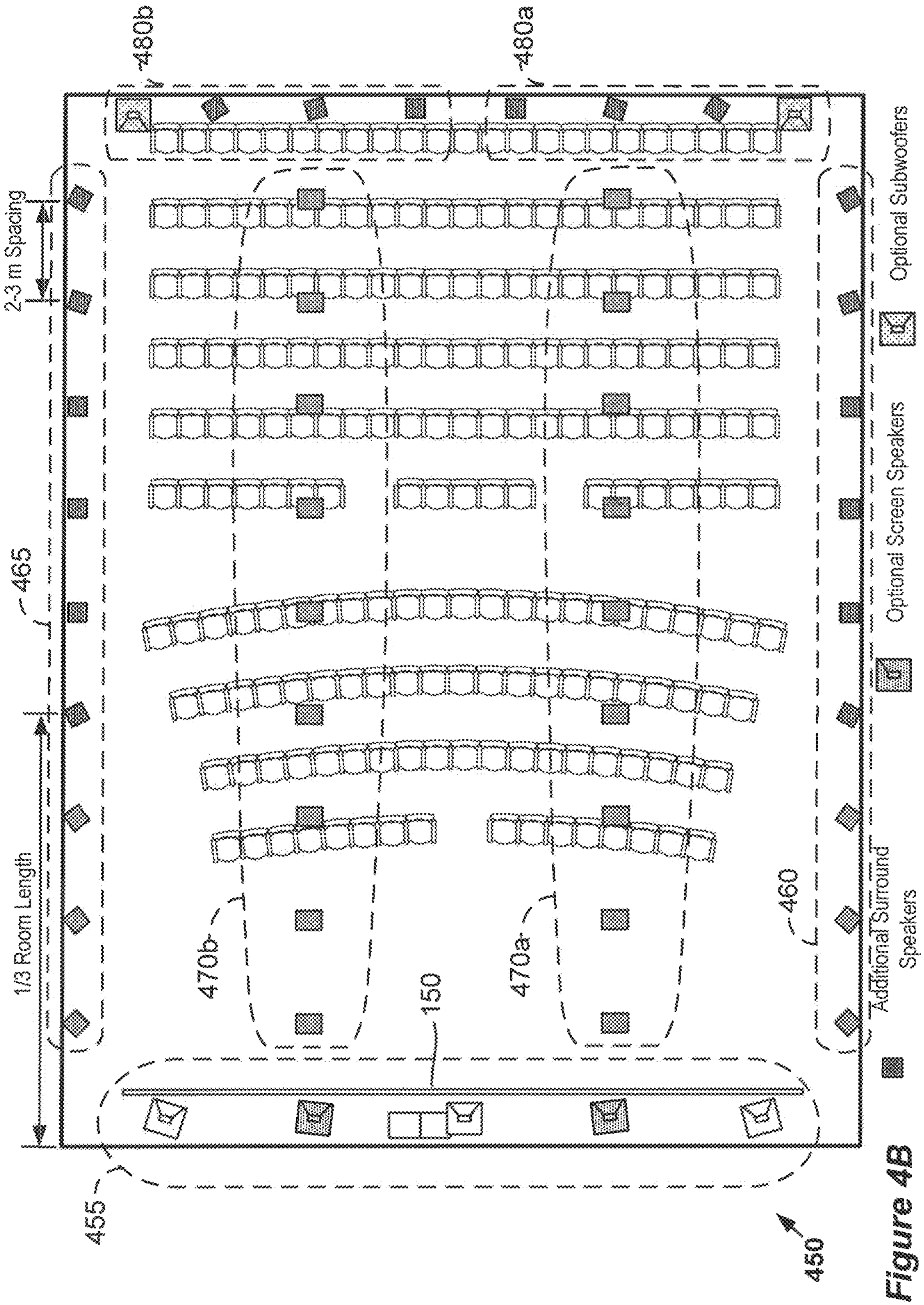
FIG. 4B shows an example of another reproduction environment.

FIG. 4B shows an example of another reproduction environment. In some implementations, a rendering tool may map audio reproduction data for speaker zones 1, 2 and 3 to corresponding screen speakers 455 of the reproduction environment 450. A rendering tool may map audio reproduction data for speaker zones 4 and 5 to the left side surround array 460 and the right side surround array 465 and may map audio reproduction data for speaker zones 8 and 9 to left overhead speakers 470*a* and right overhead speakers 470*b*. Audio reproduction data for speaker zones 6 and 7 may be mapped to left rear surround speakers 480*a* and right rear surround speakers 480*b*.

In some authoring implementations, an authoring tool may be used to create metadata for audio objects. As used herein, the term "audio object" may refer to a stream of audio data and associated metadata. The metadata typically indicates the 3D position of the object, rendering constraints as well as content type (e.g. dialog, effects, etc.). Depending on the implementation, the metadata may include other types of data, such as width data, gain data, trajectory data, etc. Some audio objects may be static, whereas others may move. Audio object details may be authored or rendered according to the associated metadata which, among other things, may indicate the position of the audio object in a three-dimensional space at a given point in time. When audio objects are monitored or played back in a reproduction environment, the audio objects may be rendered according to the positional metadata using the reproduction speakers that are present in the reproduction environment, rather than being output to a predetermined physical channel, as is the case with traditional channel-based systems such as Dolby 5.1 and Dolby 7.1.

Various authoring and rendering tools are described herein with reference to a GUI that is substantially the same as the GUI 400. However, various other user interfaces, including but not limited to GUIs, may be used in association with these authoring and rendering tools. Some such tools can simplify the authoring process by applying various types of constraints. Some implementations will now be described with reference to FIG. 5A et seq.

Figure 5A:
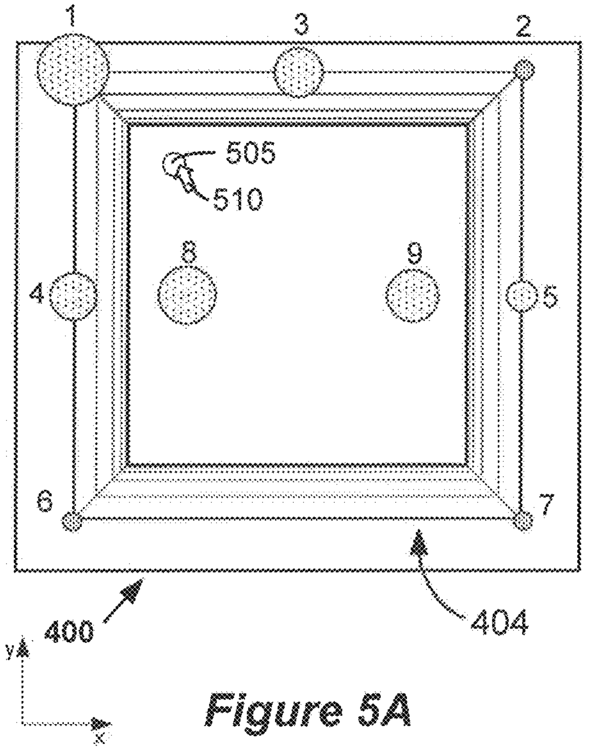
FIGS. 5A-5C show examples of speaker responses corresponding to an audio object having a position that is constrained to a two-dimensional surface of a three-dimensional space.
Figure 5B:
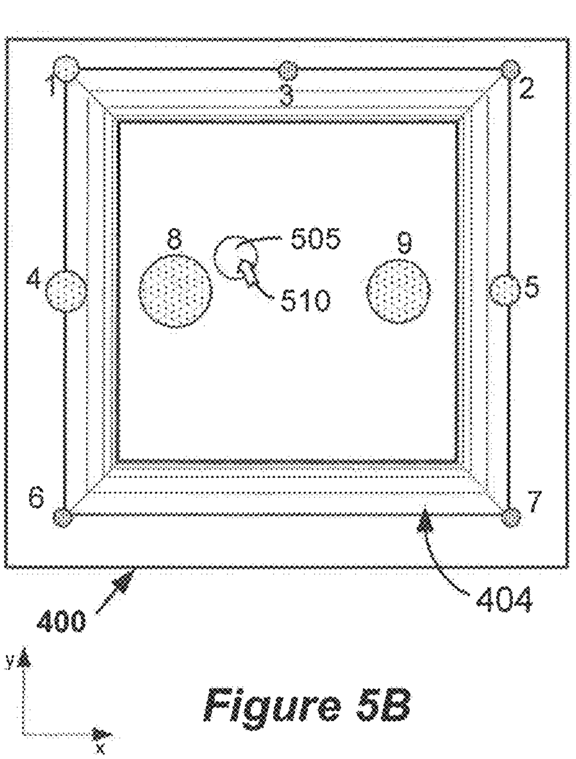
Figure 5C:
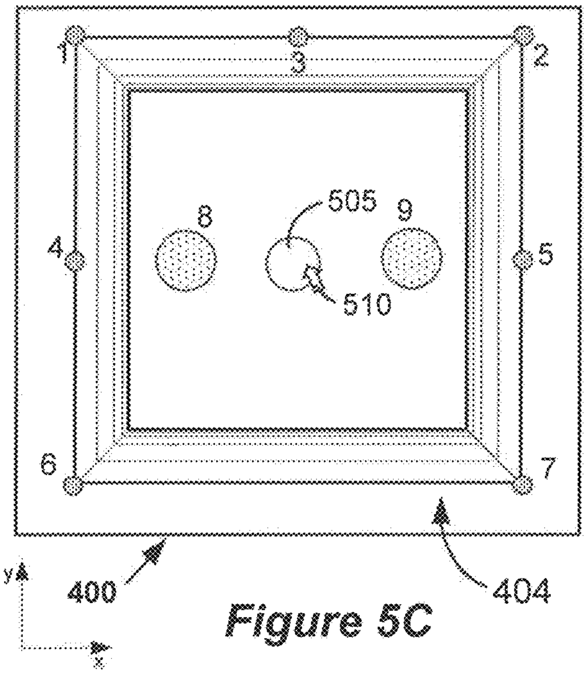

FIGS. 5A-5C show examples of speaker responses corresponding to an audio object having a position that is constrained to a two-dimensional surface of a three-dimensional space, which is a hemisphere in this example. In these examples, the speaker responses have been computed by a renderer assuming a 9-speaker configuration, with each speaker corresponding to one of the speaker zones 1-9. However, as noted elsewhere herein, there may not generally be a one-to-one mapping between speaker zones of a virtual reproduction environment and reproduction speakers in a reproduction environment. Referring first to FIG. 5A, the audio object 505 is shown in a location in the left front portion of the virtual reproduction environment 404. Accordingly, the speaker corresponding to speaker zone 1 indicates a substantial gain and the speakers corresponding to speaker zones 3 and 4 indicate moderate gains.

In this example, the location of the audio object 505 may be changed by placing a cursor 510 on the audio object 505 and "dragging" the audio object 505 to a desired location in the x,y plane of the virtual reproduction environment 404. As the object is dragged towards the middle of the reproduction environment, it is also mapped to the surface of a hemisphere and its elevation increases. Here, increases in the elevation of the audio object 505 are indicated by an increase in the diameter of the circle that represents the audio object 505: as shown in FIGS. 5B and 5C, as the audio object 505 is dragged to the top center of the virtual reproduction environment 404, the audio object 505 appears increasingly larger. Alternatively, or additionally, the elevation of the audio object 505 may be indicated by changes in color, brightness, a numerical elevation indication, etc. When the audio object 505 is positioned at the top center of the virtual reproduction environment 404, as shown in FIG. 5C, the speakers corresponding to speaker zones 8 and 9 indicate substantial gains and the other speakers indicate little or no gain.

Figure 5D:
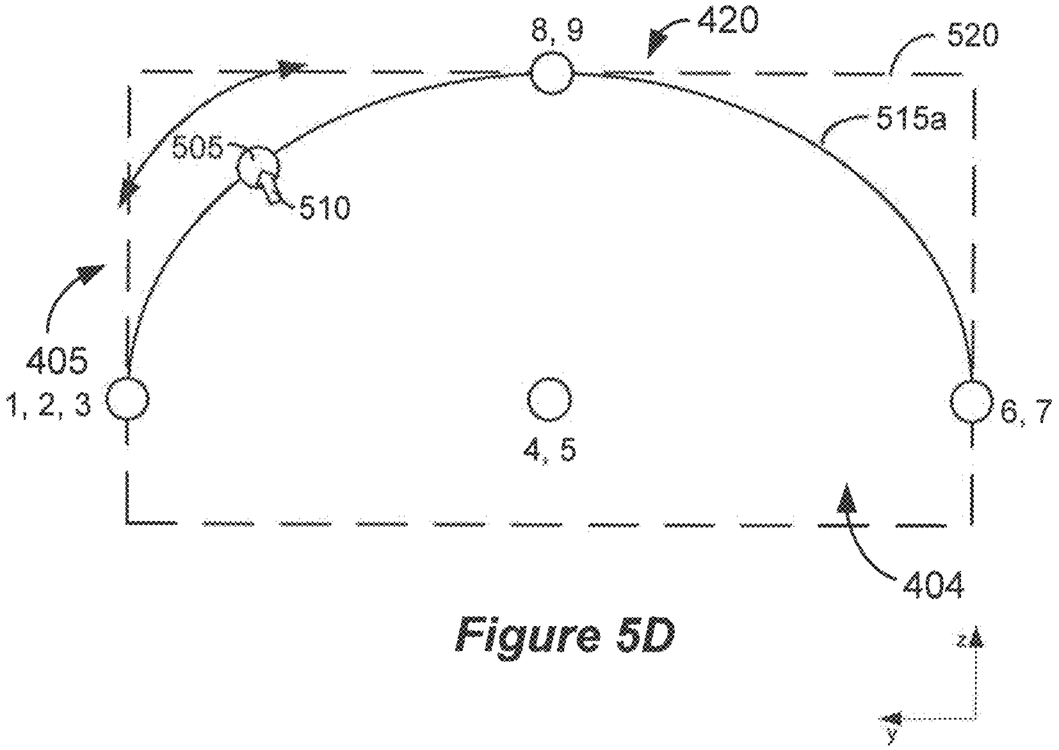
FIGS. 5D and 5E show examples of two-dimensional surfaces to which an audio object may be constrained.
Figure 5E:
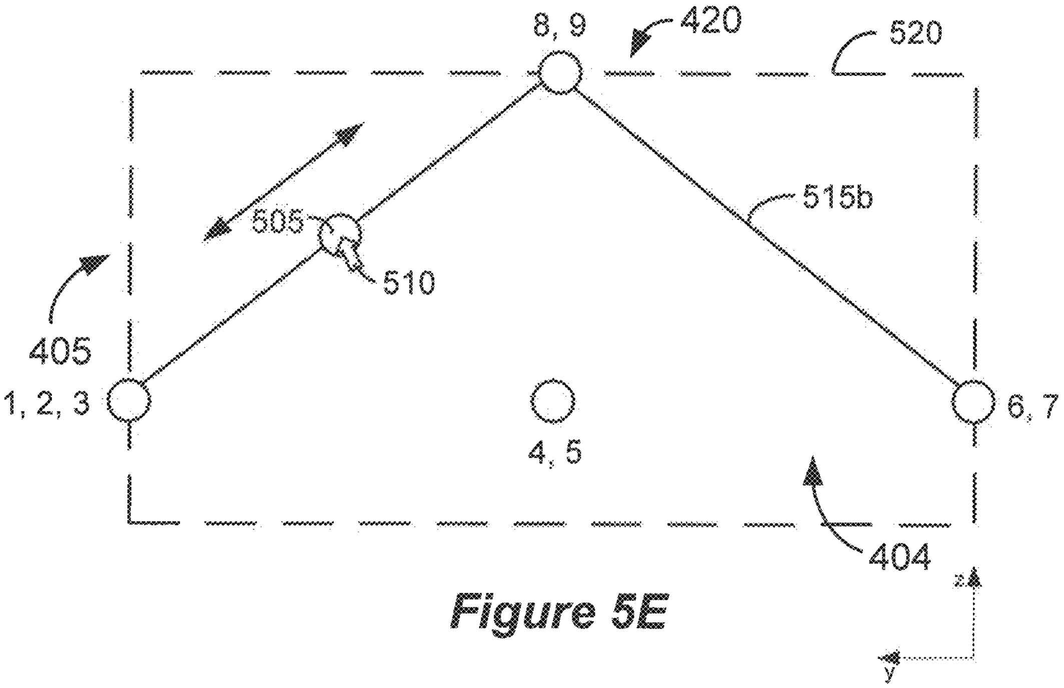

In this implementation, the position of the audio object 505 is constrained to a two-dimensional surface, such as a spherical surface, an elliptical surface, a conical surface, a cylindrical surface, a wedge, etc. FIGS. 5D and 5E show examples of two-dimensional surfaces to which an audio object may be constrained. FIGS. 5D and 5E are crosssectional views through the virtual reproduction environment 404, with the front area 405 shown on the left. In FIGS. 5D and 5E, the y values of the y-z axis increase in the direction of the front area 405 of the virtual reproduction environment 404, to retain consistency with the orientations of the x-y axes shown in FIGS. 5A-5C.

In the example shown in FIG. 5D, the two-dimensional surface 515*a* is a section of an ellipsoid. In the example shown in FIG. 5E, the two-dimensional surface 515*b* is a section of a wedge. However, the shapes, orientations and positions of the two-dimensional surfaces 515 shown in FIGS. 5D and 5E are merely examples. In alternative implementations, at least a portion of the two-dimensional surface 515 may extend outside of the virtual reproduction environment 404. In some such implementations, the two-dimensional surface 515 may extend above the virtual ceiling 520. Accordingly, the three-dimensional space within which the two-dimensional surface 515 extends is not necessarily co-extensive with the volume of the virtual reproduction environment 404. In yet other implementations, an audio object may be constrained to one-dimensional features such as curves, straight lines, etc.

Figure 6A:
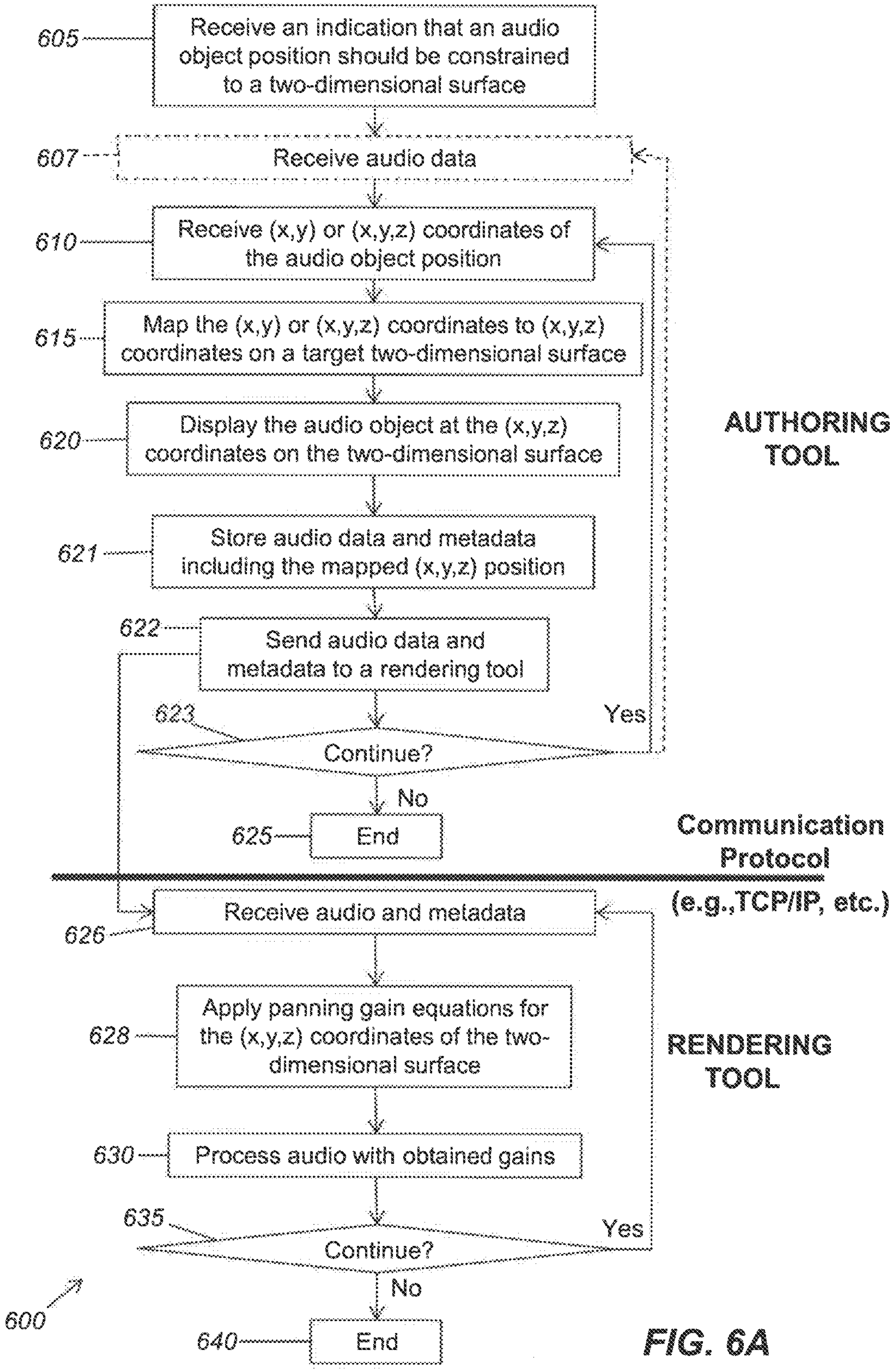
FIG. 6A is a flow diagram that outlines one example of a process of constraining positions of an audio object to a two-dimensional surface.

FIG. 6A is a flow diagram that outlines one example of a process of constraining positions of an audio object to a two-dimensional surface. As with other flow diagrams that are provided herein, the operations of the process 600 are not necessarily performed in the order shown. Moreover, the process 600 (and other processes provided herein) may include more or fewer operations than those that are indicated in the drawings and/or described. In this example, blocks 605 through 622 are performed by an authoring tool and blocks 624 through 630 are performed by a rendering tool. The authoring tool and the rendering tool may be implemented in a single apparatus or in more than one apparatus. Although FIG. 6A (and other flow diagrams provided herein) may create the impression that the authoring and rendering processes are performed in sequential manner, in many implementations the authoring and rendering processes are performed at substantially the same time. Authoring processes and rendering processes may be interactive. For example, the results of an authoring operation may be sent to the rendering tool, the corresponding results of the rendering tool may be evaluated by a user, who may perform further authoring based on these results, etc.

In block 605, an indication is received that an audio object position should be constrained to a two-dimensional surface. The indication may, for example, be received by a logic system of an apparatus that is configured to provide authoring and/or rendering tools. As with other implementations described herein, the logic system may be operating according to instructions of software stored in a non-transitory medium, according to firmware, etc. The indication may be a signal from a user input device (such as a touch screen, a mouse, a track ball, a gesture recognition device, etc.) in response to input from a user.

In optional block 607, audio data are received. Block 607 is optional in this example, as audio data also may go directly to a renderer from another source (e.g., a mixing console) that is time synchronized to the metadata authoring tool. In some such implementations, an implicit mechanism may exist to tie each audio stream to a corresponding incoming metadata stream to form an audio object. For example, the metadata stream may contain an identifier for the audio object it represents, e.g., a numerical value from 1 to N. If the rendering apparatus is configured with audio inputs that are also numbered from 1 to N, the rendering tool may automatically assume that an audio object is formed by the metadata stream identified with a numerical value (e.g., 1) and audio data received on the first audio input. Similarly, any metadata stream identified as number 2 may form an object with the audio received on the second audio input channel. In some implementations, the audio and metadata may be pre-packaged by the authoring tool to form audio objects and the audio objects may be provided to the rendering tool, e.g., sent over a network as TCP/IP packets.

In alternative implementations, the authoring tool may send only the metadata on the network and the rendering tool may receive audio from another source (e.g., via a pulse-code modulation (PCM) stream, via analog audio, etc.). In such implementations, the rendering tool may be configured to group the audio data and metadata to form the audio objects. The audio data may, for example, be received by the logic system via an interface. The interface may, for example, be a network interface, an audio interface (e.g., an interface configured for communication via the AES3 standard developed by the Audio Engineering Society and the European Broadcasting Union, also known as AES/EBU, via the Multichannel Audio Digital Interface (MADI) protocol, via analog signals, etc.) or an interface between the logic system and a memory device. In this example, the data received by the renderer includes at least one audio object.

In block 610, (x,y) or (x,y,z) coordinates of an audio object position are received. Block 610 may, for example, involve receiving an initial position of the audio object. Block 610 may also involve receiving an indication that a user has positioned or re-positioned the audio object, e.g. as described above with reference to FIGS. 5A-5C. The coordinates of the audio object are mapped to a two-dimensional surface in block 615. The two-dimensional surface may be similar to one of those described above with reference to FIGS. 5D and 5E, or it may be a different two-dimensional surface. In this example, each point of the x-y plane will be mapped to a single z value, so block 615 involves mapping the x and y coordinates received in block 610 to a value of z. In other implementations, different mapping processes and/or coordinate systems may be used. The audio object may be displayed (block 620) at the (x,y,z) location that is determined in block 615. The audio data and metadata, including the mapped (x,y,z) location that is determined in block 615, may be stored in block 621. The audio data and metadata may be sent to a rendering tool (block 622). In some implementations, the metadata may be sent continuously while some authoring operations are being performed, e.g., while the audio object is being positioned, constrained, displayed in the GUI 400, etc.

In block 623, it is determined whether the authoring process will continue. For example, the authoring process may end (block 625) upon receipt of input from a user interface indicating that a user no longer wishes to constrain audio object positions to a two-dimensional surface. Otherwise, the authoring process may continue, e.g., by reverting to block 607 or block 610. In some implementations, rendering operations may continue whether or not the authoring process continues. In some implementations, audio objects may be recorded to disk on the authoring platform and then played back from a dedicated sound processor or cinema server connected to a sound processor, e.g., a sound processor similar the sound processor 210 of FIG. 2, for exhibition purposes.

In some implementations, the rendering tool may be software that is running on an apparatus that is configured to provide authoring functionality. In other implementations, the rendering tool may be provided on another device. The type of communication protocol used for communication between the authoring tool and the rendering tool may vary according to whether both tools are running on the same device or whether they are communicating over a network.

In block 626, the audio data and metadata (including the (x,y,z) position(s) determined in block 615) are received by the rendering tool. In alternative implementations, audio data and metadata may be received separately and interpreted by the rendering tool as an audio object through an implicit mechanism. As noted above, for example, a metadata stream may contain an audio object identification code (e.g., 1, 2, 3, etc.) and may be attached respectively with the first, second, third audio inputs (i.e., digital or analog audio connection) on the rendering system to form an audio object that can be rendered to the loudspeakers During the rendering operations of the process 600 (and other rendering operations described herein, the panning gain equations may be applied according to the reproduction speaker layout of a particular reproduction environment. Accordingly, the logic system of the rendering tool may receive reproduction environment data comprising an indication of a number of reproduction speakers in the reproduction environment and an indication of the location of each reproduction speaker within the reproduction environment. These data may be received, for example, by accessing a data structure that is stored in a memory accessible by the logic system or received via an interface system.

In this example, panning gain equations are applied for the (x,y,z) position(s) to determine gain values (block 628) to apply to the audio data (block 630). In some implementations, audio data that have been adjusted in level in response to the gain values may be reproduced by reproduction speakers, e.g., by speakers of headphones (or other speakers) that are configured for communication with a logic system of the rendering tool. In some implementations, the reproduction speaker locations may correspond to the locations of the speaker zones of a virtual reproduction environment, such as the virtual reproduction environment 404 described above. The corresponding speaker responses may be displayed on a display device, e.g., as shown in FIGS. 5A-5C.

In block 635, it is determined whether the process will continue. For example, the process may end (block 640) upon receipt of input from a user interface indicating that a user no longer wishes to continue the rendering process. Otherwise, the process may continue, e.g., by reverting to block 626. If the logic system receives an indication that the user wishes to revert to the corresponding authoring process, the process 600 may revert to block 607 or block 610.

Figure 6B:
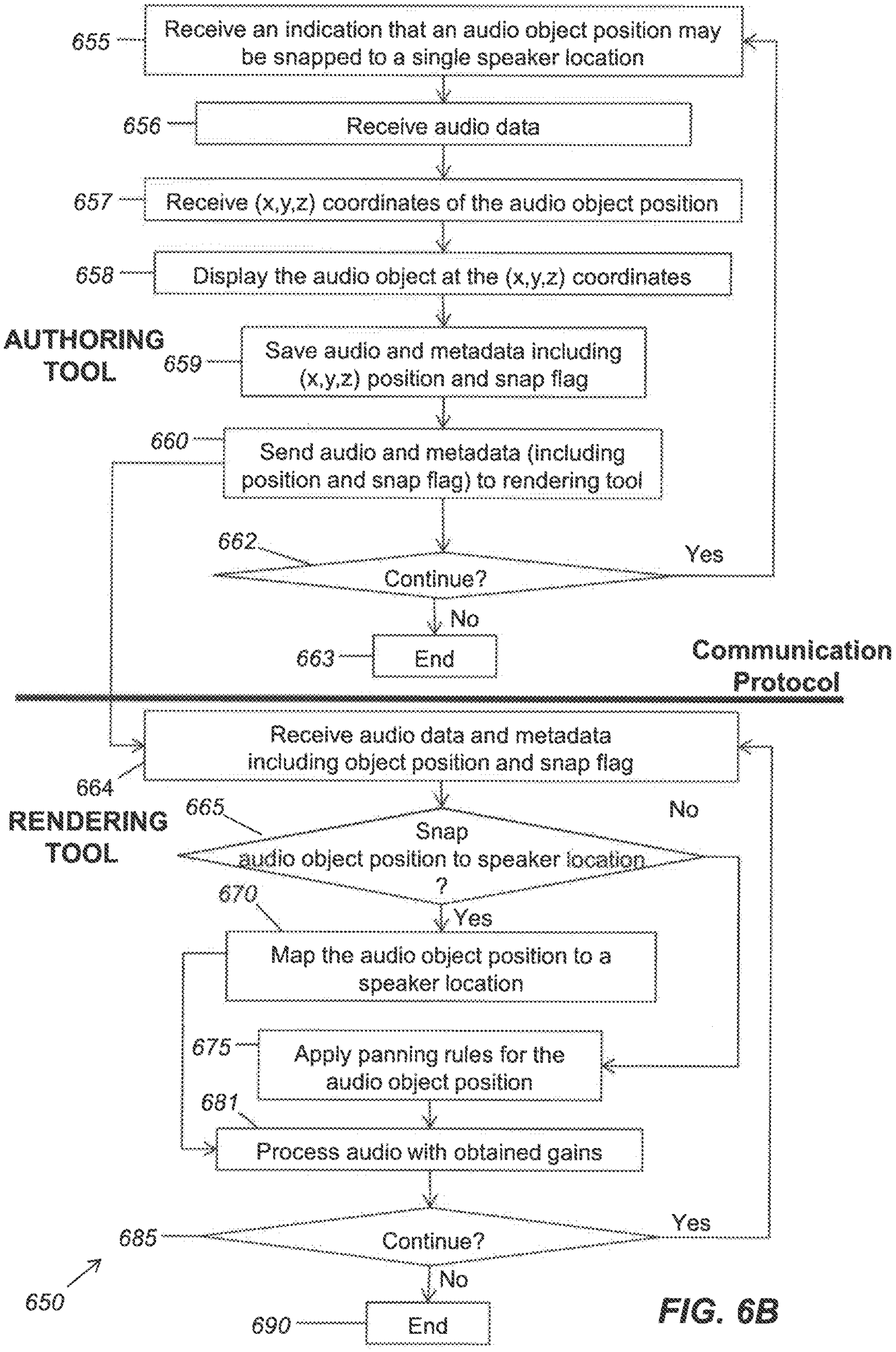
FIG. 6B is a flow diagram that outlines one example of a process of mapping an audio object position to a single speaker location or a single speaker zone.

Other implementations may involve imposing various other types of constraints and creating other types of constraint metadata for audio objects. FIG. 6B is a flow diagram that outlines one example of a process of mapping an audio object position to a single speaker location. This process also may be referred to herein as "snapping." In block 655, an indication is received that an audio object position may be snapped to a single speaker location or a single speaker zone. In this example, the indication is that the audio object position will be snapped to a single speaker location, when appropriate. The indication may, for example, be received by a logic system of an apparatus that is configured to provide authoring tools. The indication may correspond with input received from a user input device. However, the indication also may correspond with a category of the audio object (e.g., as a bullet sound, a vocalization, etc.) and/or a width of the audio object. Information regarding the category and/or width may, for example, be received as metadata for the audio object. In such implementations, block 657 may occur before block 655.

In block 656, audio data are received. Coordinates of an audio object position are received in block 657. In this example, the audio object position is displayed (block 658) according to the coordinates received in block 657. Metadata, including the audio object coordinates and a snap flag, indicating the snapping functionality, are saved in block 659. The audio data and metadata are sent by the authoring tool to a rendering tool (block 660).

In block 662, it is determined whether the authoring process will continue. For example, the authoring process may end (block 663) upon receipt of input from a user interface indicating that a user no longer wishes to snap audio object positions to a speaker location. Otherwise, the authoring process may continue, e.g., by reverting to block 665. In some implementations, rendering operations may continue whether or not the authoring process continues.

The audio data and metadata sent by the authoring tool are received by the rendering tool in block 664. In block 665, it is determined (e.g., by the logic system) whether to snap the audio object position to a speaker location. This determination may be based, at least in part, on the distance between the audio object position and the nearest reproduction speaker location of a reproduction environment.

In this example, if it is determined in block 665 to snap the audio object position to a speaker location, the audio object position will be mapped to a speaker location in block 670, generally the one closest to the intended (x,y,z) position received for the audio object. In this case, the gain for audio data reproduced by this speaker location will be 1.0, whereas the gain for audio data reproduced by other speakers will be zero. In alternative implementations, the audio object position may be mapped to a group of speaker locations in block 670.

For example, referring again to FIG. 4B, block 670 may involve snapping the position of the audio object to one of the left overhead speakers 470*a*. Alternatively, block 670 may involve snapping the position of the audio object to a single speaker and neighboring speakers, e.g., 1 or 2 neighboring speakers. Accordingly, the corresponding metadata may apply to a small group of reproduction speakers and/or to an individual reproduction speaker.

However, if it is determined in block 665 that the audio object position will not be snapped to a speaker location, for instance if this would result in a large discrepancy in position relative to the original intended position received for the object, panning rules will be applied (block 675). The panning rules may be applied according to the audio object position, as well as other characteristics of the audio object (such as width, volume, etc.)

Gain data determined in block 675 may be applied to audio data in block 681 and the result may be saved. In some implementations, the resulting audio data may be reproduced by speakers that are configured for communication with the logic system. If it is determined in block 685 that the process 650 will continue, the process 650 may revert to block 664 to continue rendering operations. Alternatively, the process 650 may revert to block 655 to resume authoring operations.

Process 650 may involve various types of smoothing operations. For example, the logic system may be configured to smooth transitions in the gains applied to audio data when transitioning from mapping an audio object position from a first single speaker location to a second single speaker location. Referring again to FIG. 4B, if the position of the audio object were initially mapped to one of the left overhead speakers 470*a* and later mapped to one of the right rear surround speakers 480*b*, the logic system may be configured to smooth the transition between speakers so that the audio object does not seem to suddenly "jump" from one speaker (or speaker zone) to another. In some implementations, the smoothing may be implemented according to a crossfade rate parameter.

In some implementations, the logic system may be configured to smooth transitions in the gains applied to audio data when transitioning between mapping an audio object position to a single speaker location and applying panning rules for the audio object position. For example, if it were subsequently determined in block 665 that the position of the audio object had been moved to a position that was determined to be too far from the closest speaker, panning rules for the audio object position may be applied in block 675. However, when transitioning from snapping to panning (or vice versa), the logic system may be configured to smooth transitions in the gains applied to audio data. The process may end in block 690, e.g., upon receipt of corresponding input from a user interface.

Some alternative implementations may involve creating logical constraints. In some instances, for example, a sound mixer may desire more explicit control over the set of speakers that is being used during a particular panning operation. Some implementations allow a user to generate one- or two-dimensional "logical mappings" between sets of speakers and a panning interface.

Figure 7:
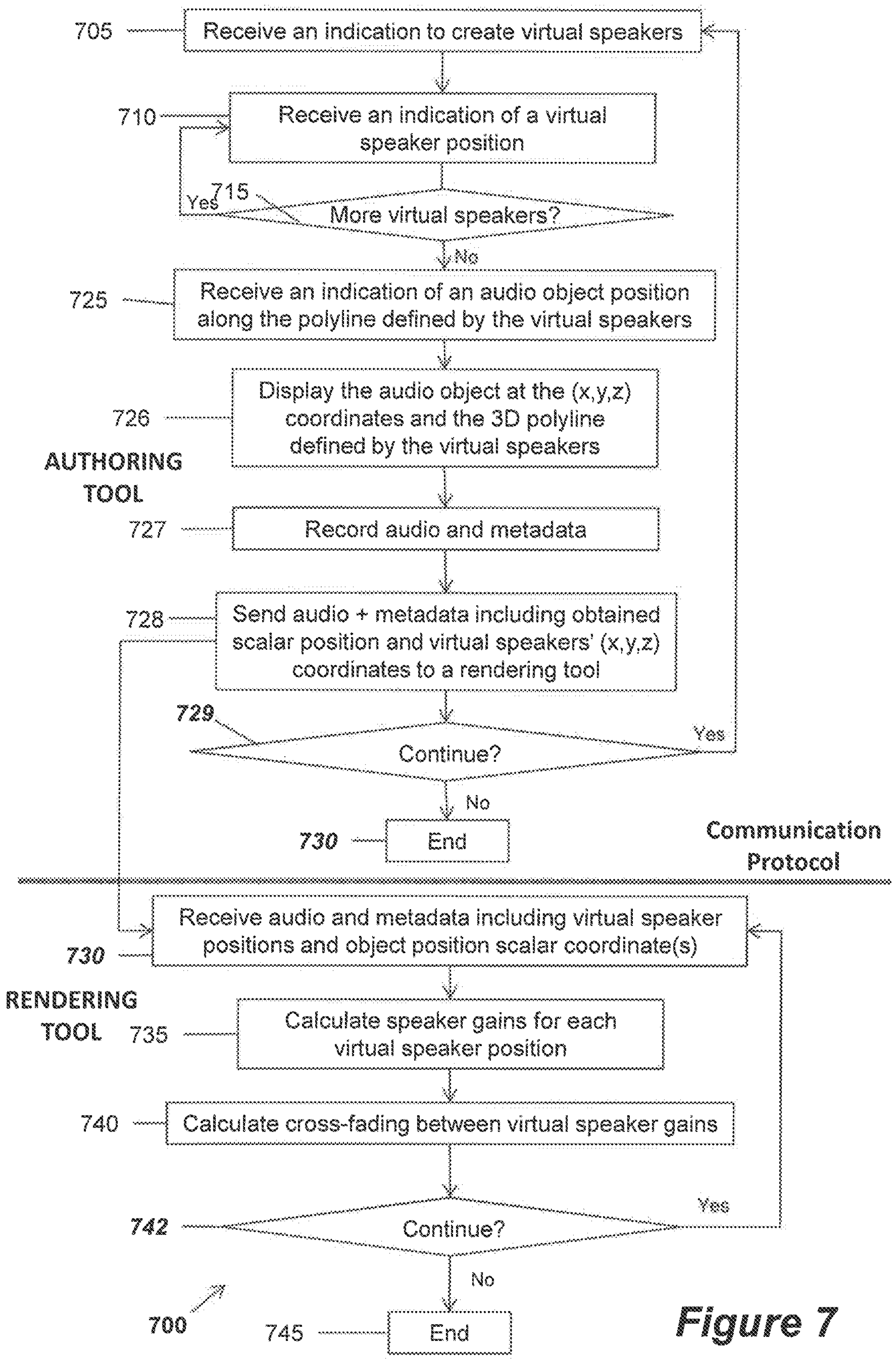
FIG. 7 is a flow diagram that outlines a process of establishing and using virtual speakers.
Figure 8A:
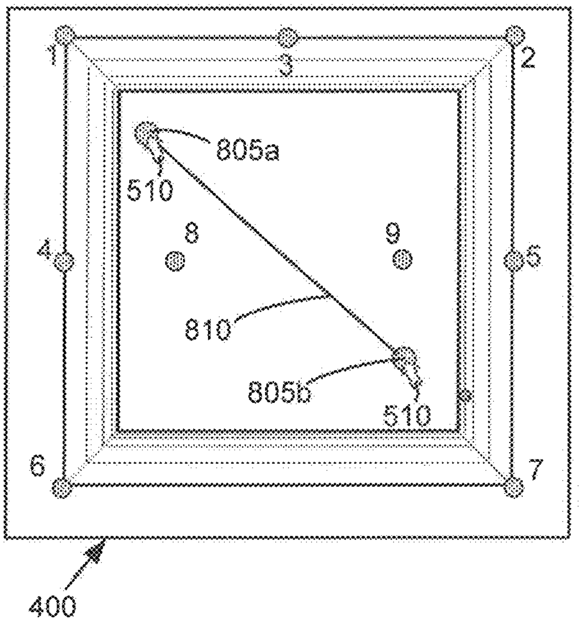
FIGS. 8A-8C show examples of virtual speakers mapped to line endpoints and corresponding speaker responses.
Figure 8B:
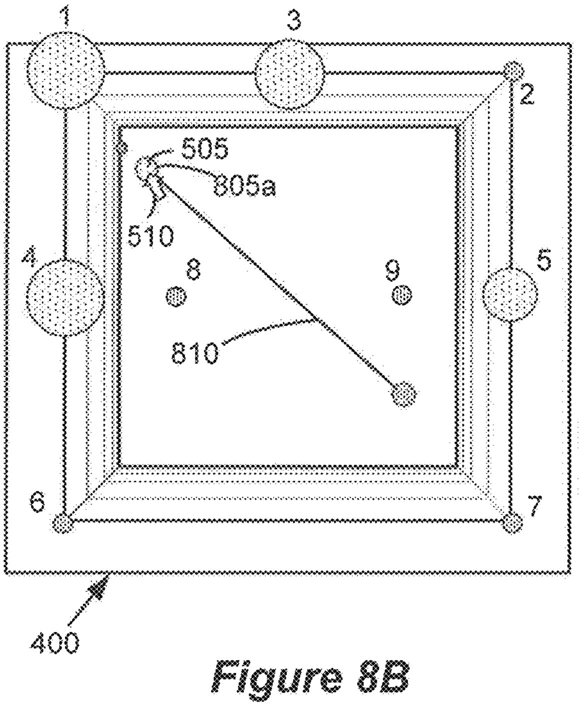
Figure 8C:
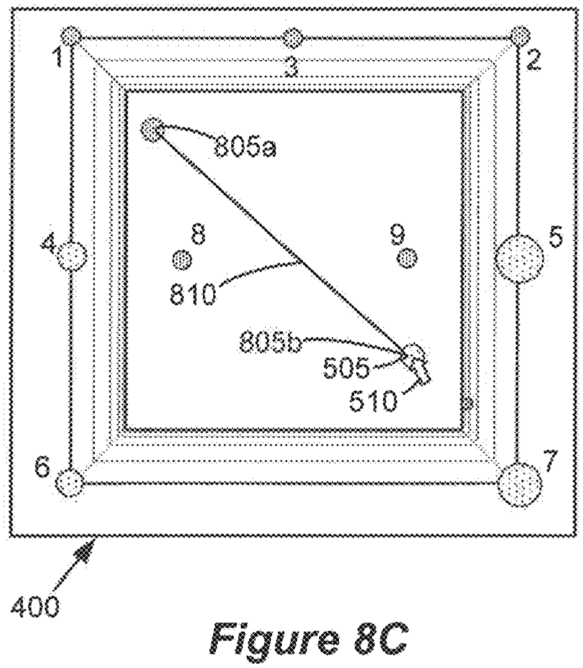

FIG. 7 is a flow diagram that outlines a process of establishing and using virtual speakers. FIGS. 8A-8C show examples of virtual speakers mapped to line endpoints and corresponding speaker zone responses. Referring first to process 700 of FIG. 7, an indication is received in block 705 to create virtual speakers. The indication may be received, for example, by a logic system of an authoring apparatus and may correspond with input received from a user input device.

In block 710, an indication of a virtual speaker location is received. For example, referring to FIG. 8A, a user may use a user input device to position the cursor 510 at the position of the virtual speaker 805*a* and to select that location, e.g., via a mouse click. In block 715, it is determined (e.g., according to user input) that additional virtual speakers will be selected in this example. The process reverts to block 710 and the user selects the position of the virtual speaker 805*b*, shown in FIG. 8A, in this example.

In this instance, the user only desires to establish two virtual speaker locations. Therefore, in block 715, it is determined (e.g., according to user input) that no additional virtual speakers will be selected. A polyline 810 may be displayed, as shown in FIG. 8A, connecting the positions of the virtual speaker 805*a* and 805*b*. In some implementations, the position of the audio object 505 will be constrained to the polyline 810. In some implementations, the position of the audio object 505 may be constrained to a parametric curve. For example, a set of control points may be provided according to user input and a curve-fitting algorithm, such as a spline, may be used to determine the parametric curve. In block 725, an indication of an audio object position along the polyline 810 is received. In some such implementations, the position will be indicated as a scalar value between zero and one. In block 725, (x,y,z) coordinates of the audio object and the polyline defined by the virtual speakers may be displayed. Audio data and associated metadata, including the obtained scalar position and the virtual speakers' (x,y,z) coordinates, may be displayed. (Block 727.) Here, the audio data and metadata may be sent to a rendering tool via an appropriate communication protocol in block 728.

In block 729, it is determined whether the authoring process will continue. If not, the process 700 may end (block 730) or may continue to rendering operations, according to user input. As noted above, however, in many implementations at least some rendering operations may be performed concurrently with authoring operations.

In block 732, the audio data and metadata are received by the rendering tool. In block 735, the gains to be applied to the audio data are computed for each virtual speaker position. FIG. 8B shows the speaker responses for the position of the virtual speaker 805*a*. FIG. 8C shows the speaker responses for the position of the virtual speaker 805*b*. In this example, as in many other examples described herein, the indicated speaker responses are for reproduction speakers that have locations corresponding with the locations shown for the speaker zones of the GUI 400. Here, the virtual speakers 805*a* and 805*b*, and the line 810, have been positioned in a plane that is not near reproduction speakers that have locations corresponding with the speaker zones 8 and 9. Therefore, no gain for these speakers is indicated in FIG. 8B or 8C.

When the user moves the audio object 505 to other positions along the line 810, the logic system will calculate cross-fading that corresponds to these positions (block 740), e.g., according to the audio object scalar position parameter. In some implementations, a pair-wise panning law (e.g. an energy preserving sine or power law) may be used to blend between the gains to be applied to the audio data for the position of the virtual speaker 805*a* and the gains to be applied to the audio data for the position of the virtual speaker 805*b*.

In block 742, it may be then be determined (e.g., according to user input) whether to continue the process 700. A user may, for example, be presented (e.g., via a GUI) with the option of continuing with rendering operations or of reverting to authoring operations. If it is determined that the process 700 will not continue, the process ends. (Block 745.)

When panning rapidly-moving audio objects (for example, audio objects that correspond to cars, jets, etc.), it may be difficult to author a smooth trajectory if audio object positions are selected by a user one point at a time. The lack of smoothness in the audio object trajectory may influence the perceived sound image. Accordingly, some authoring implementations provided herein apply a low-pass filter to the position of an audio object in order to smooth the resulting panning gains. Alternative authoring implementations apply a low-pass filter to the gain applied to audio data.

Other authoring implementations may allow a user to simulate grabbing, pulling, throwing or similarly interacting with audio objects. Some such implementations may involve the application of simulated physical laws, such as rule sets that are used to describe velocity, acceleration, momentum, kinetic energy, the application of forces, etc.

Figure 9A:
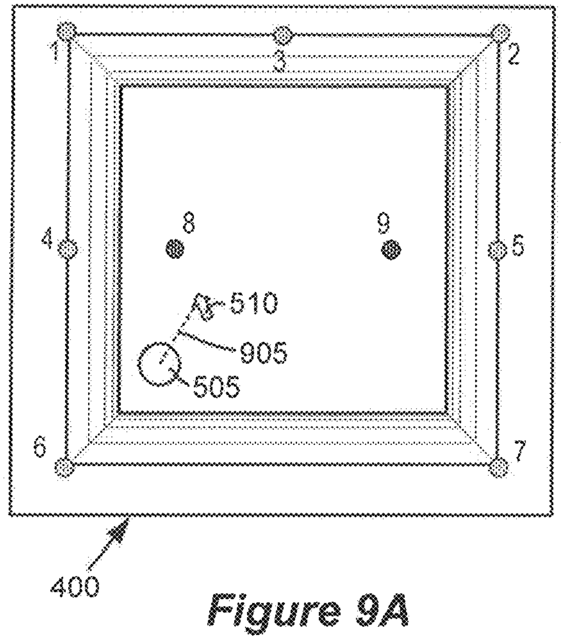
FIGS. 9A-9C show examples of using a virtual tether to move an audio object.
Figure 9B:
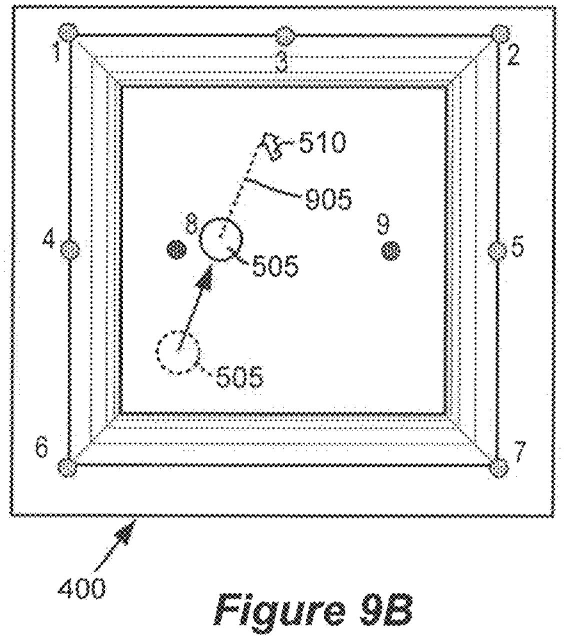
Figure 9C:
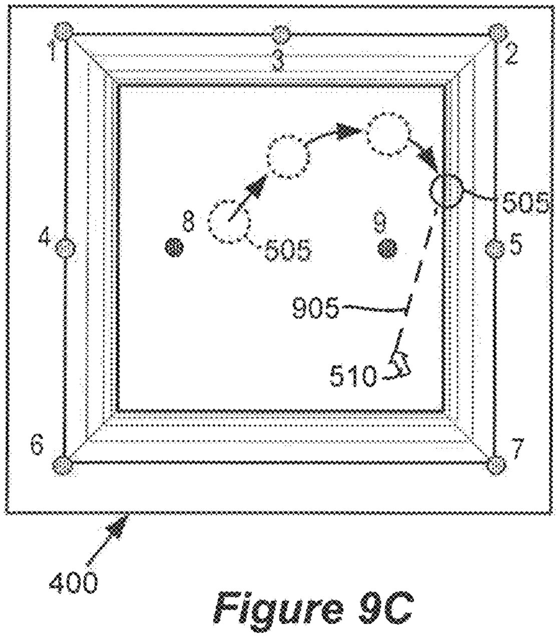

FIGS. 9A-9C show examples of using a virtual tether to drag an audio object. In FIG. 9A, a virtual tether 905 has been formed between the audio object 505 and the cursor 510. In this example, the virtual tether 905 has a virtual spring constant. In some such implementations, the virtual spring constant may be selectable according to user input.

FIG. 9B shows the audio object 505 and the cursor 510 at a subsequent time, after which the user has moved the cursor 510 towards speaker zone 3. The user may have moved the cursor 510 using a mouse, a joystick, a track ball, a gesture detection apparatus, or another type of user input device. The virtual tether 905 has been stretched and the audio object 505 has been moved near speaker zone 8. The audio object 505 is approximately the same size in FIGS. 9A and 9B, which indicates (in this example) that the elevation of the audio object 505 has not substantially changed.

FIG. 9C shows the audio object 505 and the cursor 510 at a later time, after which the user has moved the cursor around speaker zone 9. The virtual tether 905 has been stretched yet further. The audio object 505 has been moved downwards, as indicated by the decrease in size of the audio object 505. The audio object 505 has been moved in a smooth arc. This example illustrates one potential benefit of such implementations, which is that the audio object 505 may be moved in a smoother trajectory than if a user is merely selecting positions for the audio object 505 point by point.

Figure 10A:
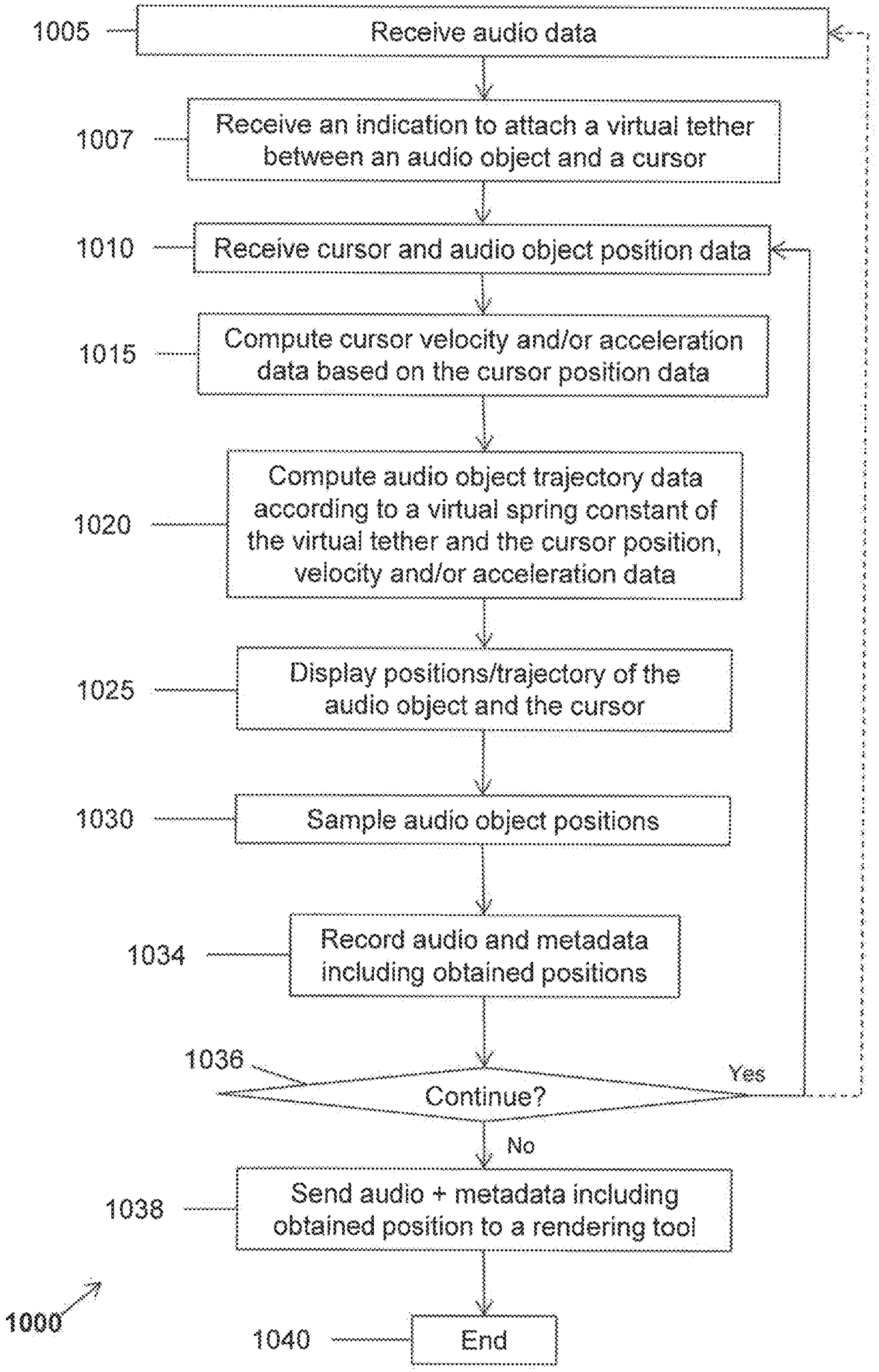
FIG. 10A is a flow diagram that outlines a process of using a virtual tether to move an audio object.

FIG. 10A is a flow diagram that outlines a process of using a virtual tether to move an audio object. Process 1000 begins with block 1005, in which audio data are received. In block 1007, an indication is received to attach a virtual tether between an audio object and a cursor. The indication may be received by a logic system of an authoring apparatus and may correspond with input received from a user input device. Referring to FIG. 9A, for example, a user may position the cursor 510 over the audio object 505 and then indicate, via a user input device or a GUI, that the virtual tether 905 should be formed between the cursor 510 and the audio object 505. Cursor and object position data may be received. (Block 1010.)

In this example, cursor velocity and/or acceleration data may be computed by the logic system according to cursor position data, as the cursor 510 is moved. (Block 1015.) Position data and/or trajectory data for the audio object 505 may be computed according to the virtual spring constant of the virtual tether 905 and the cursor position, velocity and acceleration data. Some such implementations may involve assigning a virtual mass to the audio object 505. (Block 1020.) For example, if the cursor 510 is moved at a relatively constant velocity, the virtual tether 905 may not stretch and the audio object 505 may be pulled along at the relatively constant velocity. If the cursor 510 accelerates, the virtual tether 905 may be stretched and a corresponding force may be applied to the audio object 505 by the virtual tether 905. There may be a time lag between the acceleration of the cursor 510 and the force applied by the virtual tether 905. In alternative implementations, the position and/or trajectory of the audio object 505 may be determined in a different fashion, e.g., without assigning a virtual spring constant to the virtual tether 905, by applying friction and/or inertia rules to the audio object 505, etc.

Discrete positions and/or the trajectory of the audio object 505 and the cursor 510 may be displayed (block 1025). In this example, the logic system samples audio object positions at a time interval (block 1030). In some such implementations, the user may determine the time interval for sampling. The audio object location and/or trajectory metadata, etc., may be saved. (Block 1034.)

In block 1036 it is determined whether this authoring mode will continue. The process may continue if the user so desires, e.g., by reverting to block 1005 or block 1010. Otherwise, the process 1000 may end (block 1040).

Figure 10B:
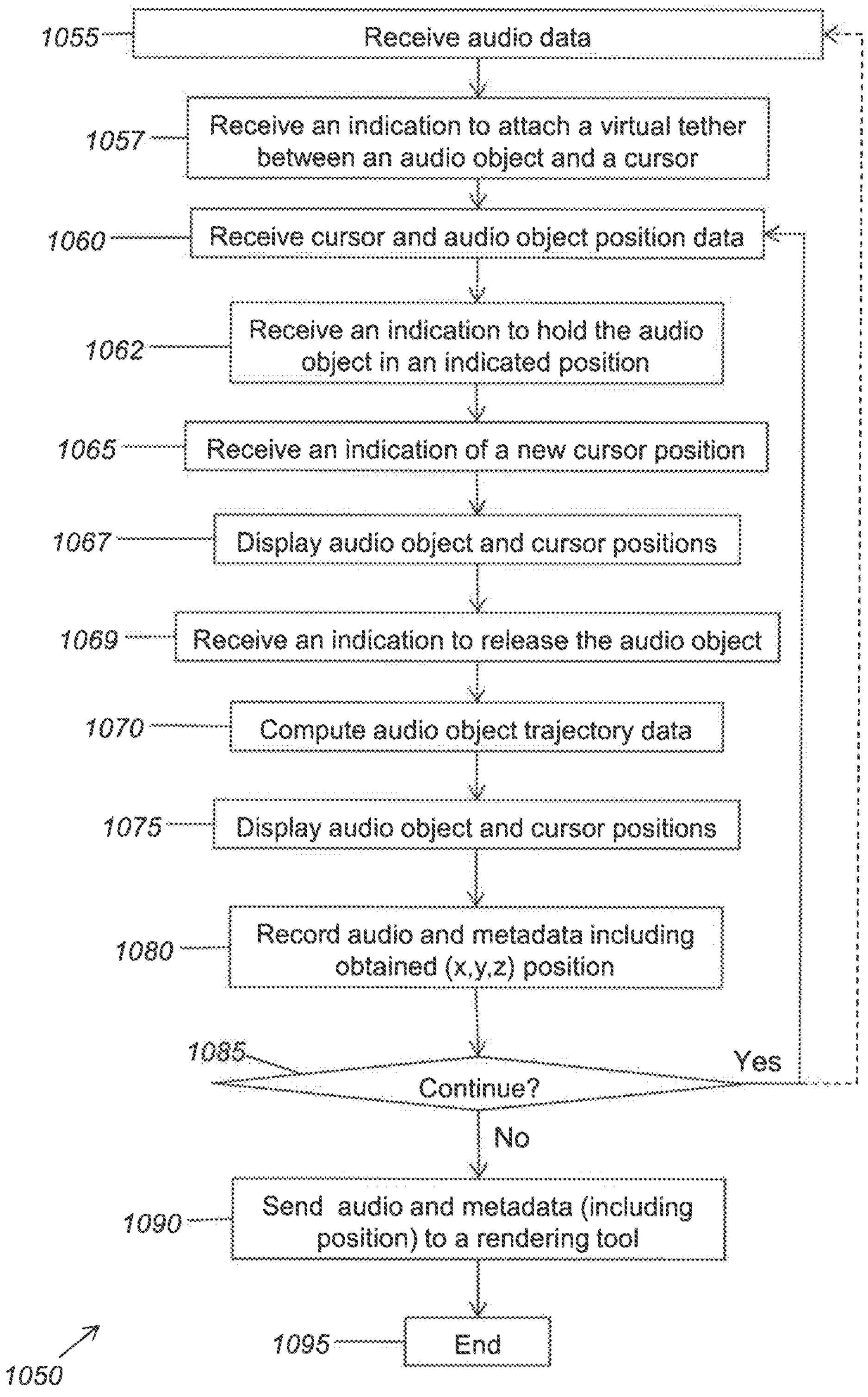
FIG. 10B is a flow diagram that outlines an alternative process of using a virtual tether to move an audio object.
Figure 10C:
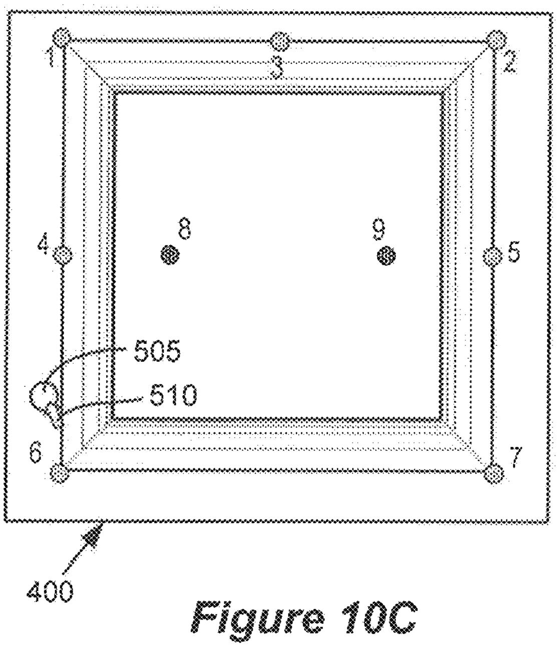
FIGS. 10C-10E show examples of the process outlined in FIG. 10B.
Figure 10D:
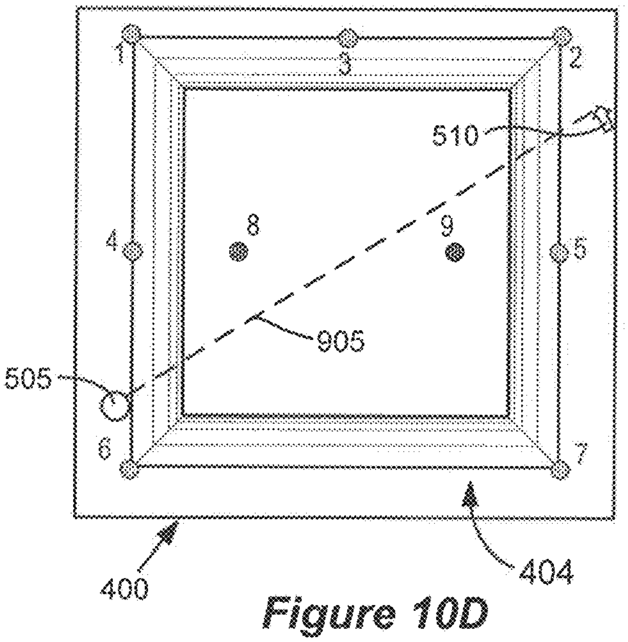
Figure 10E:
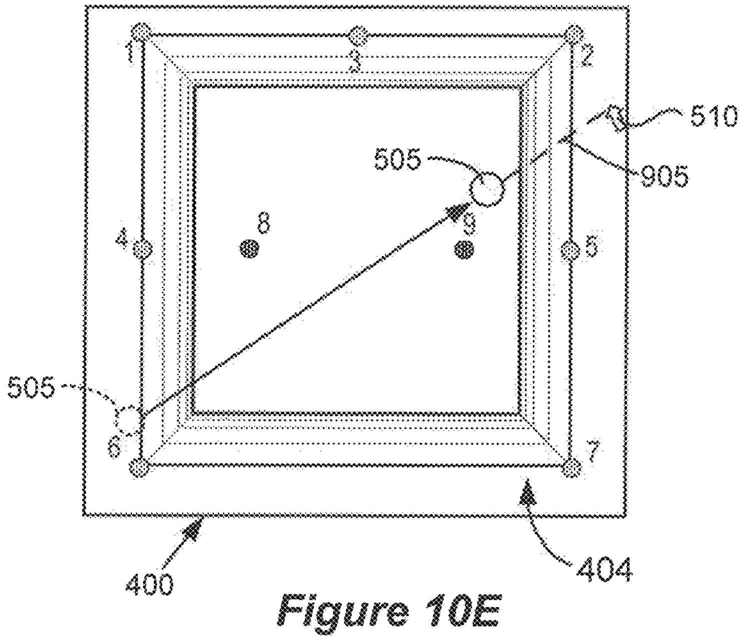

FIG. 10B is a flow diagram that outlines an alternative process of using a virtual tether to move an audio object. FIGS. 10C-10E show examples of the process outlined in FIG. 10B. Referring first to FIG. 10B, process 1050 begins with block 1055, in which audio data are received. In block 1057, an indication is received to attach a virtual tether between an audio object and a cursor. The indication may be received by a logic system of an authoring apparatus and may correspond with input received from a user input device. Referring to FIG. 10C, for example, a user may position the cursor 510 over the audio object 505 and then indicate, via a user input device or a GUI, that the virtual tether 905 should be formed between the cursor 510 and the audio object 505.

Cursor and audio object position data may be received in block 1060. In block 1062, the logic system may receive an indication (via a user input device or a GUI, for example), that the audio object 505 should be held in an indicated position, e.g., a position indicated by the cursor 510. In block 1065, the logic device receives an indication that the cursor 510 has been moved to a new position, which may be displayed along with the position of the audio object 505 (block 1067). Referring to FIG. 10D, for example, the cursor 510 has been moved from the left side to the right side of the virtual reproduction environment 404. However, the audio object 510 is still being held in the same position indicated in FIG. 10C. As a result, the virtual tether 905 has been substantially stretched.

In block 1069, the logic system receives an indication (via a user input device or a GUI, for example) that the audio object 505 is to be released. The logic system may compute the resulting audio object position and/or trajectory data, which may be displayed (block 1075). The resulting display may be similar to that shown in FIG. 10E, which shows the audio object 505 moving smoothly and rapidly across the virtual reproduction environment 404. The logic system may save the audio object location and/or trajectory metadata in a memory system (block 1080).

In block 1085, it is determined whether the authoring process 1050 will continue. The process may continue if the logic system receives an indication that the user desires to do so. For example, the process 1050 may continue by reverting to block 1055 or block 1060. Otherwise, the authoring tool may send the audio data and metadata to a rendering tool (block 1090), after which the process 1050 may end (block 1095).

In order to optimize the verisimilitude of the perceived motion of an audio object, it may be desirable to let the user of an authoring tool (or a rendering tool) select a subset of the speakers in a reproduction environment and to limit the set of active speakers to the chosen subset. In some implementations, speaker zones and/or groups of speaker zones may be designated active or inactive during an authoring or a rendering operation. For example, referring to FIG. 4A, speaker zones of the front area 405, the left area 410, the right area 415 and/or the upper area 420 may be controlled as a group. Speaker zones of a back area that includes speaker zones 6 and 7 (and, in other implementations, one or more other speaker zones located between speaker zones 6 and 7) also may be controlled as a group. A user interface may be provided to dynamically enable or disable all the speakers that correspond to a particular speaker zone or to an area that includes a plurality of speaker zones.

In some implementations, the logic system of an authoring device (or a rendering device) may be configured to create speaker zone constraint metadata according to user input received via a user input system. The speaker zone constraint metadata may include data for disabling selected speaker zones. Some such implementations will now be described with reference to FIGS. 11 and 12.

Figure 11:
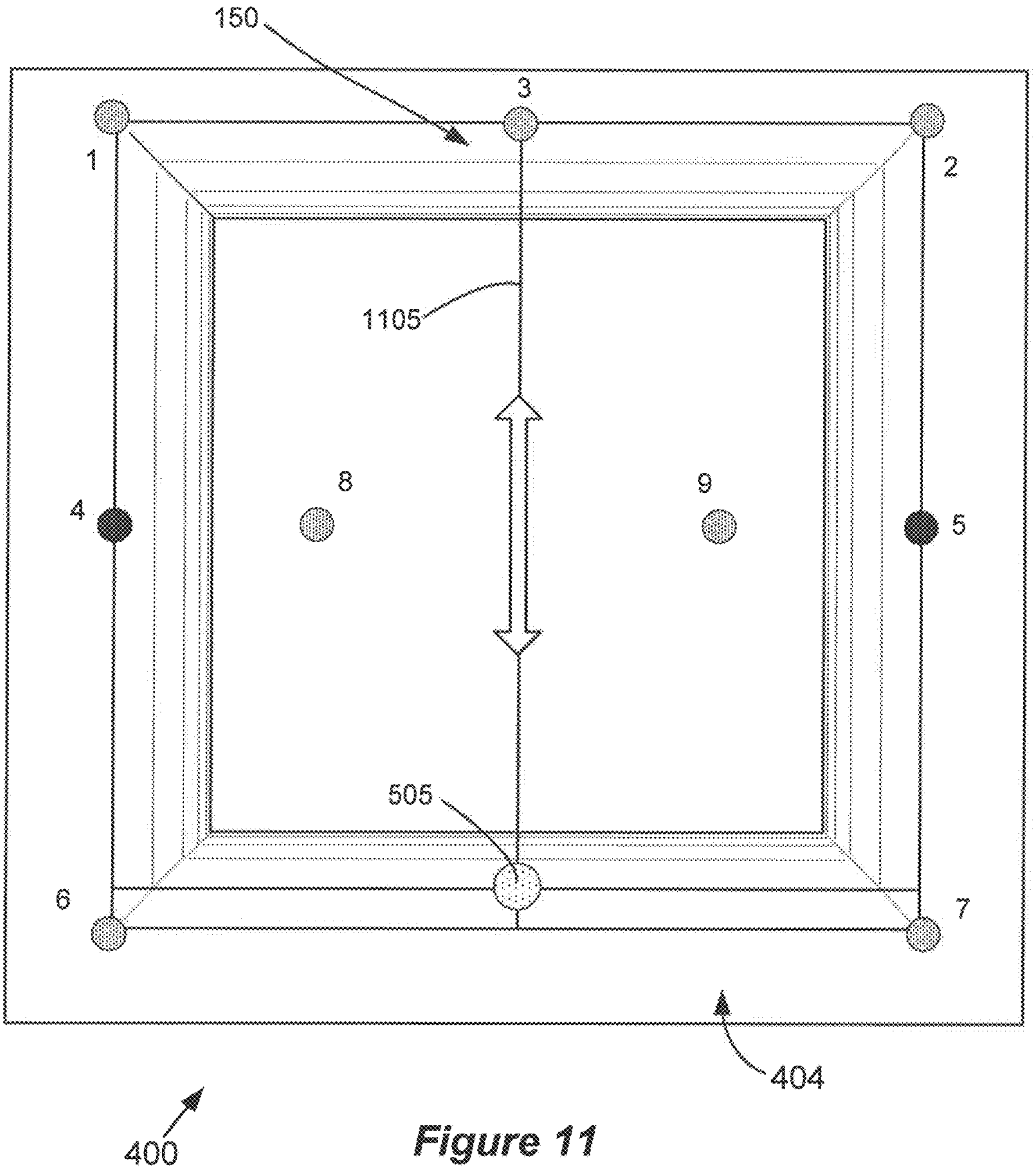
FIG. 11 shows an example of applying speaker zone constraint in a virtual reproduction environment.

FIG. 11 shows an example of applying a speaker zone constraint in a virtual reproduction environment. In some such implementations, a user may be able to select speaker zones by clicking on their representations in a GUI, such as GUI 400, using a user input device such as a mouse. Here, a user has disabled speaker zones 4 and 5, on the sides of the virtual reproduction environment 404. Speaker zones 4 and 5 may correspond to most (or all) of the speakers in a physical reproduction environment, such as a cinema sound system environment. In this example, the user has also constrained the positions of the audio object 505 to positions along the line 1105. With most or all of the speakers along the side walls disabled, a pan from the screen 150 to the back of the virtual reproduction environment 404 would be constrained not to use the side speakers. This may create an improved perceived motion from front to back for a wide audience area, particularly for audience members who are seated near reproduction speakers corresponding with speaker zones 4 and In some implementations, speaker zone constraints may be carried through all re-rendering modes. For example, speaker zone constraints may be carried through in situations when fewer zones are available for rendering, e.g., when rendering for a Dolby Surround 7.1 or 5.1 configuration exposing only 7 or 5 zones. Speaker zone constraints also may be carried through when more zones are available for rendering. As such, the speaker zone constraints can also be seen as a way to guide re-rendering, providing a non-blind solution to the traditional "upmixing/downmixing" process.

Figure 12:
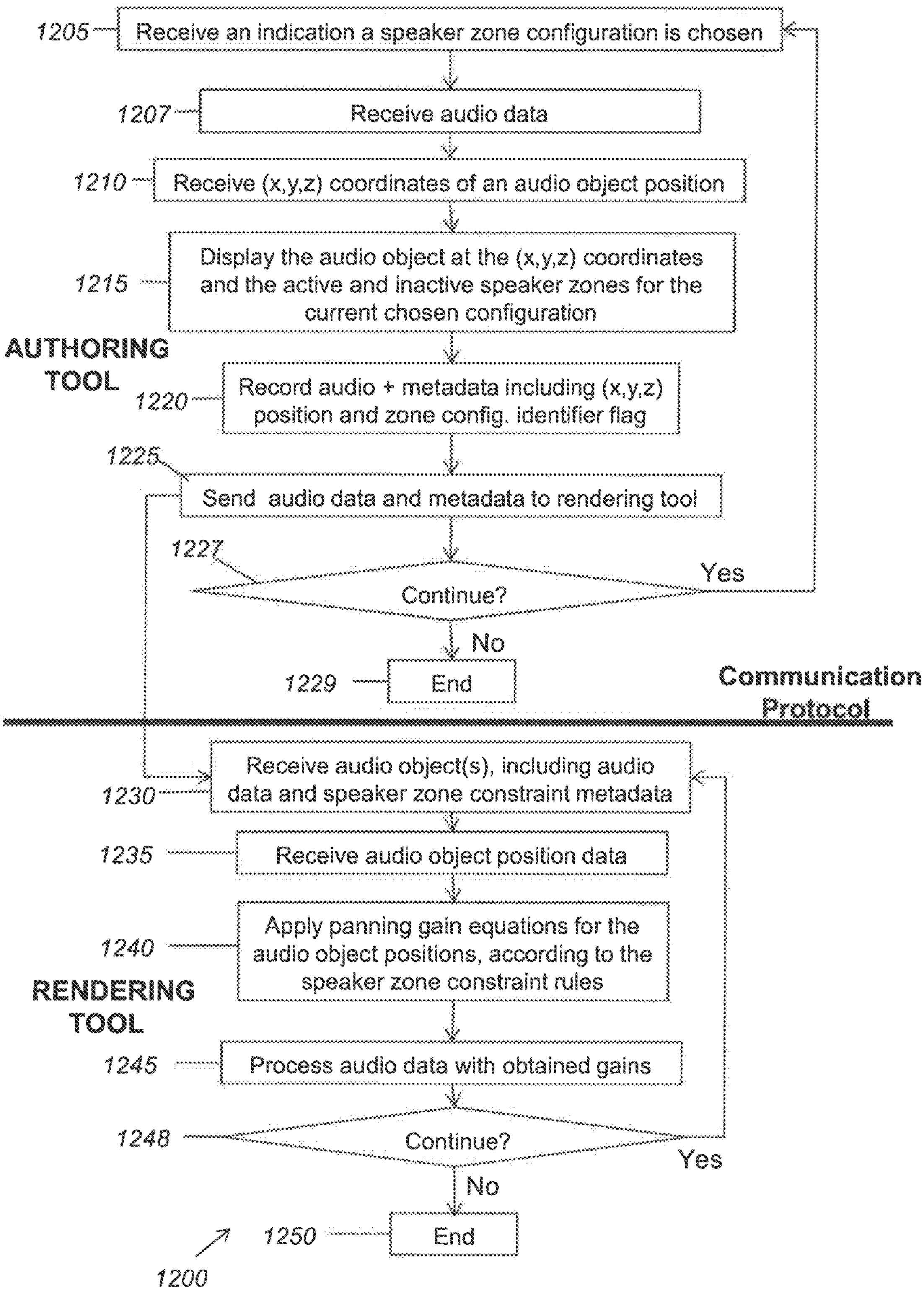
FIG. 12 is a flow diagram that outlines some examples of applying speaker zone constraint rules.

FIG. 12 is a flow diagram that outlines some examples of applying speaker zone constraint rules. Process 1200 begins with block 1205, in which one or more indications are received to apply speaker zone constraint rules. The indication(s) may be received by a logic system of an authoring or a rendering apparatus and may correspond with input received from a user input device. For example, the indications may correspond to a user's selection of one or more speaker zones to de-activate. In some implementations, block 1205 may involve receiving an indication of what type of speaker zone constraint rules should be applied, e.g., as described below.

In block 1207, audio data are received by an authoring tool. Audio object position data may be received (block 1210), e.g., according to input from a user of the authoring tool, and displayed (block 1215). The position data are (x,y,z) coordinates in this example. Here, the active and inactive speaker zones for the selected speaker zone constraint rules are also displayed in block 1215. In block 1220, the audio data and associated metadata are saved. In this example, the metadata include the audio object position and speaker zone constraint metadata, which may include a speaker zone identification flag.

In some implementations, the speaker zone constraint metadata may indicate that a rendering tool should apply panning equations to compute gains in a binary fashion, e.g., by regarding all speakers of the selected (disabled) speaker zones as being "off" and all other speaker zones as being "on." The logic system may be configured to create speaker zone constraint metadata that includes data for disabling the selected speaker zones.

In alternative implementations, the speaker zone constraint metadata may indicate that the rendering tool will apply panning equations to compute gains in a blended fashion that includes some degree of contribution from speakers of the disabled speaker zones. For example, the logic system may be configured to create speaker zone constraint metadata indicating that the rendering tool should attenuate selected speaker zones by performing the following operations: computing first gains that include contributions from the selected (disabled) speaker zones; computing second gains that do not include contributions from the selected speaker zones; and blending the first gains with the second gains. In some implementations, a bias may be applied to the first gains and/or the second gains (e.g., from a selected minimum value to a selected maximum value) in order to allow a range of potential contributions from selected speaker zones.

In this example, the authoring tool sends the audio data and metadata to a rendering tool in block 1225. The logic system may then determine whether the authoring process will continue (block 1227). The authoring process may continue if the logic system receives an indication that the user desires to do so. Otherwise, the authoring process may end (block 1229). In some implementations, the rendering operations may continue, according to user input.

The audio objects, including audio data and metadata created by the authoring tool, are received by the rendering tool in block 1230. Position data for a particular audio object are received in block 1235 in this example. The logic system of the rendering tool may apply panning equations to compute gains for the audio object position data, according to the speaker zone constraint rules.

In block 1245, the computed gains are applied to the audio data. The logic system may save the gain, audio object location and speaker zone constraint metadata in a memory system. In some implementations, the audio data may be reproduced by a speaker system. Corresponding speaker responses may be shown on a display in some implementations.

In block 1248, it is determined whether process 1200 will continue. The process may continue if the logic system receives an indication that the user desires to do so. For example, the rendering process may continue by reverting to block 1230 or block 1235. If an indication is received that a user wishes to revert to the corresponding authoring process, the process may revert to block 1207 or block 1210. Otherwise, the process 1200 may end (block 1250).

The tasks of positioning and rendering audio objects in a three-dimensional virtual reproduction environment are becoming increasingly difficult. Part of the difficulty relates to challenges in representing the virtual reproduction environment in a GUI. Some authoring and rendering implementations provided herein allow a user to switch between two-dimensional screen space panning and three-dimensional room-space panning Such functionality may help to preserve the accuracy of audio object positioning while providing a GUI that is convenient for the user.

Figure 13A:
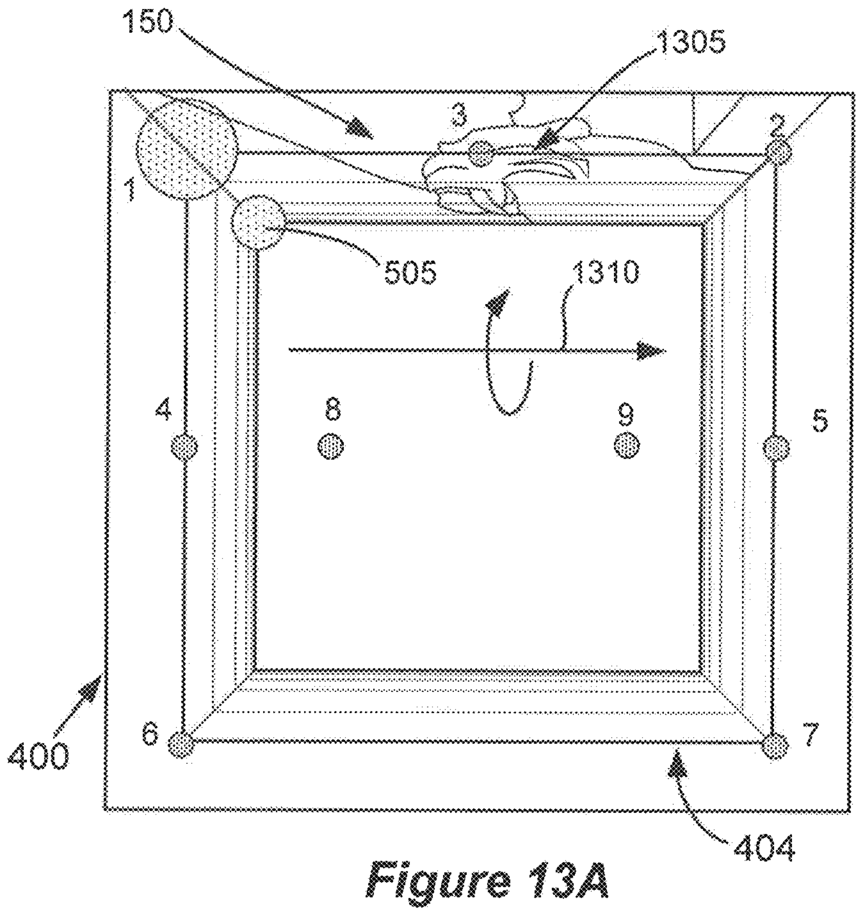
FIGS. 13A and 13B show an example of a GUI that can switch between a two-dimensional view and a three-dimensional view of a virtual reproduction environment.
Figure 13B:
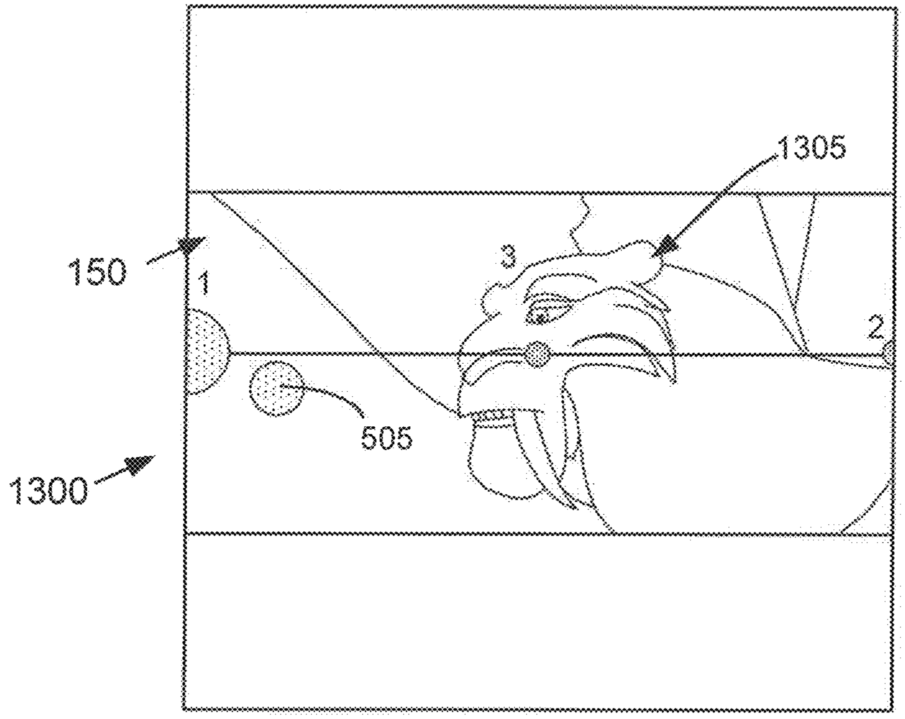

FIGS. 13A and 13B show an example of a GUI that can switch between a two-dimensional view and a three-dimensional view of a virtual reproduction environment. Referring first to FIG. 13A, the GUI 400 depicts an image 1305 on the screen. In this example, the image 1305 is that of a saber-toothed tiger. In this top view of the virtual reproduction environment 404, a user can readily observe that the audio object 505 is near the speaker zone 1. The elevation may be inferred, for example, by the size, the color, or some other attribute of the audio object 505. However, the relationship of the position to that of the image 1305 may be difficult to determine in this view.

In this example, the GUI 400 can appear to be dynamically rotated around an axis, such as the axis 1310. FIG. 13B shows the GUI 1300 after the rotation process. In this view, a user can more clearly see the image 1305 and can use information from the image 1305 to position the audio object 505 more accurately. In this example, the audio object corresponds to a sound towards which the saber-toothed tiger is looking. Being able to switch between the top view and a screen view of the virtual reproduction environment 404 allows a user to quickly and accurately select the proper elevation for the audio object 505, using information from on-screen material.

Figure 13C:
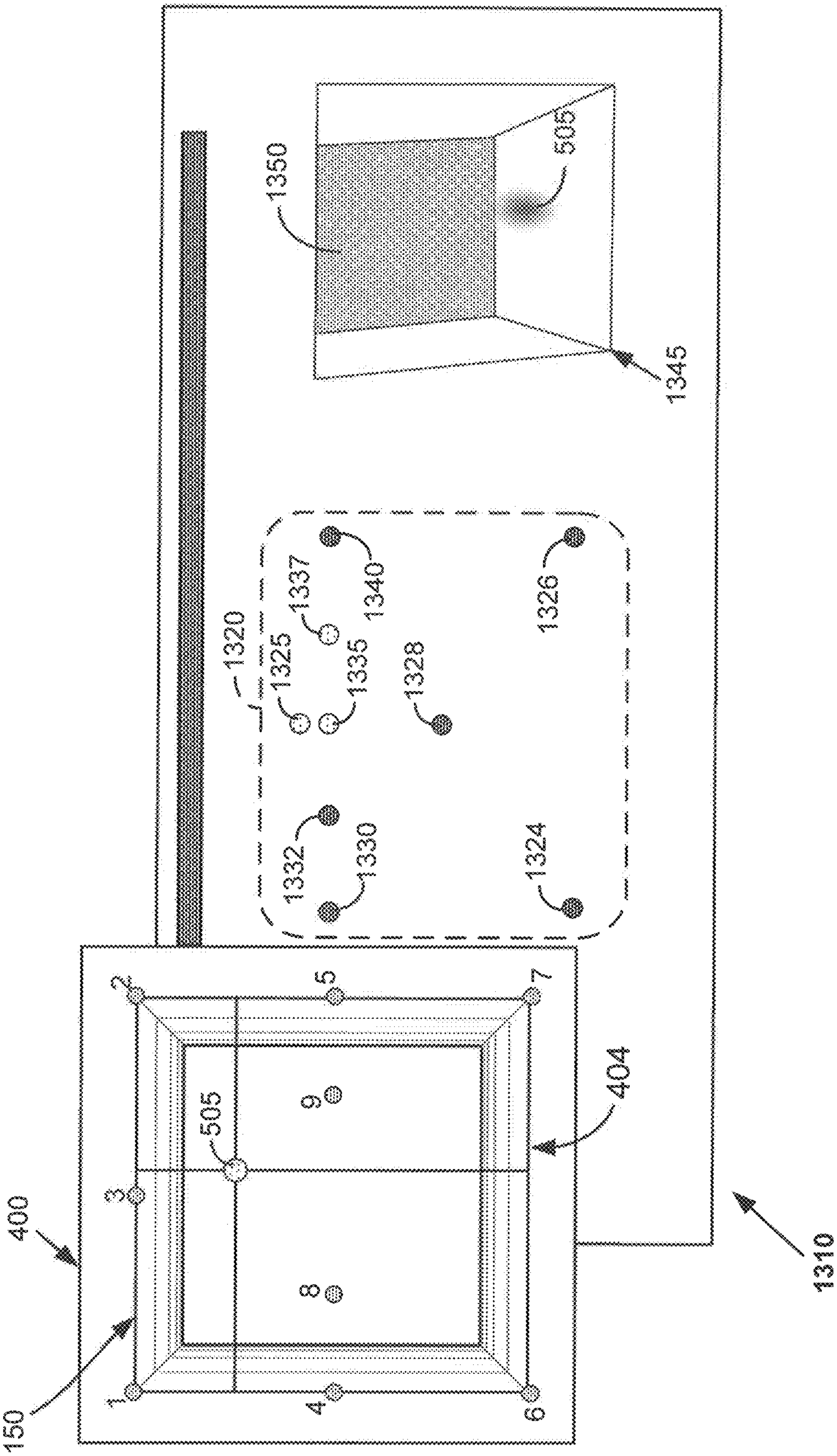
FIGS. 13C-13E show combinations of two-dimensional and three-dimensional depictions of reproduction environments.
Figure 13D:
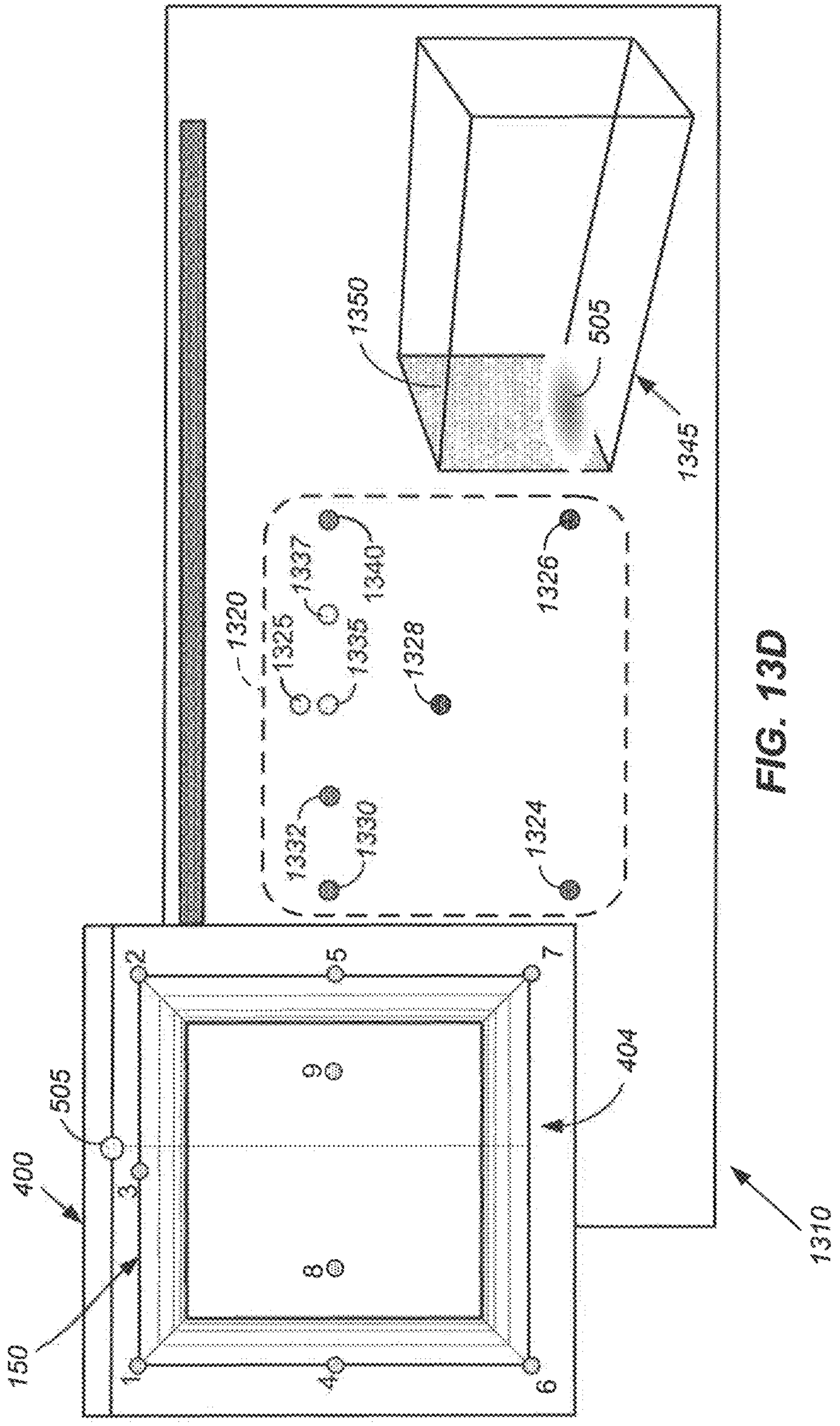
Figure 13E:
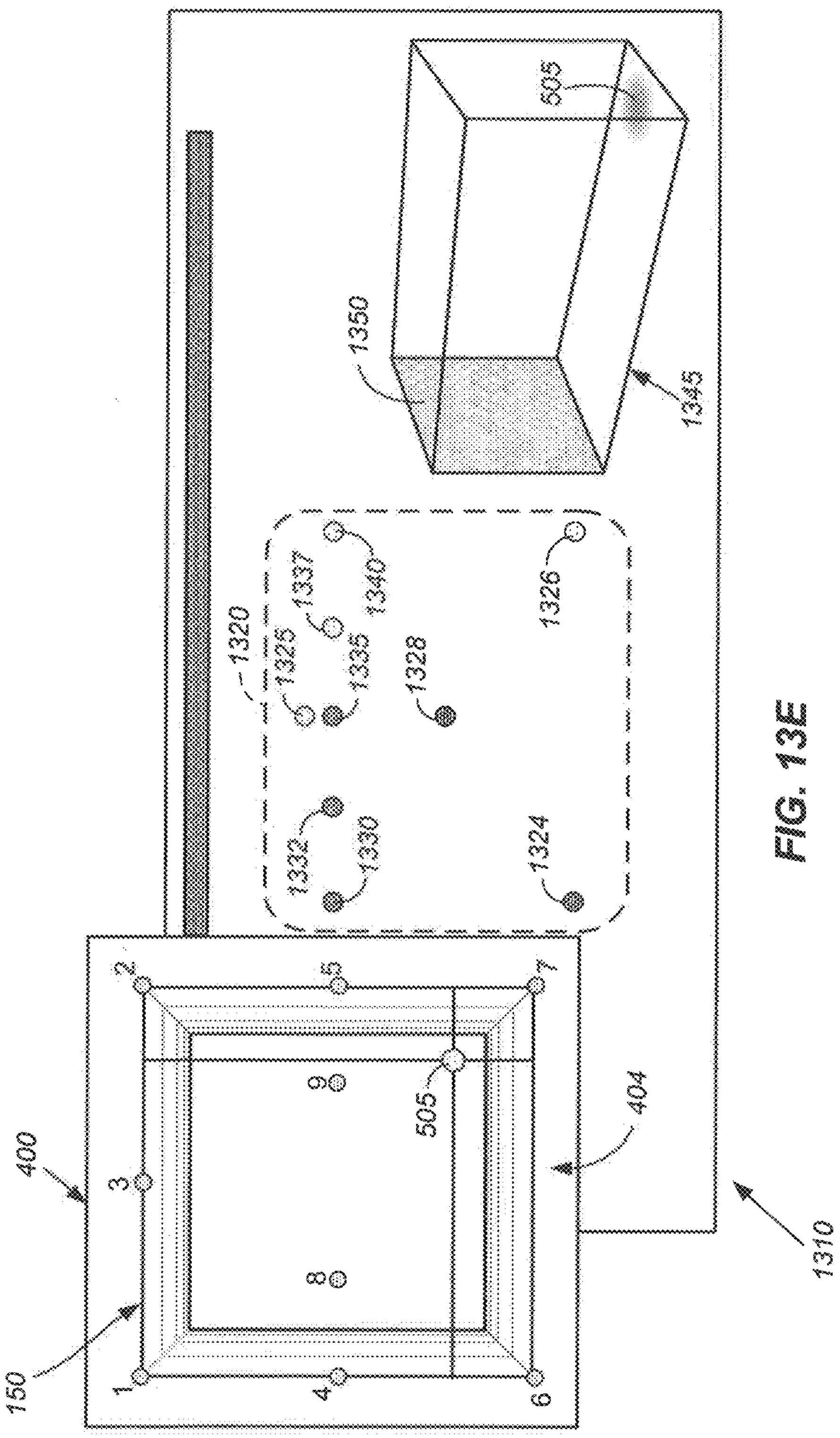

Various other convenient GUIs for authoring and/or rendering are provided herein. FIGS. 13C-13E show combinations of two-dimensional and three-dimensional depictions of reproduction environments. Referring first to FIG. 13C, a top view of the virtual reproduction environment 404 is depicted in a left area of the GUI 1310. The GUI 1310 also includes a three-dimensional depiction 1345 of a virtual (or actual) reproduction environment. Area 1350 of the three-dimensional depiction 1345 corresponds with the screen 150 of the GUI 400. The position of the audio object 505, particularly its elevation, may be clearly seen in the three-dimensional depiction 1345. In this example, the width of the audio object 505 is also shown in the three-dimensional depiction 1345.

The speaker layout 1320 depicts the speaker locations 1324 through 1340, each of which can indicate a gain corresponding to the position of the audio object 505 in the virtual reproduction environment 404. In some implementations, the speaker layout 1320 may, for example, represent reproduction speaker locations of an actual reproduction environment, such as a Dolby Surround 5.1 configuration, a Dolby Surround 7.1 configuration, a Dolby 7.1 configuration augmented with overhead speakers, etc. When a logic system receives an indication of a position of the audio object 505 in the virtual reproduction environment 404, the logic system may be configured to map this position to gains for the speaker locations 1324 through 1340 of the speaker layout 1320, e.g., by the above-described amplitude panning process. For example, in FIG. 13C, the speaker locations 1325, 1335 and 1337 each have a change in color indicating gains corresponding to the position of the audio object 505.

Referring now to FIG. 13D, the audio object has been moved to a position behind the screen 150. For example, a user may have moved the audio object 505 by placing a cursor on the audio object 505 in GUI 400 and dragging it to a new position. This new position is also shown in the three-dimensional depiction 1345, which has been rotated to a new orientation. The responses of the speaker layout 1320 may appear substantially the same in FIGS. 13C and 13D. However, in an actual GUI, the speaker locations 1325, 1335 and 1337 may have a different appearance (such as a different brightness or color) to indicate corresponding gain differences cause by the new position of the audio object 505.

Referring now to FIG. 13E, the audio object 505 has been moved rapidly to a position in the right rear portion of the virtual reproduction environment 404. At the moment depicted in FIG. 13E, the speaker location 1326 is responding to the current position of the audio object 505 and the speaker locations 1325 and 1337 are still responding to the former position of the audio object 505.

Figure 14A:
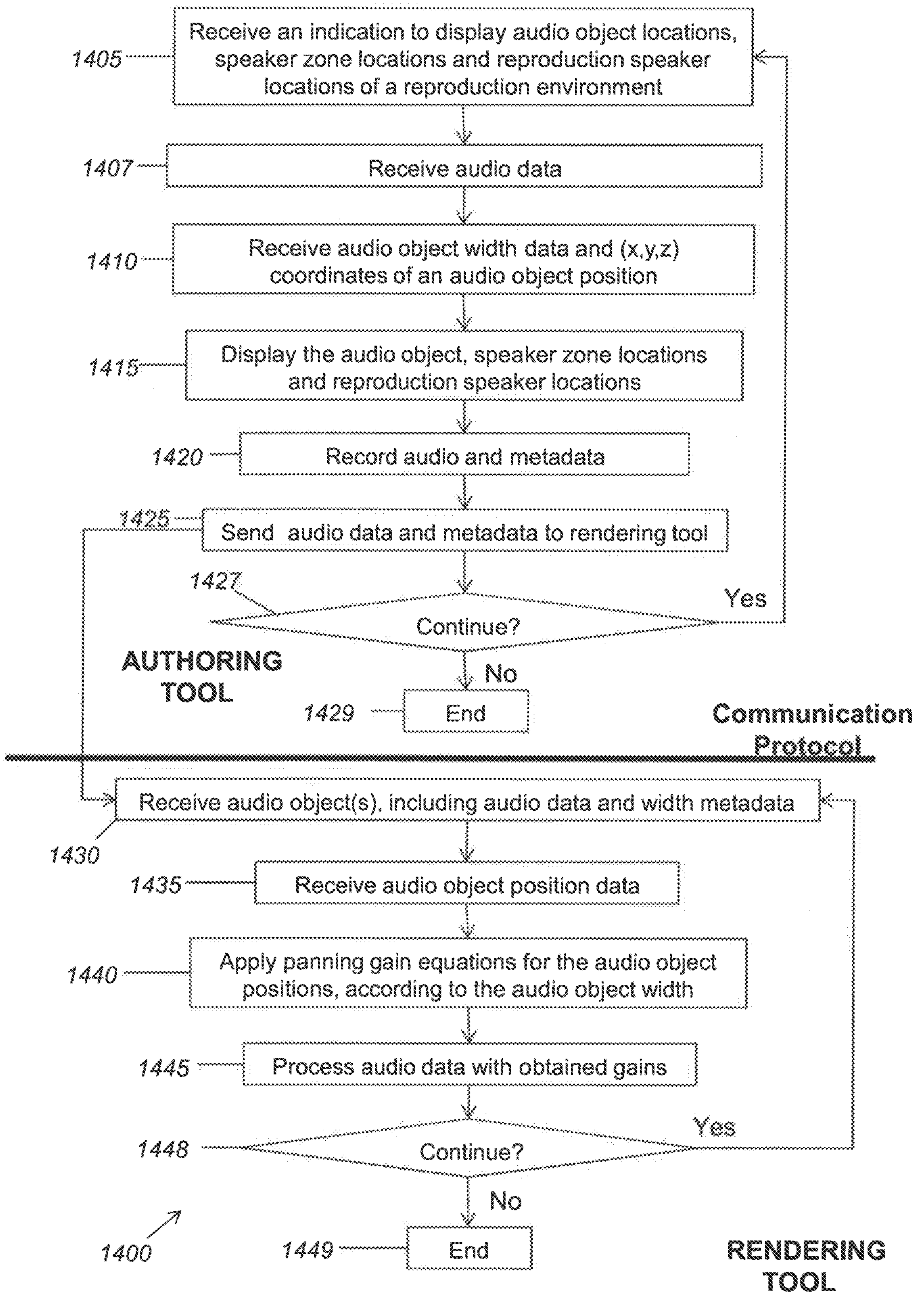
FIG. 14A is a flow diagram that outlines a process of controlling an apparatus to present GUIs such as those shown in FIGS. 13C-13E.

FIG. 14A is a flow diagram that outlines a process of controlling an apparatus to present GUIs such as those shown in FIGS. 13C-13E. Process 1400 begins with block 1405, in which one or more indications are received to display audio object locations, speaker zone locations and reproduction speaker locations for a reproduction environment. The speaker zone locations may correspond to a virtual reproduction environment and/or an actual reproduction environment, e.g., as shown in FIGS. 13C-13E. The indication(s) may be received by a logic system of a rendering and/or authoring apparatus and may correspond with input received from a user input device. For example, the indications may correspond to a user's selection of a reproduction environment configuration.

In block 1407, audio data are received. Audio object position data and width are received in block 1410, e.g., according to user input. In block 1415, the audio object, the speaker zone locations and reproduction speaker locations are displayed. The audio object position may be displayed in two-dimensional and/or three-dimensional views, e.g., as shown in FIGS. 13C-13E. The width data may be used not only for audio object rendering, but also may affect how the audio object is displayed (see the depiction of the audio object 505 in the three-dimensional depiction 1345 of FIGS. 13C-13E).

The audio data and associated metadata may be recorded. (Block 1420). In block 1425, the authoring tool sends the audio data and metadata to a rendering tool. The logic system may then determine (block 1427) whether the authoring process will continue. The authoring process may continue (e.g., by reverting to block 1405) if the logic system receives an indication that the user desires to do so. Otherwise, the authoring process may end. (Block 1429).

The audio objects, including audio data and metadata created by the authoring tool, are received by the rendering tool in block 1430. Position data for a particular audio object are received in block 1435 in this example. The logic system of the rendering tool may apply panning equations to compute gains for the audio object position data, according to the width metadata.

In some rendering implementations, the logic system may map the speaker zones to reproduction speakers of the reproduction environment. For example, the logic system may access a data structure that includes speaker zones and corresponding reproduction speaker locations. More details and examples are described below with reference to FIG. 14B.

In some implementations, panning equations may be applied, e.g., by a logic system, according to the audio object position, width and/or other information, such as the speaker locations of the reproduction environment (block 1440). In block 1445, the audio data are processed according to the gains that are obtained in block 1440. At least some of the resulting audio data may be stored, if so desired, along with the corresponding audio object position data and other metadata received from the authoring tool. The audio data may be reproduced by speakers.

The logic system may then determine (block 1448) whether the process 1400 will continue. The process 1400 may continue if, for example, the logic system receives an indication that the user desires to do so. Otherwise, the process 1400 may end (block 1449).

Figure 14B:
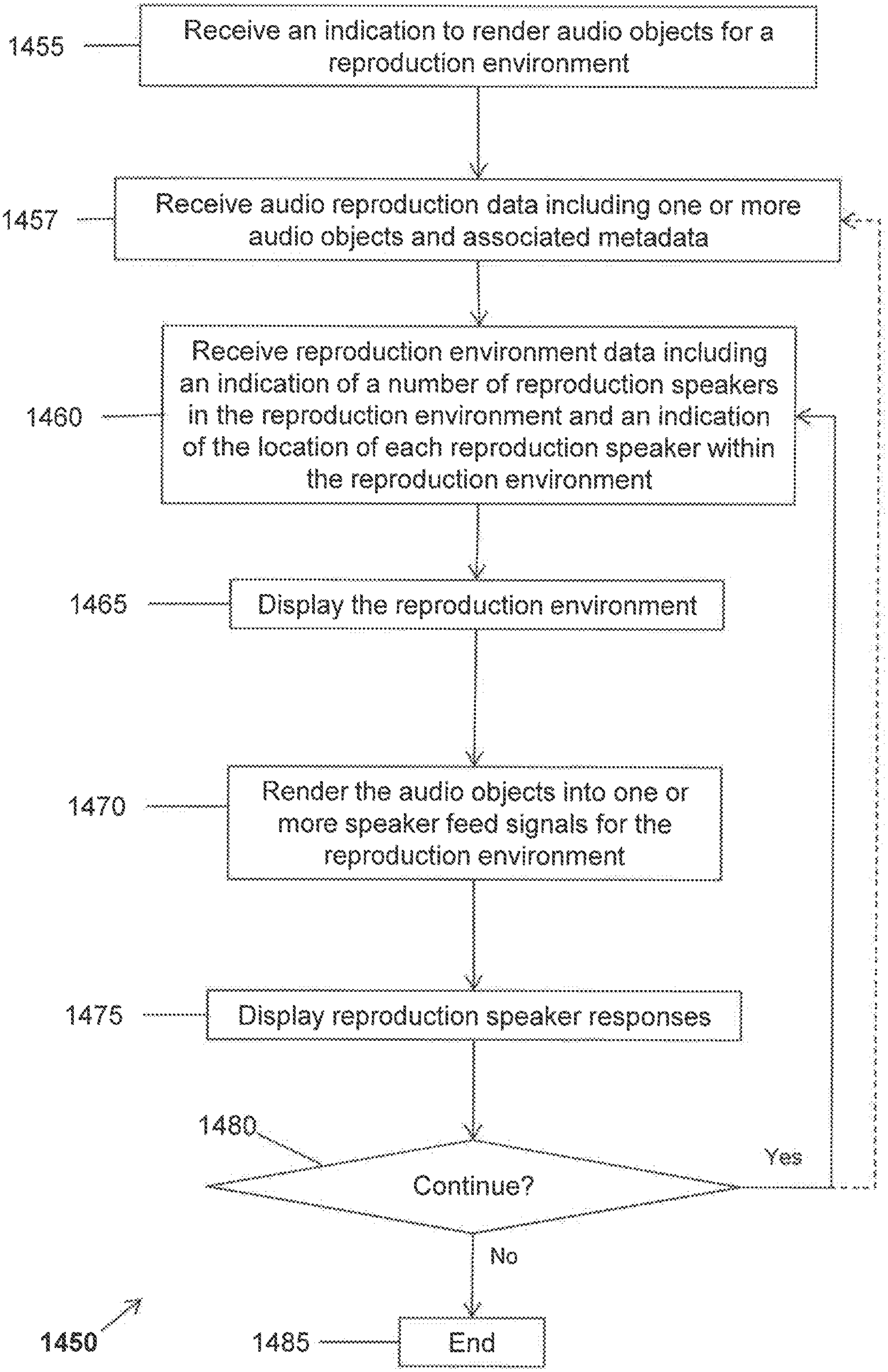
FIG. 14B is a flow diagram that outlines a process of rendering audio objects for a reproduction environment.

FIG. 14B is a flow diagram that outlines a process of rendering audio objects for a reproduction environment. Process 1450 begins with block 1455, in which one or more indications are received to render audio objects for a reproduction environment. The indication(s) may be received by a logic system of a rendering apparatus and may correspond with input received from a user input device. For example, the indications may correspond to a user's selection of a reproduction environment configuration.

In block 1457, audio reproduction data (including one or more audio objects and associated metadata) are received. Reproduction environment data may be received in block 1460. The reproduction environment data may include an indication of a number of reproduction speakers in the reproduction environment and an indication of the location of each reproduction speaker within the reproduction environment. The reproduction environment may be a cinema sound system environment, a home theater environment, etc. In some implementations, the reproduction environment data may include reproduction speaker zone layout data indicating reproduction speaker zones and reproduction speaker locations that correspond with the speaker zones.

The reproduction environment may be displayed in block 1465. In some implementations, the reproduction environment may be displayed in a manner similar to the speaker layout 1320 shown in FIGS. 13C-13E.

In block 1470, audio objects may be rendered into one or more speaker feed signals for the reproduction environment. In some implementations, the metadata associated with the audio objects may have been authored in a manner such as that described above, such that the metadata may include gain data corresponding to speaker zones (for example, corresponding to speaker zones 1-9 of GUI 400). The logic system may map the speaker zones to reproduction speakers of the reproduction environment. For example, the logic system may access a data structure, stored in a memory, that includes speaker zones and corresponding reproduction speaker locations. The rendering device may have a variety of such data structures, each of which corresponds to a different speaker configuration. In some implementations, a rendering apparatus may have such data structures for a variety of standard reproduction environment configurations, such as a Dolby Surround 5.1 configuration, a Dolby Surround 7.1 configuration\and/or Hamasaki 22.2 surround sound configuration.

In some implementations, the metadata for the audio objects may include other information from the authoring process. For example, the metadata may include speaker constraint data. The metadata may include information for mapping an audio object position to a single reproduction speaker location or a single reproduction speaker zone. The metadata may include data constraining a position of an audio object to a one-dimensional curve or a two-dimensional surface. The metadata may include trajectory data for an audio object. The metadata may include an identifier for content type (e.g., dialog, music or effects).

Accordingly, the rendering process may involve use of the metadata, e.g., to impose speaker zone constraints. In some such implementations, the rendering apparatus may provide a user with the option of modifying constraints indicated by the metadata, e.g., of modifying speaker constraints and re-rendering accordingly. The rendering may involve creating an aggregate gain based on one or more of a desired audio object position, a distance from the desired audio object position to a reference position, a velocity of an audio object or an audio object content type. The corresponding responses of the reproduction speakers may be displayed. (Block 1475.) In some implementations, the logic system may control speakers to reproduce sound corresponding to results of the rendering process.

In block 1480, the logic system may determine whether the process 1450 will continue. The process 1450 may continue if, for example, the logic system receives an indication that the user desires to do so. For example, the process 1450 may continue by reverting to block 1457 or block 1460. Otherwise, the process 1450 may end (block 1485).

Spread and apparent source width control are features of some existing surround sound authoring/rendering systems. In this disclosure, the term “spread” refers to distributing the same signal over multiple speakers to blur the sound image. The term “width” refers to decorrelating the output signals to each channel for apparent width control. Width may be an additional scalar value that controls the amount of decorrelation applied to each speaker feed signal.

Figure 15A:
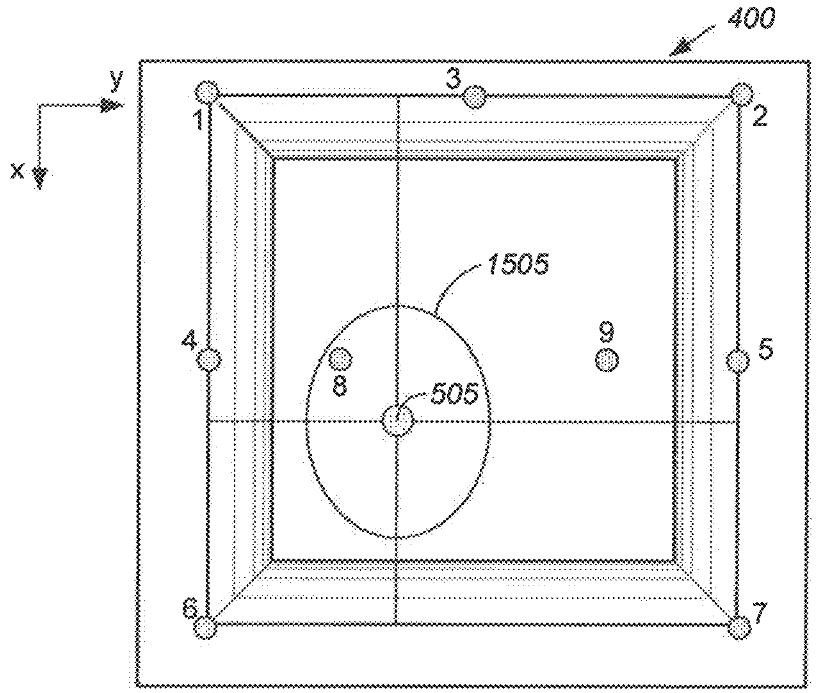
FIG. 15A shows an example of an audio object and associated audio object width in a virtual reproduction environment.

Some implementations described herein provide a 3D axis oriented spread control. One such implementation will now be described with reference to FIG. 15A and FIG. 15A shows an example of an audio object and associated audio object width in a virtual reproduction environment. Here, the GUI 400 indicates an ellipsoid 1505 extending around the audio object 505, indicating the audio object width. The audio object width may be indicated by audio object metadata and/or received according to user input. In this example, the x and y dimensions of the ellipsoid 1505 are different, but in other implementations these dimensions may be the same. The z dimensions of the ellipsoid 1505 are not shown in FIG. 15A.

Figure 15B:
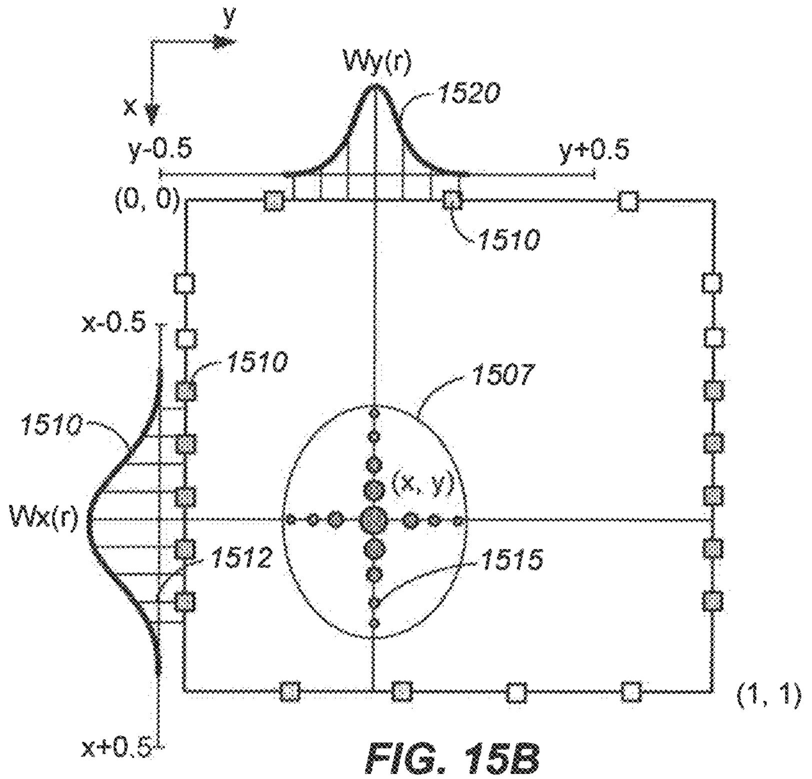
FIG. 15B shows an example of a spread profile corresponding to the audio object width shown in FIG. 15A.

FIG. 15B shows an example of a spread profile corresponding to the audio object width shown in FIG. 15A. Spread may be represented as a three-dimensional vector parameter. In this example, the spread profile 1507 can be independently controlled along 3 dimensions, e.g., according to user input. The gains along the x and y axes are represented in FIG. 15B by the respective height of the curves 1510 and 1520. The gain for each sample 1512 is also indicated by the size of the corresponding circles 1515 within the spread profile 1507. The responses of the speakers 1510 are indicated by gray shading in FIG. 15B.

In some implementations, the spread profile 1507 may be implemented by a separable integral for each axis. According to some implementations, a minimum spread value may be set automatically as a function of speaker placement to avoid timbral discrepancies when panning. Alternatively, or additionally, a minimum spread value may be set automatically as a function of the velocity of the panned audio object, such that as audio object velocity increases an object becomes more spread out spatially, similarly to how rapidly moving images in a motion picture appear to blur.

When using audio object-based audio rendering implementations such as those described herein, a potentially large number of audio tracks and accompanying metadata (including but not limited to metadata indicating audio object positions in three-dimensional space) may be delivered unmixed to the reproduction environment. A real-time rendering tool may use such metadata and information regarding the reproduction environment to compute the speaker feed signals for optimizing the reproduction of each audio object.

When a large number of audio objects are mixed together to the speaker outputs, overload can occur either in the digital domain (for example, the digital signal may be clipped prior to the analog conversion) or in the analog domain, when the amplified analog signal is played back by the reproduction speakers. Both cases may result in audible distortion, which is undesirable. Overload in the analog domain also could damage the reproduction speakers.

Accordingly, some implementations described herein involve dynamic object “blobbing” in response to reproduction speaker overload. When audio objects are rendered with a given spread profile, in some implementations the energy may be directed to an increased number of neighboring reproduction speakers while maintaining overall constant energy. For instance, if the energy for the audio object were uniformly spread over N reproduction speakers, it may contribute to each reproduction speaker output with a gain 1/sqrt(N). This approach provides additional mixing “headroom” and can alleviate or prevent reproduction speaker distortion, such as clipping.

To use a numerical example, suppose a speaker will clip if it receives an input greater than 1.0. Assume that two objects are indicated to be mixed into speaker A, one at level 1.0 and the other at level 0.25. If no blobbing were used, the mixed level in speaker A would total 1.25 and clipping occurs. However, if the first object is blobbed with another speaker B, then (according to some implementations) each speaker would receive the object at 0.707, resulting in additional "headroom" in speaker A for mixing additional objects. The second object can then be safely mixed into speaker A without clipping, as the mixed level for speaker A will be 0.707+0.25=0.957.

In some implementations, during the authoring phase each audio object may be mixed to a subset of the speaker zones (or all the speaker zones) with a given mixing gain. A dynamic list of all objects contributing to each loudspeaker can therefore be constructed. In some implementations, this list may be sorted by decreasing energy levels, e.g. using the product of the original root mean square (RMS) level of the signal multiplied by the mixing gain. In other implementations, the list may be sorted according to other criteria, such as the relative importance assigned to the audio object.

During the rendering process, if an overload is detected for a given reproduction speaker output, the energy of audio objects may be spread across several reproduction speakers. For example, the energy of audio objects may be spread using a width or spread factor that is proportional to the amount of overload and to the relative contribution of each audio object to the given reproduction speaker. If the same audio object contributes to several overloading reproduction speakers, its width or spread factor may, in some implementations, be additively increased and applied to the next rendered frame of audio data.

Generally, a hard limiter will clip any value that exceeds a threshold to the threshold value. As in the example above, if a speaker receives a mixed object at level 1.25, and can only allow a max level of 1.0, the object will be "lard limited" to 1.0. A soft limiter will begin to apply limiting prior to reaching the absolute threshold in order to provide a smoother, more audibly pleasing result. Soft limiters may also use a "look ahead" feature to predict when future clipping may occur in order to smoothly reduce the gain prior to when clipping would occur and thus avoid clipping.

Various "blobbing" implementations provided herein may be used in conjunction with a hard or soft limiter to limit audible distortion while avoiding degradation of spatial accuracy/sharpness. As opposed to a global spread or the use of limiters alone, blobbing implementations may selectively target loud objects, or objects of a given content type. Such implementations may be controlled by the mixer. For example, if speaker zone constraint metadata for an audio object indicate that a subset of the reproduction speakers should not be used, the rendering apparatus may apply the corresponding speaker zone constraint rules in addition to implementing a blobbing method.

Figure 16:
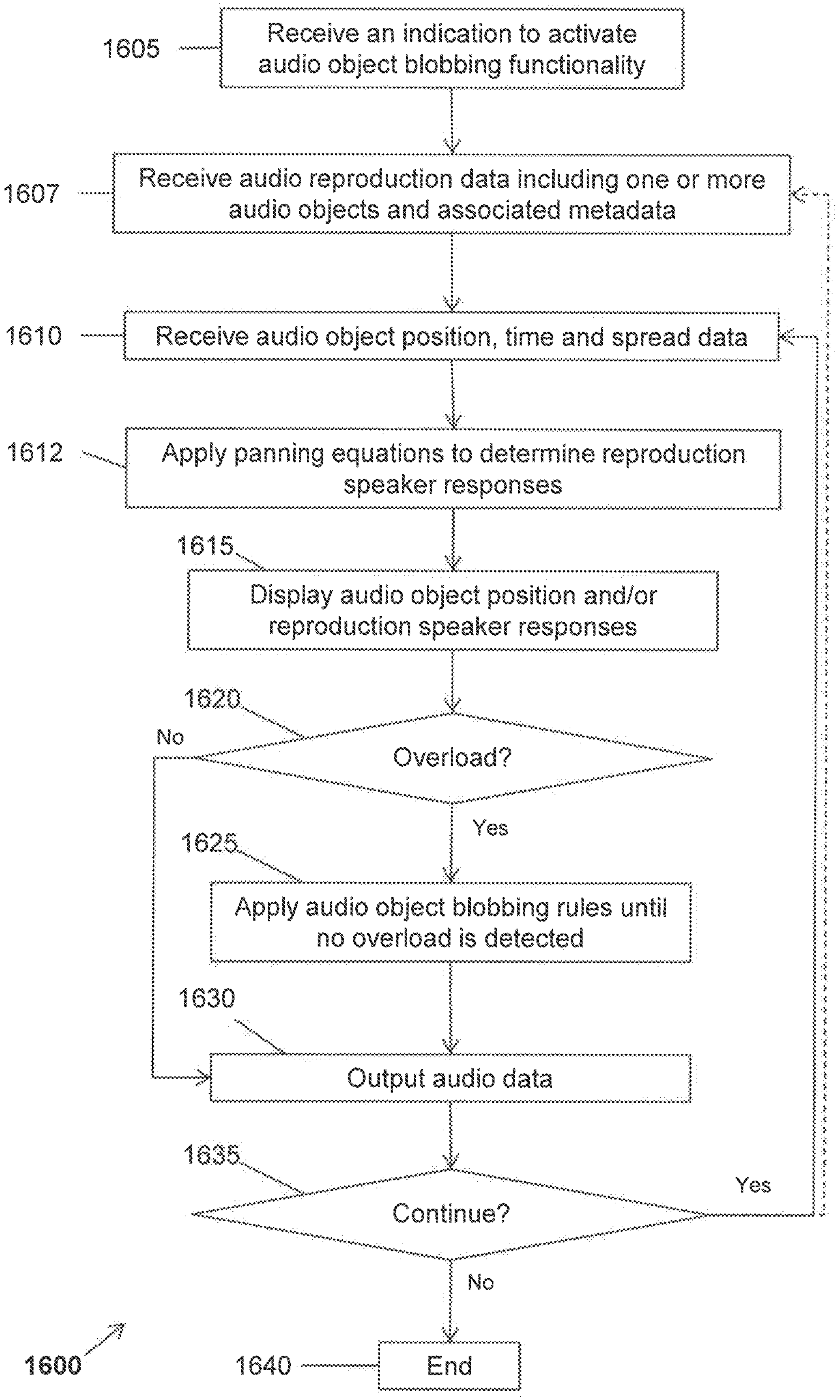
FIG. 16 is a flow diagram that outlines a process of blobbing audio objects.

FIG. 16 is a flow diagram that that outlines a process of blobbing audio objects. Process 1600 begins with block 1605, wherein one or more indications are received to activate audio object blobbing functionality. The indication (s) may be received by a logic system of a rendering apparatus and may correspond with input received from a user input device. In some implementations, the indications may include a user's selection of a reproduction environment configuration. In alternative implementations, the user may have previously selected a reproduction environment configuration.

In block 1607, audio reproduction data (including one or more audio objects and associated metadata) are received. In some implementations, the metadata may include speaker zone constraint metadata, e.g., as described above. In this example, audio object position, time and spread data are parsed from the audio reproduction data (or otherwise received, e.g., via input from a user interface) in block 1610.

Reproduction speaker responses are determined for the reproduction environment configuration by applying panning equations for the audio object data, e.g., as described above (block 1612). In block 1615, audio object position and reproduction speaker responses are displayed (block 1615). The reproduction speaker responses also may be reproduced via speakers that are configured for communication with the logic system.

In block 1620, the logic system determines whether an overload is detected for any reproduction speaker of the reproduction environment. If so, audio object blobbing rules such as those described above may be applied until no overload is detected (block 1625). The audio data output in block 1630 may be saved, if so desired, and may be output to the reproduction speakers.

In block 1635, the logic system may determine whether the process 1600 will continue. The process 1600 may continue if, for example, the logic system receives an indication that the user desires to do so. For example, the process 1600 may continue by reverting to block 1607 or block 1610. Otherwise, the process 1600 may end (block 1640).

Figure 17A:
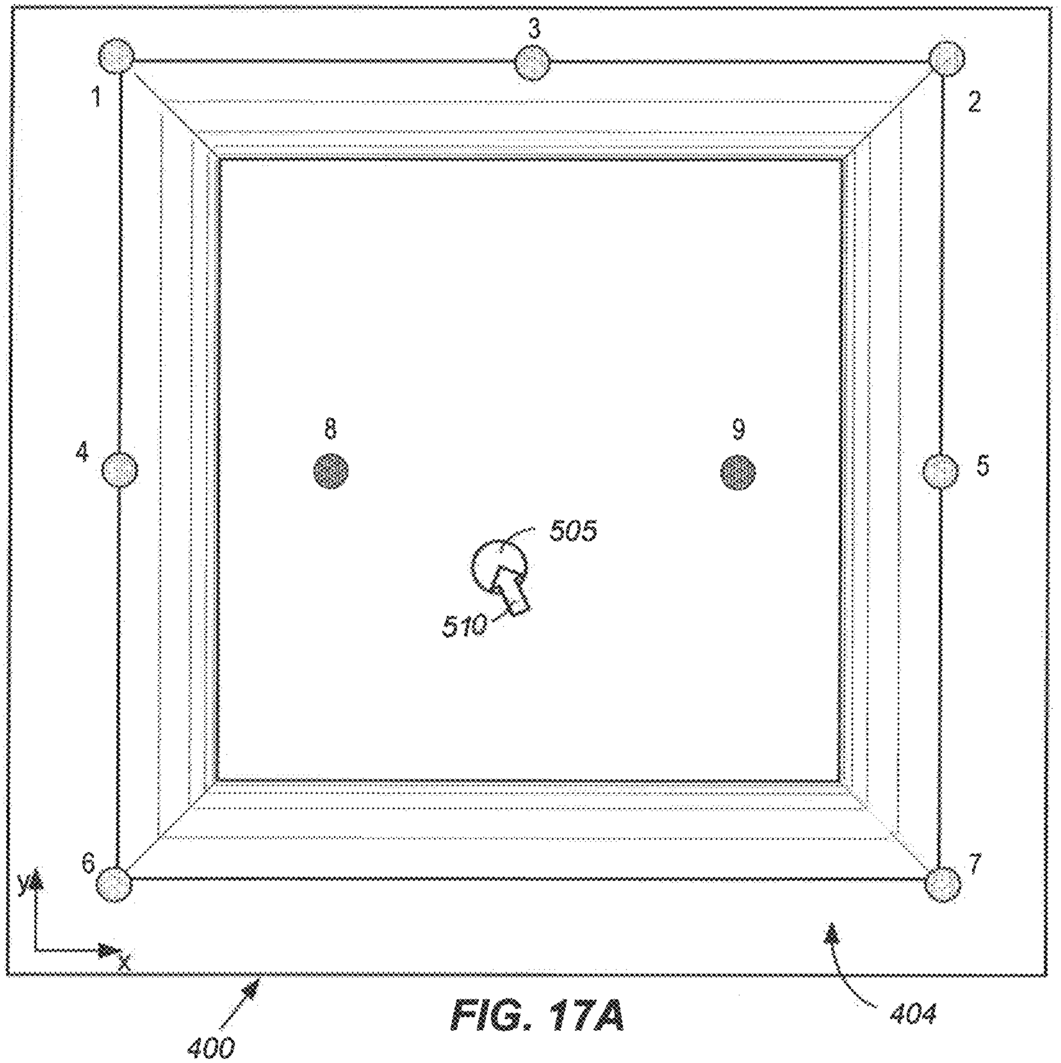
FIGS. 17A and 17B show examples of an audio object positioned in a three-dimensional virtual reproduction environment.
Figure 17B:
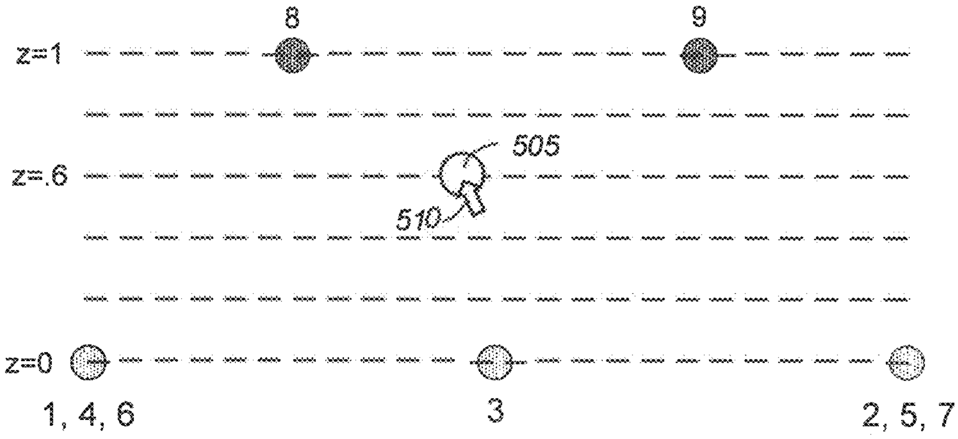

Some implementations provide extended panning gain equations that can be used to image an audio object position in three-dimensional space. Some examples will now be described wither reference to FIGS. 17A and 17B. FIGS. 17A and 17B show examples of an audio object positioned in a three-dimensional virtual reproduction environment. Referring first to FIG. 17A, the position of the audio object 505 may be seen within the virtual reproduction environment 404. In this example, the speaker zones 1-7 are located in one plane and the speaker zones 8 and 9 are located in another plane, as shown in FIG. 17B. However, the numbers of speaker zones, planes, etc., are merely made by way of example; the concepts described herein may be extended to different numbers of speaker zones (or individual speakers) and more than two elevation planes.

In this example, an elevation parameter "z," which may range from zero to 1, maps the position of an audio object to the elevation planes. In this example, the value z=0 corresponds to the base plane that includes the speaker zones 1-7, whereas the value z=1 corresponds to the overhead plane that includes the speaker zones 8 and 9. Values of e between zero and 1 correspond to a blending between a sound image generated using only the speakers in the base plane and a sound image generated using only the speakers in the overhead plane.

In the example shown in FIG. 17B, the elevation parameter for the audio object 505 has a value of 0.6. Accordingly, in one implementation, a first sound image may be generated using panning equations for the base plane, according to the (x,y) coordinates of the audio object 505 in the base plane. A second sound image may be generated using panning equations for the overhead plane, according to the (x,y) coordinates of the audio object 505 in the overhead plane. A resulting sound image may be produced by combining the first sound image with the second sound image, according to the proximity of the audio object 505 to each plane. An energy- or amplitude-preserving function of the elevation z may be applied. For example, assuming that z can range from zero to one, the gain values of the first sound image may be multiplied by Cos($z*\pi/2$) and the gain values of the second sound image may be multiplied by sin($z*\pi/2$), so that the sum of their squares is 1 (energy preserving).

Other implementations described herein may involve computing gains based on two or more panning techniques and creating an aggregate gain based on one or more parameters. The parameters may include one or more of the following: desired audio object position; distance from the desired audio object position to a reference position; the speed or velocity of the audio object; or audio object content type.

Figure 18:
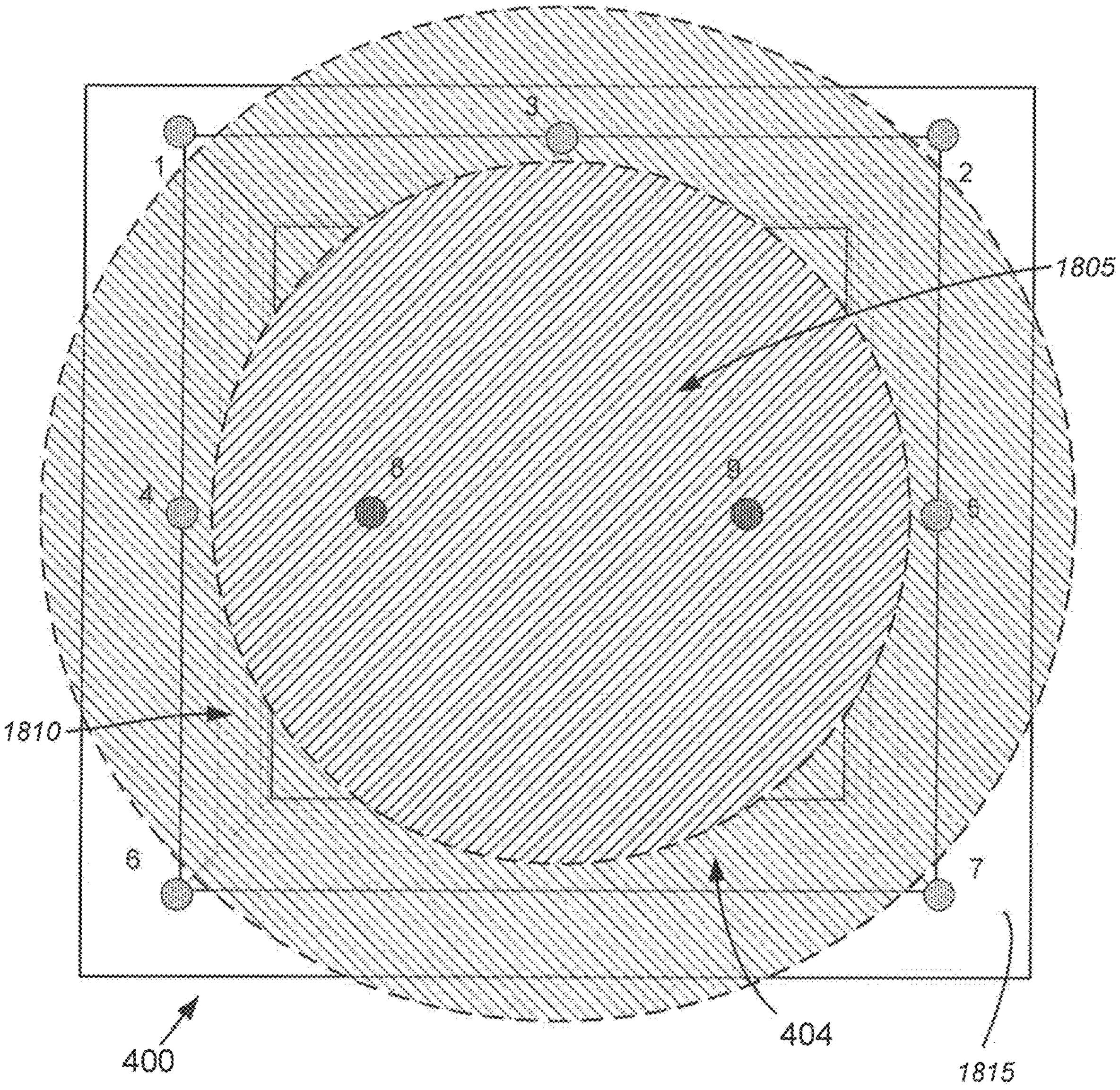
FIG. 18 shows examples of zones that correspond with panning modes.

Some such implementations will now be described with reference to FIG. 18 et seq. FIG. 18 shows examples of zones that correspond with different panning modes. The sizes, shapes and extent of these zones are merely made by way of example. In this example, near-field panning methods are applied for audio objects located within zone 1805 and far-field panning methods are applied for audio objects located in zone 1815, outside of zone 1810.

Figure 19A:
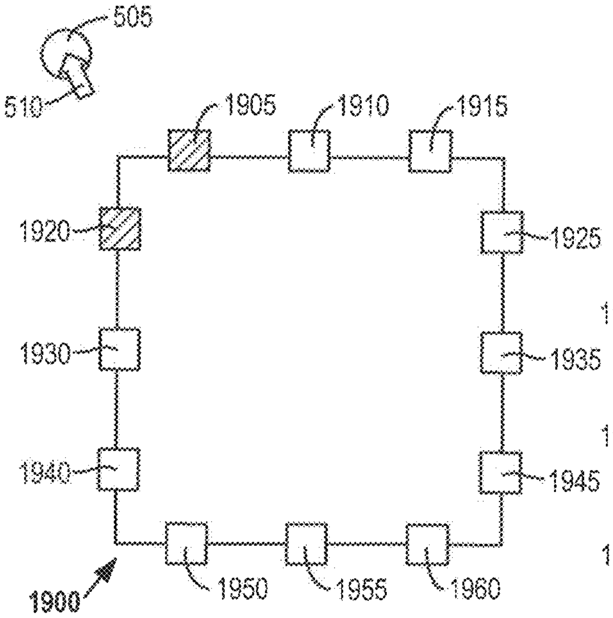
FIGS. 19A-19D show examples of applying near-field and far-field panning techniques to audio objects at different locations.

FIGS. 19A-19D show examples of applying near-field and far-field panning techniques to audio objects at different locations. Referring first to FIG. 19A, the audio object is substantially outside of the virtual reproduction environment 1900. This location corresponds to zone 1815 of FIG. 18. Therefore, one or more far-field panning methods will be applied in this instance. In some implementations, the far-field panning methods may be based on vector-based amplitude panning (VBAP) equations that are known by those of ordinary skill in the art. For example, the far-field panning methods may be based on the VBAP equations described in Section 2.3, page 4 of V. Pulkki, *Compensating Displacement of Amplitude-Panned Virtual Sources* (AES International Conference on Virtual, Synthetic and Entertainment Audio), which is hereby incorporated by reference. In alternative implementations, other methods may be used for panning far-field and near-field audio objects, e.g., methods that involve the synthesis of corresponding acoustic planes or spherical wave. D. de Vries, *Wave Field Synthesis* (AES Monograph 1999), which is hereby incorporated by reference, describes relevant methods.

Figure 19B:
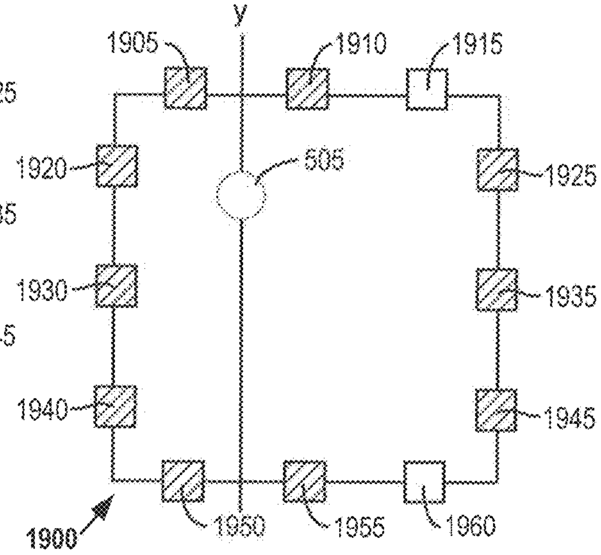

Referring now to FIG. 19B, the audio object is inside of the virtual reproduction environment 1900. This location corresponds to zone 1805 of FIG. 18. Therefore, one or more near-field panning methods will be applied in this instance. Some such near-field panning methods will use a number of speaker zones enclosing the audio object 505 in the virtual reproduction environment 1900.

In some implementations, the near-field panning method may involve "dual-balance" panning and combining two sets of gains. In the example depicted in FIG. 19B, the first set of gains corresponds to a front/back balance between two sets of speaker zones enclosing positions of the audio object 505 along the y axis. The corresponding responses involve all speaker zones of the virtual reproduction environment 1900, except for speaker zones 1915 and 1960.

Figure 19C:
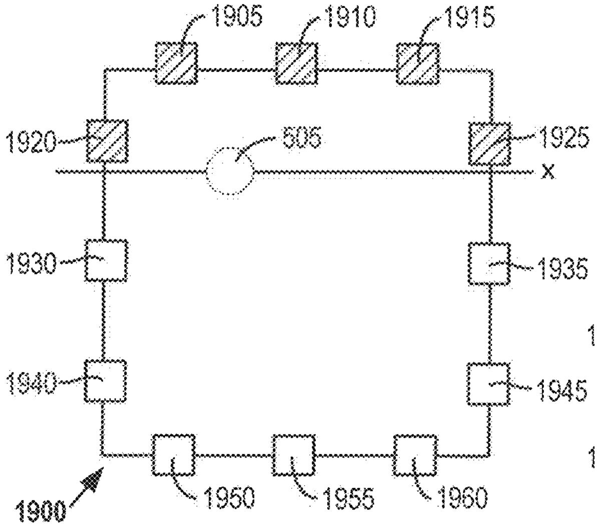
Figure 19D:
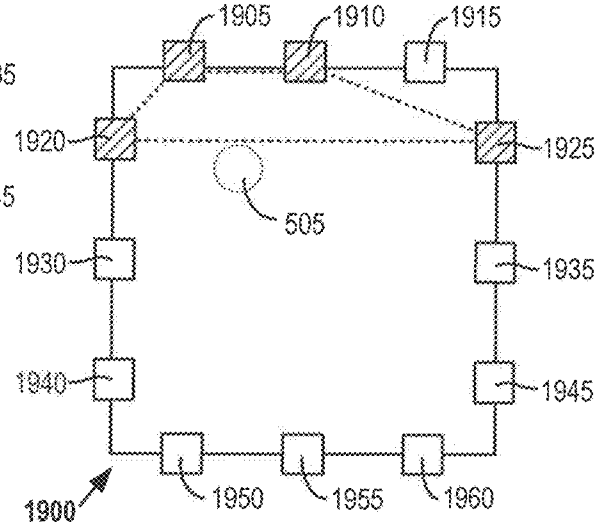

In the example depicted in FIG. 19C, the second set of gains corresponds to a left/right balance between two sets of speaker zones enclosing positions of the audio object 505 along the x axis. The corresponding responses involve speaker zones 1905 through 1925. FIG. 19D indicates the result of combining the responses indicated in FIGS. 19B and 19C.

It may be desirable to blend between different panning modes as an audio object enters or leaves the virtual reproduction environment 1900. Accordingly, a blend of gains computed according to near-field panning methods and far-field panning methods is applied for audio objects located in zone 1810 (see FIG. 18). In some implementations, a pair-wise panning law (e.g. an energy preserving sine or power law) may be used to blend between the gains computed according to near-field panning methods and far-field panning methods. In alternative implementations, the pair-wise panning law may be amplitude preserving rather than energy preserving, such that the sum equals one instead of the sum of the squares being equal to one. It is also possible to blend the resulting processed signals, for example to process the audio signal using both panning methods independently and to crossfade the two resulting audio signals.

It may be desirable to provide a mechanism allowing the content creator and/or the content reproducer to easily fine-tune the different re-renderings for a given authored trajectory. In the context of mixing for motion pictures, the concept of screen-to-room energy balance is considered to be important. In some instances, an automatic re-rendering of a given sound trajectory (or 'pan') will result in a different screen-to-room balance, depending on the number of reproduction speakers in the reproduction environment. According to some implementations, the screen-to-room bias may be controlled according to metadata created during an authoring process. According to alternative implementations, the screen-to-room bias may be controlled solely at the rendering side (i.e., under control of the content reproducer), and not in response to metadata.

Accordingly, some implementations described herein provide one or more forms of screen-to-room bias control. In some such implementations, screen-to-room bias may be implemented as a scaling operation. For example, the scaling operation may involve the original intended trajectory of an audio object along the front-to-back direction and/or a scaling of the speaker positions used in the renderer to determine the panning gains. In some such implementations, the screen-to-room bias control may be a variable value between zero and a maximum value (e.g., one). The variation may, for example, be controllable with a GUI, a virtual or physical slider, a knob, etc.

Figure 20:
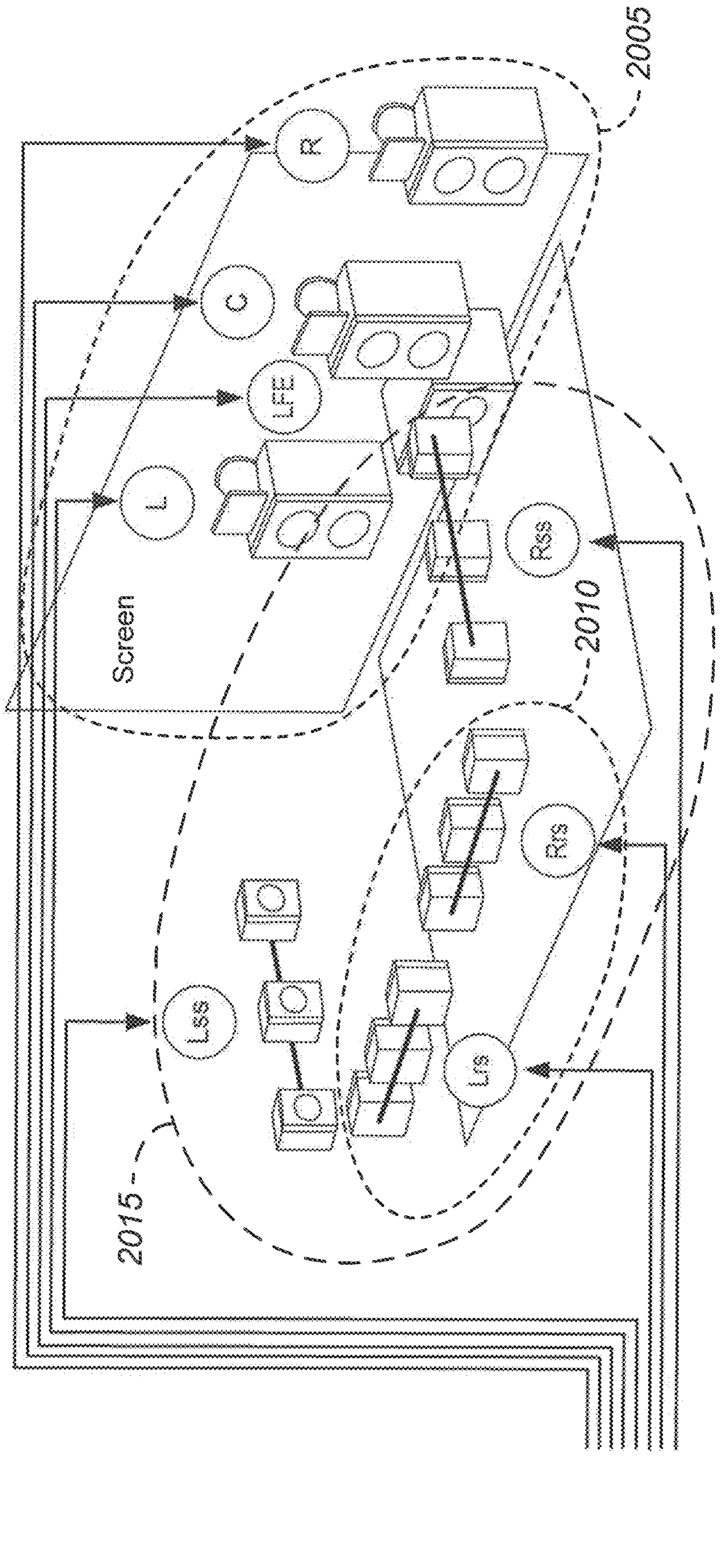
FIG. 20 indicates speaker zones of a reproduction environment that may be used in a screen-to-room bias control process.

Alternatively, or additionally, screen-to-room bias control may be implemented using some form of speaker area constraint. FIG. 20 indicates speaker zones of a reproduction environment that may be used in a screen-to-room bias control process. In this example, the front speaker area 2005 and the back speaker area 2010 (or 2015) may be established. The screen-to-room bias may be adjusted as a function of the selected speaker areas. In some such implementations, a screen-to-room bias may be implemented as a scaling operation between the front speaker area 2005 and the back speaker area 2010 (or 2015). In alternative implementations, screen-to-room bias may be implemented in a binary fashion, e.g., by allowing a user to select a front-side bias, a back-side bias or no bias. The bias settings for each case may correspond with predetermined (and generally non-zero) bias levels for the front speaker area 2005 and the back speaker area 2010 (or 2015). In essence, such implementations may provide three pre-sets for the screen-to-room bias control instead of (or in addition to) a continuous-valued scaling operation.

According to some such implementations, two additional logical speaker zones may be created in an authoring GUI (e.g. 400) by splitting the side walls into a front side wall and a back side wall. In some implementations, the two additional logical speaker zones correspond to the left wall/left surround sound and right wall/right surround sound areas of the renderer. Depending on a user's selection of which of these two logical speaker zones are active the rendering tool could apply preset scaling factors (e.g., as described above) when rendering to Dolby 5.1 or Dolby 7.1 configurations. The rendering tool also may apply such preset scaling factors when rendering for reproduction environments that do not support the definition of these two extra logical zones, e.g., because their physical speaker configurations have no more than one physical speaker on the side wall.

Figure 21:
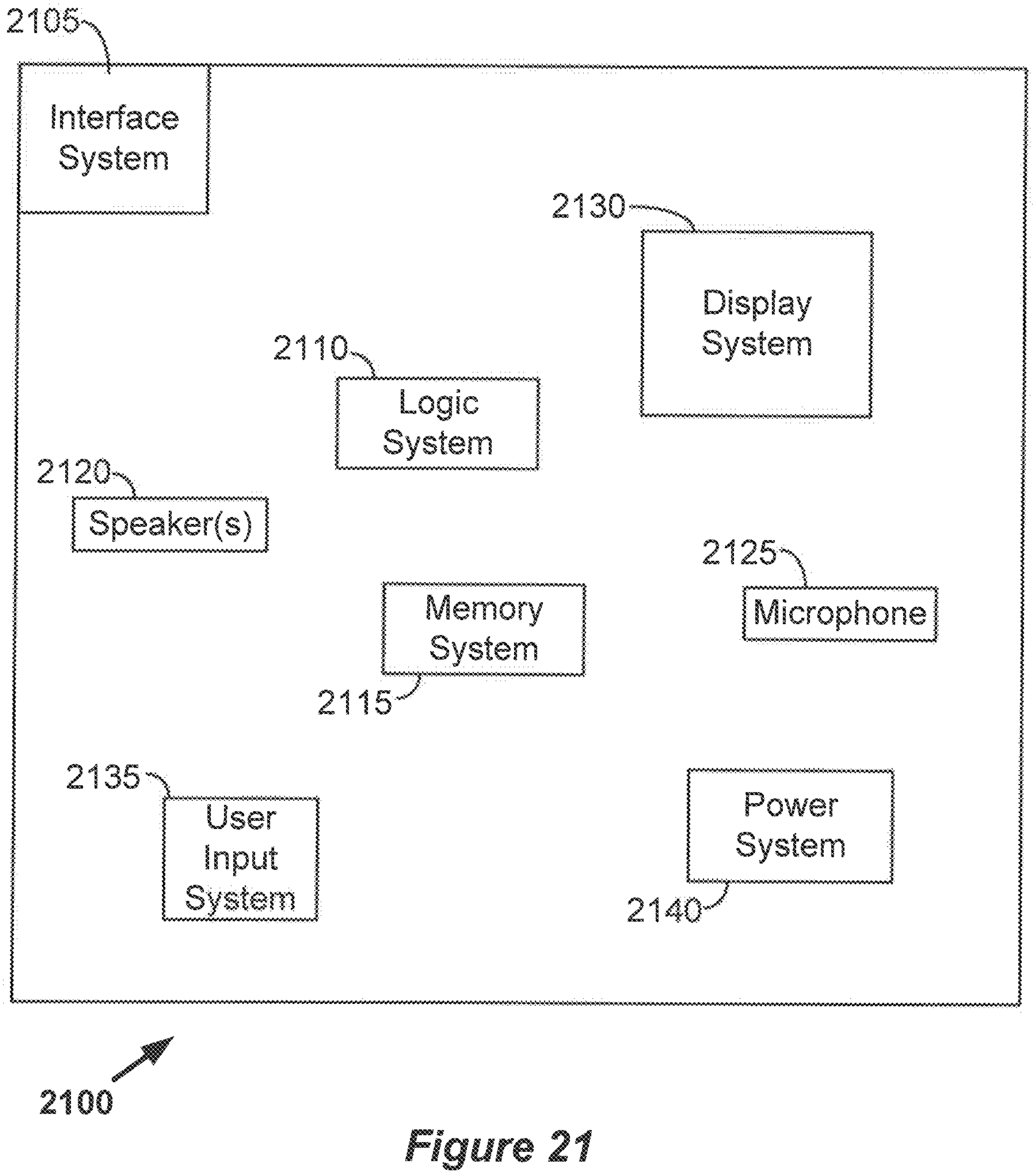
FIG. 21 is a block diagram that provides examples of components of an authoring and/or rendering apparatus.

FIG. 21 is a block diagram that provides examples of components of an authoring and/or rendering apparatus. In this example, the device 2100 includes an interface system 2105. The interface system 2105 may include a network interface, such as a wireless network interface. Alternatively, or additionally, the interface system 2105 may include a universal serial bus (USB) interface or another such interface.

The device 2100 includes a logic system 2110. The logic system 2110 may include a processor, such as a general purpose single- or multi-chip processor. The logic system 2110 may include a digital signal processor (DSP), an application specific integrated circuit (ASIC), a field programmable gate array (FPGA) or other programmable logic device, discrete gate or transistor logic, or discrete hardware components, or combinations thereof. The logic system 2110 may be configured to control the other components of the device 2100. Although no interfaces between the components of the device 2100 are shown in FIG. 21, the logic system 2110 may be configured with interfaces for communication with the other components. The other components may or may not be configured for communication with one another, as appropriate.

The logic system 2110 may be configured to perform audio authoring and/or rendering functionality, including but not limited to the types of audio authoring and/or rendering functionality described herein. In some such implementations, the logic system 2110 may be configured to operate (at least in part) according to software stored one or more non-transitory media. The non-transitory media may include memory associated with the logic system 2110, such as random access memory (RAM) and/or read-only memory (ROM). The non-transitory media may include memory of the memory system 2115. The memory system 2115 may include one or more suitable types of non-transitory storage media, such as flash memory, a hard drive, etc.

The display system 2130 may include one or more suitable types of display, depending on the manifestation of the device 2100. For example, the display system 2130 may include a liquid crystal display, a plasma display, a bistable display, etc.

The user input system 2135 may include one or more devices configured to accept input from a user. In some implementations, the user input system 2135 may include a touch screen that overlays a display of the display system 2130. The user input system 2135 may include a mouse, a track ball, a gesture detection system, a joystick, one or more GUIs and/or menus presented on the display system 2130, buttons, a keyboard, switches, etc. In some implementations, the user input system 2135 may include the microphone 2125: a user may provide voice commands for the device 2100 via the microphone 2125. The logic system may be configured for speech recognition and for controlling at least some operations of the device 2100 according to such voice commands.

The power system 2140 may include one or more suitable energy storage devices, such as a nickel-cadmium battery or a lithium-ion battery. The power system 2140 may be configured to receive power from an electrical outlet.

Figure 22A:
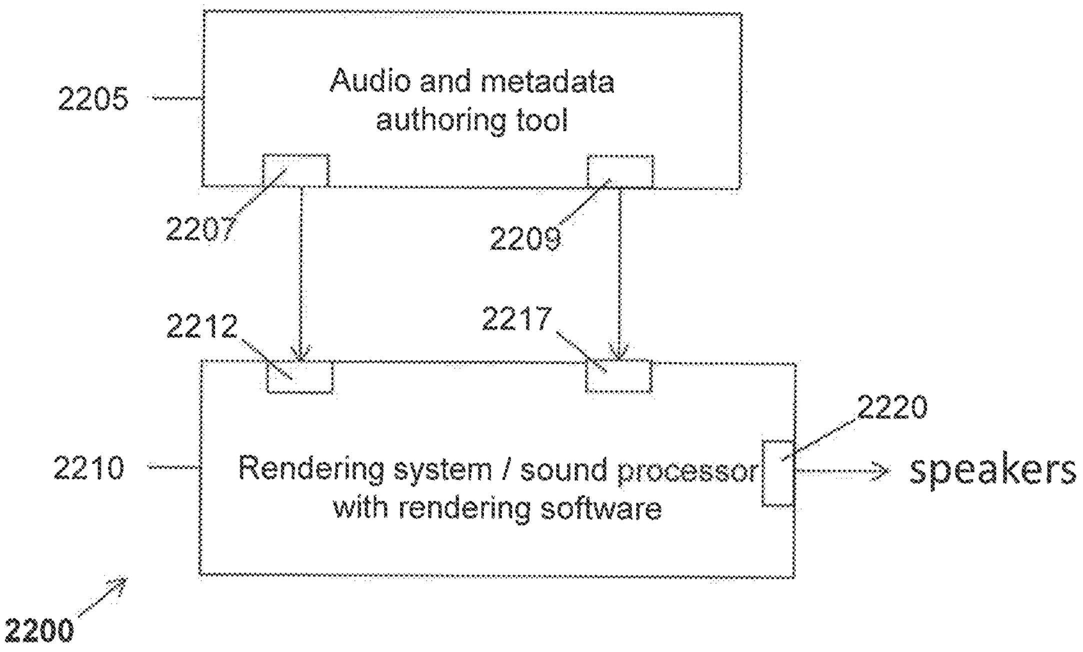
FIG. 22A is a block diagram that represents some components that may be used for audio content creation.

FIG. 22A is a block diagram that represents some components that may be used for audio content creation. The system 2200 may, for example, be used for audio content creation in mixing studios and/or dubbing stages. In this example, the system 2200 includes an audio and metadata authoring tool 2205 and a rendering tool 2210. In this implementation, the audio and metadata authoring tool 2205 and the rendering tool 2210 include audio connect interfaces 2207 and 2212, respectively, which may be configured for communication via AES/EBU, MADI, analog, etc. The audio and metadata authoring tool 2205 and the rendering tool 2210 include network interfaces 2209 and 2217, respectively, which may be configured to send and receive metadata via TCP/IP or any other suitable protocol. The interface 2220 is configured to output audio data to speakers.

The system 2200 may, for example, include an existing authoring system, such as a Pro Tools™ system, running a metadata creation tool (i.e., a panner as described herein) as a plugin. The panner could also run on a standalone system (e.g. a PC or a mixing console) connected to the rendering tool 2210, or could run on the same physical device as the rendering tool 2210. In the latter case, the panner and renderer could use a local connection e.g., through shared memory. The panner GUI could also be remoted on a tablet device, a laptop, etc. The rendering tool 2210 may comprise a rendering system that includes a sound processor that is configured for executing rendering software. The rendering system may include, for example, a personal computer, a laptop, etc., that includes interfaces for audio input/output and an appropriate logic system.

Figure 22B:
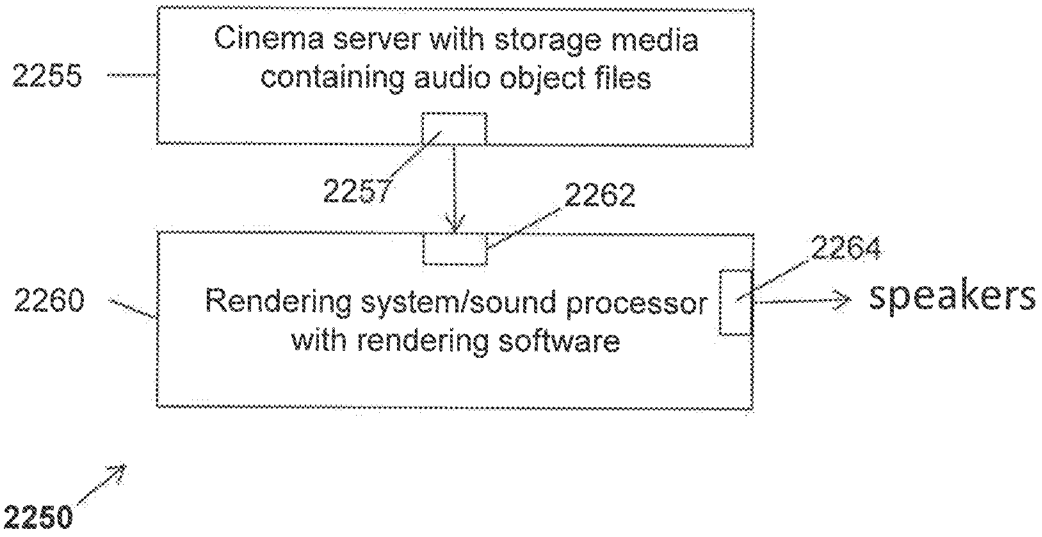
FIG. 22B is a block diagram that represents some components that may be used for audio playback in a reproduction environment.

FIG. 22B is a block diagram that represents some components that may be used for audio playback in a reproduction environment (e.g., a movie theater). The system 2250 includes a cinema server 2255 and a rendering system 2260 in this example. The cinema server 2255 and the rendering system 2260 include network interfaces 2257 and 2262, respectively, which may be configured to send and receive audio objects via TCP/IP or any other suitable protocol. The interface 2264 is configured to output audio data to speakers.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

The invention claimed is:

1. A method, comprising:

receiving audio reproduction data comprising one or more audio objects and metadata associated with each of the one or more audio objects;

receiving reproduction environment data comprising an indication of a number of reproduction speakers in the reproduction environment and an indication of the location of each reproduction speaker within the reproduction environment; and rendering the audio objects into one or more speaker feed signals by applying an amplitude panning process to each audio object, wherein the amplitude panning process comprises determining, for the audio object, a scaling factor corresponding to each reproduction speaker based, at least in part, on the metadata associated with each audio object and the location of each reproduction speaker within the reproduction environment, and wherein each speaker feed signal corresponds to at least one of the reproduction speakers within the reproduction environment;

wherein the metadata associated with each audio object includes audio object coordinates indicating the intended reproduction position of the audio object within the reproduction environment and a snap flag indicating whether the amplitude panning process should render the audio object into a single speaker feed signal or apply panning rules to render the audio object into a plurality of speaker feed signals.

2. The method of claim 1, wherein:

the snap flag indicates the amplitude panning process should render the audio object into a single speaker feed signal; and the amplitude panning process renders the audio object into a speaker feed signal corresponding to the reproduction speaker closest to the intended reproduction position of the audio object.

3. The method of claim 1, wherein:

the snap flag indicates the amplitude panning process should render the audio object into a single speaker feed signal;

a distance between the intended reproduction position of the audio object and the reproduction speaker closest to the intended reproduction position of the audio object exceeds a threshold; and the amplitude panning process overrides the snap flag and applies panning rules to render the audio object into a plurality of speaker feed signals.

4. The method of claim 2, wherein:

the metadata is time-varying;

the audio object coordinates indicating the intended reproduction position of the audio object within the reproduction environment differ at a first time instant and at a second time instant;

at the first time instant, the reproduction speaker closest to the intended reproduction position of the audio object corresponds to a first reproduction speaker;

at the second time instant the reproduction speaker closest to the intended reproduction position of the audio object corresponds to a second reproduction speaker; and the amplitude panning process smoothly transitions between rendering the audio object into a first speaker feed signal corresponding to the first reproduction speaker and rendering the audio object into a second speaker feed signal corresponding to the second reproduction speaker.

5. The method of claim 1, wherein:

the metadata is time-varying;

at a first time instant the snap flag indicates the amplitude panning process should render the audio object into a single speaker feed signal;

at a second time instant the snap flag indicates the amplitude panning process should apply panning rules to render the audio object into a plurality of speaker feed signals; and the amplitude panning process smoothly transitions between rendering the audio object into a speaker feed signal corresponding to the reproduction speaker closest to the intended reproduction position of the audio object and applying panning rules to render the audio object into a plurality of speaker feed signals.

6. An apparatus, comprising:

an interface system; and a logic system configured for:

receiving, via the interface system, audio reproduction data comprising one or more audio objects and metadata associated with each of the one or more audio objects;

receiving, via the interface system, reproduction environment data comprising an indication of a number of reproduction speakers in the reproduction environment and an indication of the location of each reproduction speaker within the reproduction environment; and rendering the audio objects into one or more speaker feed signals by applying an amplitude panning process to each audio object, wherein the amplitude panning process comprises determining, for the audio object, a scaling factor corresponding to each reproduction speaker based, at least in part, on the metadata associated with each audio object and the location of each reproduction speaker within the reproduction environment, and wherein each speaker feed signal corresponds to at least one of the reproduction speakers within the reproduction environment;

wherein the metadata associated with each audio object includes audio object coordinates indicating the intended reproduction position of the audio object within the reproduction environment and a snap flag indicating whether the amplitude panning process should render the audio object into a single speaker feed signal or apply panning rules to render the audio object into a plurality of speaker feed signals.

7. The apparatus of claim 6, wherein:

the snap flag indicates the amplitude panning process should render the audio object into a single speaker feed signal; and the amplitude panning process renders the audio object into a speaker feed signal corresponding to the reproduction speaker closest to the intended reproduction position of the audio object.

8. The apparatus of claim 6, wherein:

the snap flag indicates the amplitude panning process should render the audio object into a single speaker feed signal;

a distance between the intended reproduction position of the audio object and the reproduction speaker closest to the intended reproduction position of the audio object exceeds a threshold; and the amplitude panning process overrides the snap flag and applies panning rules to render the audio object into a plurality of speaker feed signals.

9. The apparatus of claim 6, wherein:

the metadata is time-varying;

the audio object coordinates indicating the intended reproduction position of the audio object within the reproduction environment differ at a first time instant and at a second time instant;

at the first time instant, the reproduction speaker closest to the intended reproduction position of the audio object corresponds to a first reproduction speaker;

at the second time instant the reproduction speaker closest to the intended reproduction position of the audio object corresponds to a second reproduction speaker; and the amplitude panning process smoothly transitions between rendering the audio object into a first speaker feed signal corresponding to the first reproduction speaker and rendering the audio object into a second speaker feed signal corresponding to the second reproduction speaker.

10. The apparatus of claim 6, wherein:

the metadata is time-varying;

at a first time instant the snap flag indicates the amplitude panning process should render the audio object into a single speaker feed signal;

at a second time instant the snap flag indicates the amplitude panning process should apply panning rules to render the audio object into a plurality of speaker feed signals; and the amplitude panning process smoothly transitions between rendering the audio object into a speaker feed signal corresponding to the reproduction speaker closest to the intended reproduction position of the audio object and applying panning rules to render the audio object into a plurality of speaker feed signals.

11. A non-transitory computer-readable medium having software stored thereon, the software including instructions for causing one or more processors to perform the following operations:

receiving audio reproduction data comprising one or more audio objects and metadata associated with each of the one or more audio objects;

receiving reproduction environment data comprising an indication of a number of reproduction speakers in the reproduction environment and an indication of the location of each reproduction speaker within the reproduction environment; and rendering the audio objects into one or more speaker feed signals by applying an amplitude panning process to each audio object, wherein the amplitude panning process comprises determining, for the audio object, a scaling factor corresponding to each reproduction speaker based, at least in part, on the metadata associated with each audio object and the location of each reproduction speaker within the reproduction environment, and wherein each speaker feed signal corresponds to at least one of the reproduction speakers within the reproduction environment;

wherein the metadata associated with each audio object includes audio object coordinates indicating the intended reproduction position of the audio object within the reproduction environment and a snap flag indicating whether the amplitude panning process should render the audio object into a single speaker feed signal or apply panning rules to render the audio object into a plurality of speaker feed signals.

* * * * *